(12) United States Patent
Moon et al.

(10) Patent No.: US 6,922,277 B2
(45) Date of Patent: Jul. 26, 2005

(54) OPTICAL INTERLEAVER/DEINTERLEAVER DEVICE HAVING AN ARRAY OF MICRO-MIRRORS

(75) Inventors: John A. Moon, Wallingford, CT (US); Alan D. Kersey, Glastonbury, CT (US); Jay W. Dawson, Livermore, CA (US); James R. Dunphy, Glastonbury, CT (US); Joseph Pinto, Wallingford, CT (US); Christian O'Keefe, Durham, CT (US); Paul Szczepanek, Middletown, CT (US)

(73) Assignee: CiDRA Corporation, Wallingford, CT (US)

( * ) Notice: Subject to any disclaimer, the term of this patent is extended or adjusted under 35 U.S.C. 154(b) by 116 days.

(21) Appl. No.: 10/255,132

(22) Filed: Sep. 25, 2002

(65) Prior Publication Data

US 2003/0086150 A1 May 8, 2003

Related U.S. Application Data

(63) Continuation-in-part of application No. 10/115,647, filed on Apr. 3, 2002, and a continuation-in-part of application No. 10/120,617, filed on Apr. 11, 2002.
(60) Provisional application No. 60/325,064, filed on Sep. 25, 2001.

(51) Int. Cl.[7] .............................. G02B 26/08; G02F 1/29
(52) U.S. Cl. ...................................................... 359/298
(58) Field of Search ................................ 359/571–573, 359/290–292, 900, 295, 297–298, 308; 398/43; 385/37, 53, 14, 16–18, 24

(56) References Cited

U.S. PATENT DOCUMENTS

| | | | |
|---|---|---|---|
| 4,626,066 A | 12/1986 | Levinson | 385/22 |
| 4,799,795 A | 1/1989 | Fateley | 356/310 |
| 4,819,084 A | 4/1989 | Bark | 358/296 |
| 5,121,239 A | 6/1992 | Post | 359/272 |
| 5,158,420 A | 10/1992 | Weyer | 414/694 |
| 5,166,766 A | 11/1992 | Grudkowski et al. | 257/15 |
| 5,504,575 A | 4/1996 | Stafford | 356/330 |
| 5,699,462 A | 12/1997 | Fouquet et al. | 385/18 |
| 5,729,386 A | 3/1998 | Hwang | 359/618 |
| 5,774,604 A | 6/1998 | McDonald | 385/18 |
| 5,915,063 A | 6/1999 | Colbourne et al. | 385/140 |
| 6,128,077 A | 10/2000 | Jovin et al. | 356/31 |
| 6,160,928 A | 12/2000 | Schroeder | 385/18 |
| 6,204,946 B1 | 3/2001 | Aksyuk et al. | 398/9 |
| 6,222,954 B1 | 4/2001 | Riza | 385/18 |
| 6,246,818 B1 | 6/2001 | Fukushima | 385/47 |
| 6,263,127 B1 | 7/2001 | Dragone et al. | 385/24 |
| 6,345,133 B1 * | 2/2002 | Morozov | 385/24 |
| 6,430,328 B1 * | 8/2002 | Culver et al. | 385/16 |
| 6,434,291 B1 | 8/2002 | Kessler et al. | 385/24 |
| 6,459,484 B1 | 10/2002 | Yokoi | 356/318 |
| 6,525,863 B1 | 2/2003 | Riza | 359/290 |

OTHER PUBLICATIONS

U.S. Appl. No. US 2002/0009257 A1, filed: Jan. 24, 2002, Bouevitch et al.

(Continued)

*Primary Examiner*—Hung Xuan Dang
*Assistant Examiner*—Joseph Martinez
(74) *Attorney, Agent, or Firm*—Ware, Fressola, Van Der Sluys & Adolphson LLP

(57) ABSTRACT

A reconfigurable optical interleaver/deinterleaver device combines/separates a pair of optical input signals from and/or to an optical WDM input signal. The interleaver device includes a spatial light modulator having a micromirror device with a two-dimensional array of micro-mirrors that flip between first and second positions in a "digital" fashion in response to a control signal provided by a controller in accordance with a switching algorithm and an input command. A pair of collimators, diffraction gratings and Fourier lens collectively collimate, separate and focus the optical input channels and optical add channels onto the array of micro-mirrors. Each optical channel is focused on a plurality of micro-mirrors of the micro-mirror device, which effectively pixelates the optical channels.

44 Claims, 38 Drawing Sheets

OTHER PUBLICATIONS

U.S. Appl. No. US 2001/0046350 A1, filed: Nov. 29, 2001, Tedesco.

U.S. Appl. No. US 2002/0081070 A1, filed: Jun. 27, 2002, Tew.

Texas Instruments, Provisional Pat. Appl. No. 60/250,520 Filed Nov. 30, 2000, Ref. from Publication No. 2002/0081070, Tew.

S. Yuan et al., "General Formula for Coupling–lose Characterization of Single–Mode Fiber Collimators by Use of Gradient–Index Rod Lenses, Applied Optics", vol. 38, No. 15, May 20, 1999, pp. 3214–3222.

N. Riza, "Reconfigurable Optical Wireless", IEEE Lasers and Electro–Optics Society 1999 Annual Meeting, vol. 1, pp. 70–71.

N. Riza et al., "Digitally Controlled Fault–Tolerant Multi-wavelength Programmable Fiber–Optic Attenuator Using a Two–Dimensional Digital Micromirror Device", 1999 Optical Society of America.

N. Riza et al., "Multiwavelength Three Dimensional 2×2 Fiber–Optic Switch Structure Using Small Tilt Micro–Mirrors", SPIE vol. 3749, pps 470–471.

G. Love, "Liquid–crystal Phase Modulator For Unpolarized Light", Applied Optics, vol. 32, No. 13, May 1, 1993, pps 2222–2223.

N. Riza et al., "Synchronous Amplitude and Time control for an Optimum Dynamic Range Variable Photonic Delay Line", Applied Optics, vol. 38, No. 11, Apr. 10, 1999, 2309–2318.

N. Riza et al., "Robust Packaging of Photonic RF Modules Using Ultra–Thin Adaptive Optical Interconnect Devices", SPIE vol. 3160, pps. 170–176.

N. Riza et al., "Demonstration of a Liquid–crystal adaptive alignment tweeker for high–speed Infrared Band Fiber–Fed Free–space Systems", Opt. Eng. 37(6), Jun. 1998, 1876–1880.

M. D. Johnson et al., "Two–axis Micromirror Scanner", SPIE vol. 3787, Jul. 1999, pps. 88–95.

H. Laor et al., "Performance of a 576×576 Optical Cross Connect", National Fiber Optic Engineers Conference, Sep. 26–30, 1999, pps. 276–281.

* cited by examiner

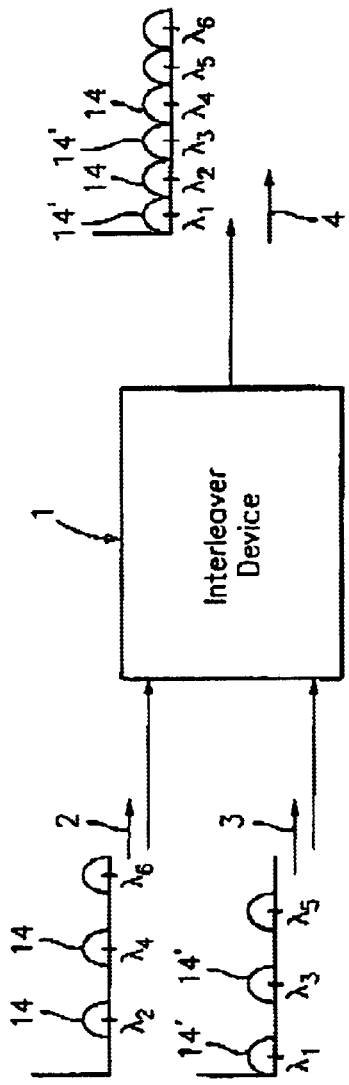
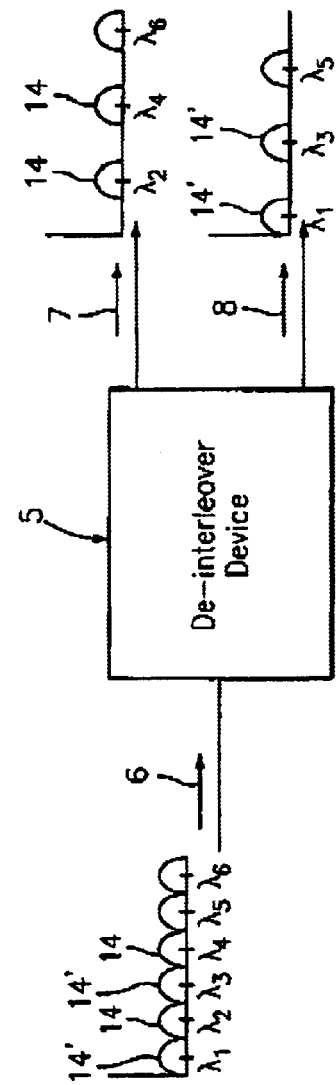

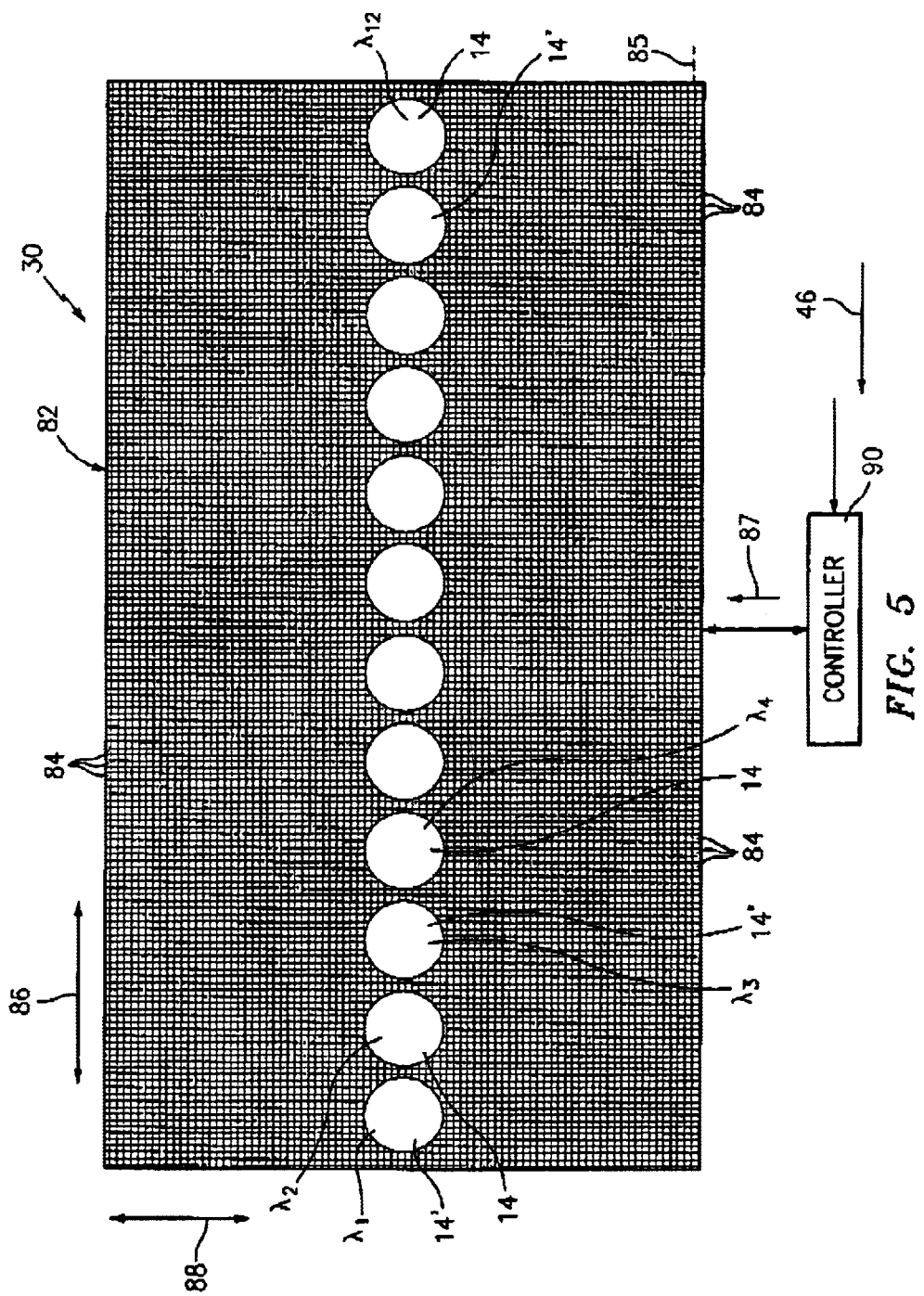

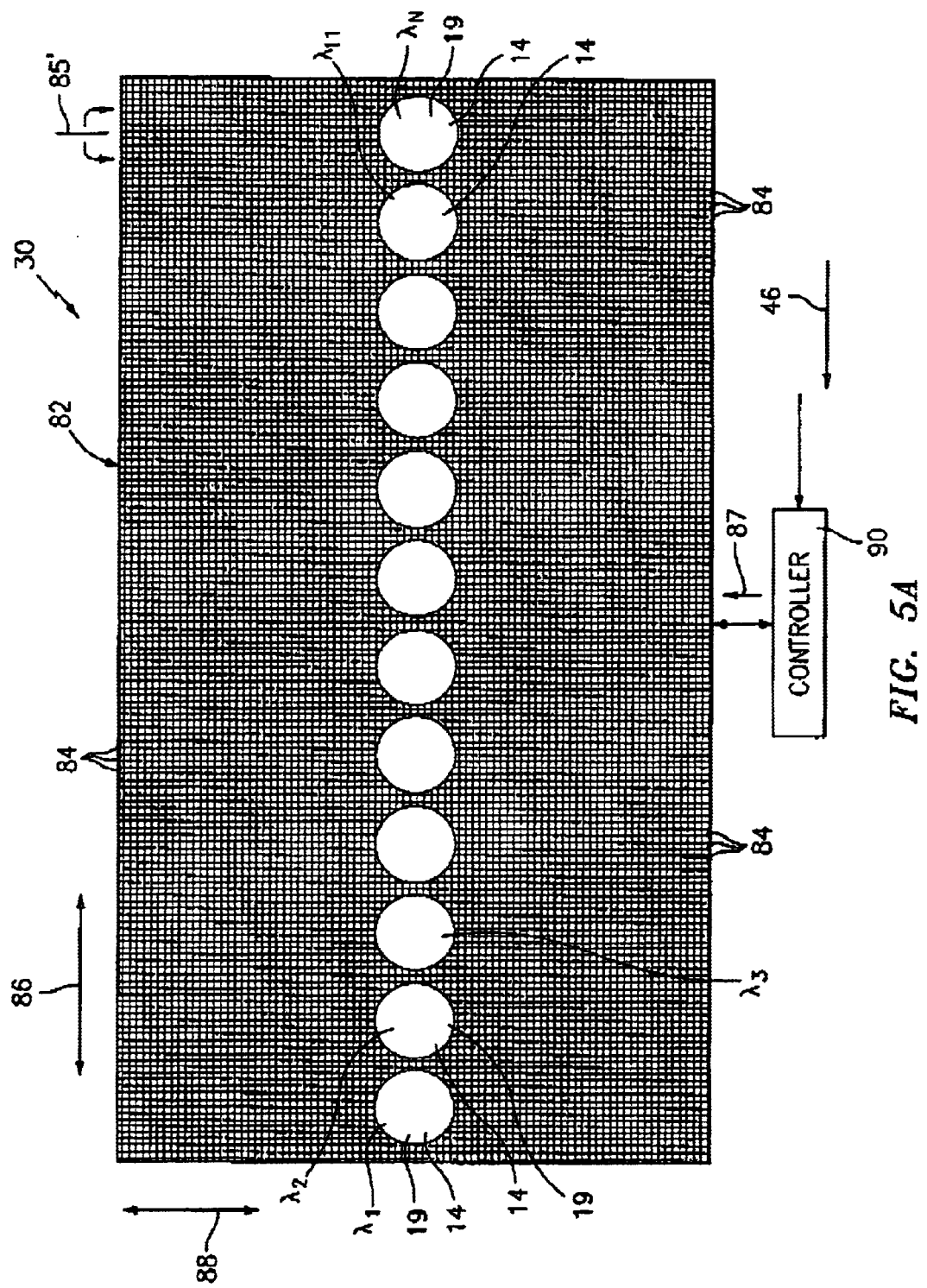

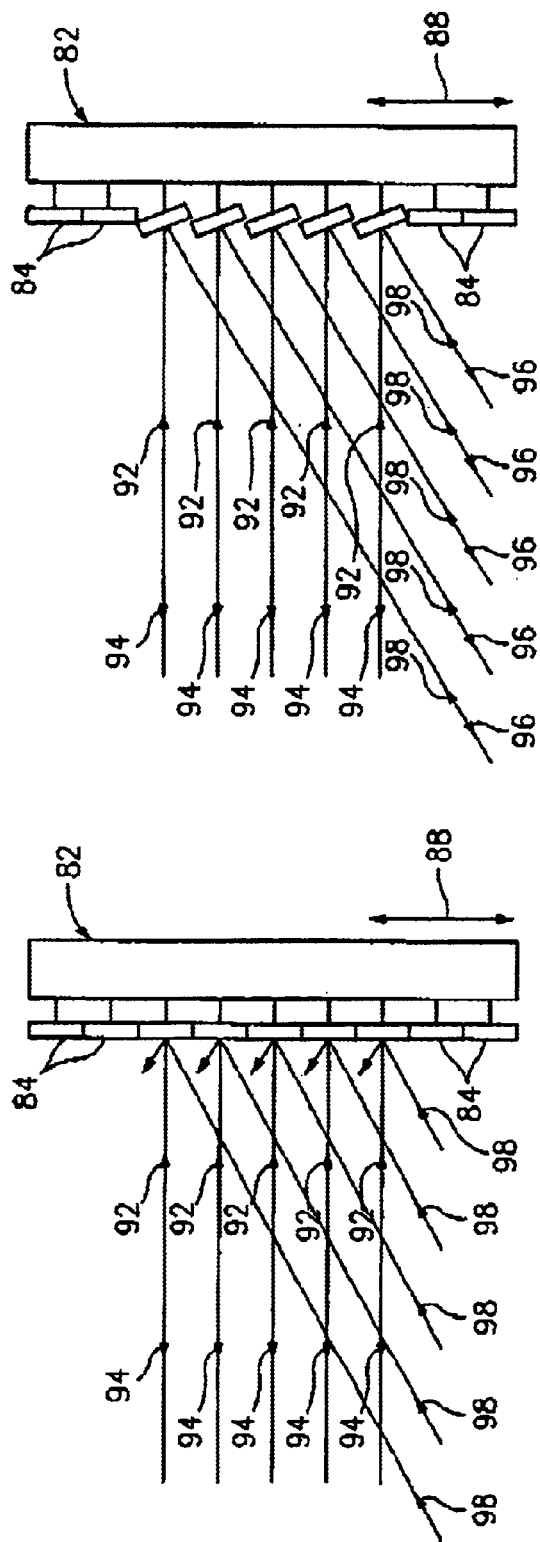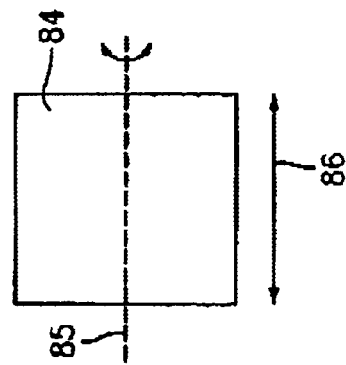
FIG. 6b
FIG. 7
FIG. 6a

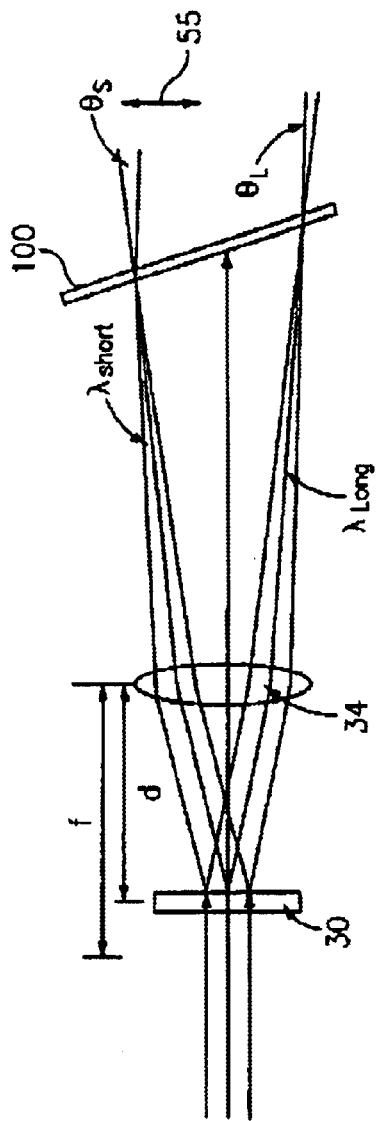
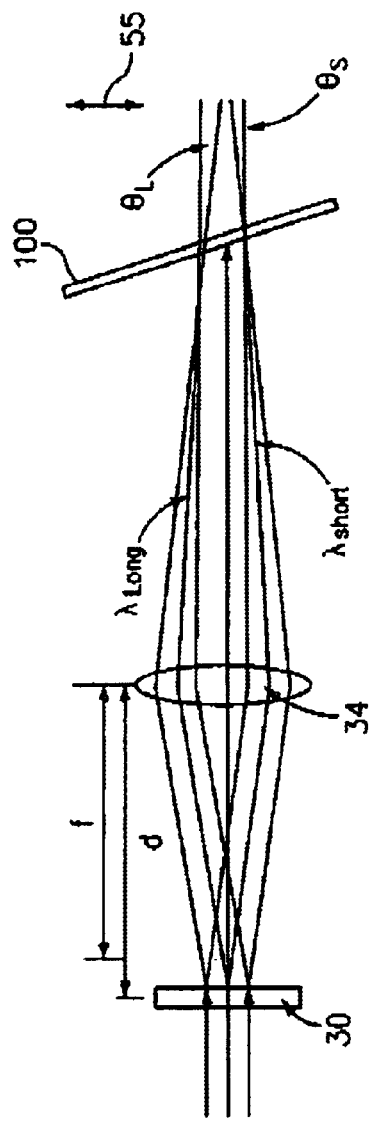
FIG. 18a
FIG. 18b

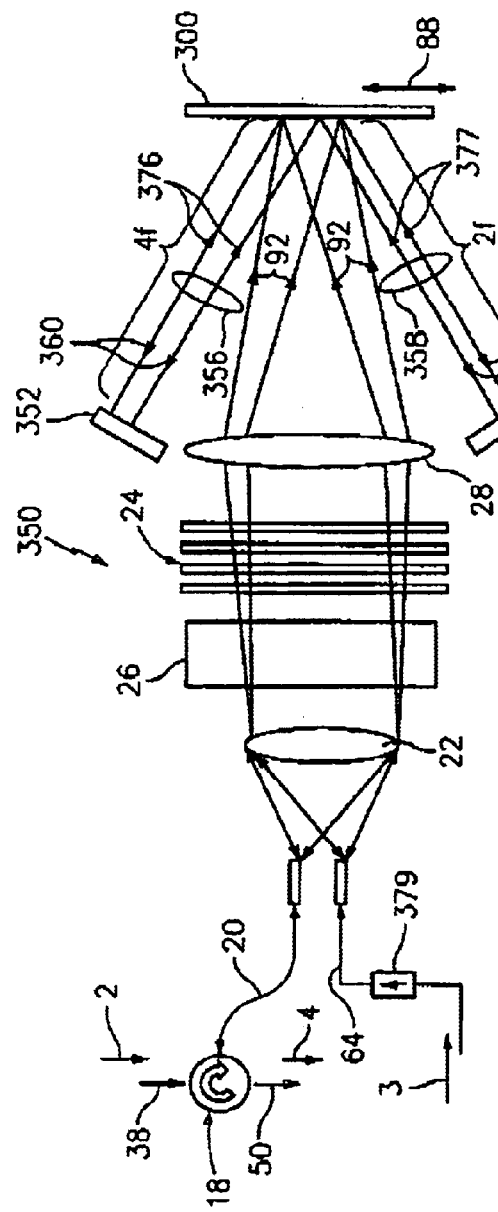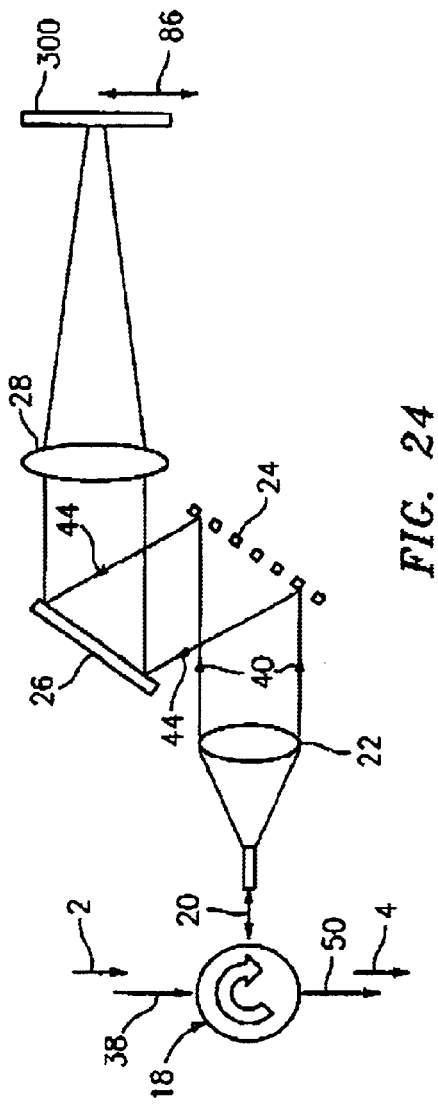

OPTICAL INTERLEAVER/DEINTERLEAVER DEVICE HAVING AN ARRAY OF MICRO-MIRRORS

CROSS REFERENCE TO RELATED APPLICATIONS

This application claims benefit to provisional patent application Ser. No. 60/325,064 (CC-0397), entitled "Optical Interleaver/De-interleaver Having an Array of Micromirrors", filed Sep. 25, 2001, and is a continuation-in-part of patent application Ser. No. 10/115,647 (CC-0461), filed Apr. 3, 2002, as well as a continuation-in-part of patent application Ser. No. 10/120,617 (CC-0461), filed Apr. 11, 2002, which are all hereby incorporated by reference in their entirety.

This application filed concurrently with the same identified by Express mail nos. EV 137 071 802 US (CC-0544), EV 137 071 793 US (CC-0545), and EV 137 071 816 US (CC-0546), which are also hereby incorporated by reference in their entirety.

BACKGROUND OF THE INVENTION

1. Technical Field

The present invention relates to a tunable optical device, and more particularly to an optical interleaver/deinterleaver including an array of micro-mirrors to optically separate a WDM signal into subsets of optical channels or combine a pair of WDM signals comprising subsets of spaced optical channels.

2. Description of Related Art

FIG. 1 shows a known interleaver device that combines at least two optical WDM input signals 2,3 into a single optical output signal 4. The WDM input signals include a plurality of wavelength bands of light (or optical channels) that are centered at a respective channel wavelength ($\lambda_1, \lambda_2, \lambda_3, \ldots \lambda_N$). In one embodiment, as shown, one input signal 2 includes each even input channel 14 (e.g., $\lambda_2, \lambda_4, \lambda_6$), and the other input signal 3 includes each odd input channel (e.g., $\lambda_1, \lambda_3, \lambda_5$). The combined input signals 2,3 provide a WDM output signal having each input channels 14,14' (e.g., $\lambda_1$-$\lambda_6$).

FIG. 2 shows another known optical deinterleaver device generally indicated as 5 that separates an optical WDM input signal 6 into at least two optical output signals 7, 8. The WDM input signal includes a plurality of optical channels that are centered at a respective channel wavelength ($\lambda_1, \lambda_2, \lambda_3, \ldots \lambda_N$). In one embodiment, as shown, the input signal 6 includes a WDM output signal having input channels at $\lambda_1$-$\lambda_6$. The input signal 6 is separated such that one output signal 7 includes each even input channel (i.e., $\lambda_2, \lambda_4, \lambda_6$), and the other output signal 8 includes each odd input channel (i.e., $\lambda_1, \lambda_3, \lambda_5$).

Moreover, MEMS micro-mirrors have been widely explored and used for optical switching applications. The most commonly used application is for optical cross-connect switching. In most cases, individual micro-mirror elements are used to 'steer' a beam (i.e., an optical channel) to a switched port or to deflect the beam to provide attenuation on a channel-by-channel basis. Each system is designed for a particular 'wavelength plan'—e.g. "X" number of channels at a spacing "Y", and therefore each system is not 'scalable' to other wavelength plans.

In the networking systems, it is often necessary to route different channels (i.e., wavelengths) between one fiber and another using a reconfigurable optical add/drop multiplexer (OADM) and/or an optical cross-connect device. Many technologies can be used to accomplish this purpose, such as Bragg gratings or other wavelength selective filters.

One disadvantage of Bragg grating technology is that it requires many discrete gratings and/or switches, which makes a 40 or 80 channel device quite expensive.

A better alternative would be to use techniques well-known in spectroscopy to spatially separate different wavelengths or channels using bulk diffraction grating technology. For example, each channel of an interleaver device is provided to a different location on a generic micro-electro-mechanical system (MEMS) device. The MEMS device is composed of a series of tilting mirrors, where each discrete channel hits near the center of a respective mirror and does not hit the edges. In other words, one optical channel reflects off a single respective mirror.

One issue with the above optical MEMS device is that it is not "channel plan independent". In other words, each MEMS device is limited to the channel spacing (or channel plan) originally provide. Another concern is that if the absolute value of a channel wavelength changes, a respective optical signal may begin to hit an edge of a corresponding mirror leading to large diffraction losses. Further, since each channel is aligned to an individual mirror, the device must be carefully adjusted during manufacturing and kept in alignment when operated through its full temperature range in the field.

It would be advantageous to provide an optical interleaver/deinterleaver that mitigates the above problems by using an array of micro-mirrors.

SUMMARY OF THE INVENTION

An object of the present invention is to provide a reconfigurable optical interleaver/deinterleaver having a spatial light modulator that includes a micro-mirror device having an array of micro-mirrors, wherein a plurality of micro-mirrors direct the optical channels of the WDM input signal to separate the WDM signal into a pair of optical signals having channels spectrally spaced, or combining a pair of optical signals having spaced channels into a single WDM signal, which advantageously permits the interleaver/deinterleaver, to be reconfigurable by changing a switching algorithm that drives the micro-mirrors, without having to change the hardware configuration.

In accordance with an embodiment of the present invention, the optical interleaver/de-interleaver device includes an optical arrangement for receiving two or more optical signals, each optical signal having a respective set of at least one optical band or channel, and including a spatial light modulator having a micro-mirror device with an array of micro-mirrors for reflecting the one or more optical signals provided thereon. The optical arrangement features a free optic configuration having one or more light dispersion elements for separating the two or more optical input signals so that each optical band or channel is reflected by a respective plurality of micro-mirrors to selectively either combine two respective sets of the at least one optical band or channel into one optical output signal, or de-combine one set of the at least one optical band or channel into two optical output signals each having a different set of the at least one optical band or channel.

The one or more light dispersion elements may include either a diffraction grating, an optical splitter, a holographic device, a prism, or a combination thereof. The one or more diffraction gratings may include a blank of polished fused silica or glass with a reflective coating having a plurality of grooves either etched, ruled or suitably formed thereon. The diffraction grating may also be tilted and rotated approximately 90° in relation to the spatial axis of the spatial light modulator.

The spatial light modulator may be programmable for reconfiguring the optical cross-connet by changing a switching algorithm that drives the array of micro-mirrors.

In one embodiment, the optical interleaver device includes a first collimator that collimates a first optical input signal. The first input signal includes a plurality of input channels that are each centered at a central wavelength. A first light dispersion element substantially separates the input channels of the collimated first input signal. A second collimator collimates a second optical input signal. The second input signal includes a plurality of input channels that are each centered at a central wavelength. A second light dispersion element substantially separates the input channels of the collimated second input signal. A spatial light modulator reflects each separated input channel of the first input signal along a respective first optical path or second optical path, and reflecting the input channels of the second input signal along the respective first optical path in response to a control signal. The spatial light modulator comprises a micro-mirror device including an array of micro-mirrors selectively disposable between a first and a second position in response to the control signal. Each separated optical input channel of the first and second input channel is incident on a respective group of micro-mirrors, wherein each respective separated input channel of the first and second input signal reflects along the respective first optical path when the micro-mirrors are disposed in the first position or along the respective second optical path when the micro-mirrors are disposed in the second position to combine the input channels of the first and second input signals to provide an output signal. A controller generates the control signal, in accordance with a switching algorithm.

In accordance with another embodiment of the present invention, an optical deinterleaver device comprises a first collimator that collimates an optical input signal and focuses a first output signal. The input signal and first output signal includes a plurality of respective channels that are centered at a central wavelength. A first light dispersion element substantially separates the input channels of the collimated input signal and combines the channels of the first output signal. A second collimator focuses a second output signal. The second output signal includes a plurality of output channels that are centered at a central wavelength. A second light dispersion element combines the second output channels of the collimated second input signal. A spatial light modulator reflects the separated input channels of the input signal along a respective first optical path or second optical path in response to a control signal. The spatial light modulator comprises a micro-mirror device that includes an array of micro-mirrors selectively disposable between a first and a second position in response to the control signal. Each separated optical channel of the input channel being incident on a respective group of micro-mirrors, wherein each respective separated input channel of the input signal reflects along the respective first optical path when the micro-mirrors are disposed in the first position or along the respective second optical path when the micro-mirrors are disposed in the second position to separate the input channels of the input signal to provide the first and second output signals. A controller generates the control signal, in accordance with a switching algorithm.

Many other embodiment are shown and described herein.

BRIEF DESCRIPTION OF THE DRAWING

The drawing, not drawn to scale, includes the following Figures:

FIG. 1 is a block diagram of an optical interleaver device that is known in the art;

FIG. 2 is a block diagram of an optical deinterleaver device that is known in the art;

FIG. 5 is a block diagram of a spatial light modulator of the interleaver/deinterleaver device of FIG. 3 having a micro-mirror device, wherein the optical channels of a WDM input signal are distinctly projected onto the micro-mirror device, in accordance with the present invention;

FIG. 5A is a block diagram of an alternative spatial light modulator having a micro-mirror device with mirrors tilting on a spectral axis that is perpendicular to the spectral axis of WDM input signal distinctly projected thereon in accordance with the present invention;

FIG. 6a is a pictorial cross-sectional view of the micro-mirror device of FIG. 5 showing a partial row of micro-mirrors, when the micro-mirrors are disposed in a first position perpendicular to the light beam of the input signal in accordance with the present invention;

FIG. 6b is a pictorial cross-sectional view of the micro-mirror device of FIG. 5 showing a partial row of micro-mirrors, when the micro-mirrors are disposed in a second position non-orthogonal to the light beam of the input signal in accordance with the present invention;

FIG. 7 is a plan view of a micro-mirror of the micro-mirror device of FIG. 5 in accordance with the present invention;

FIG. 18a is a graphical representation of a portion of the optical filter wherein the grating order causes the shorter wavelengths of light to image onto the micromirror device that is closer than the section illuminated by the longer wavelengths, in accordance with the present invention;

FIG. 18b is a graphical representation of a portion of the optical filter wherein the grating order causes the longer wavelengths of light to image onto the micromirror device that is closer than the section illuminated by the shorter wavelengths, in accordance with the present invention;

FIG. 23 is a plan view of a block diagram of another interleaver/deinterleaver device including a spatial light modulator having a micro-mirror device of FIG. 13, in accordance with the present invention;

FIG. 24 is a side elevational view of a block diagram of the interleaver/deinterleaver device of FIG. 23;

BEST MODE FOR CARRYING OUT THE INVENTION

FIGS. 3–7: The Basic Invention

Figure 3:
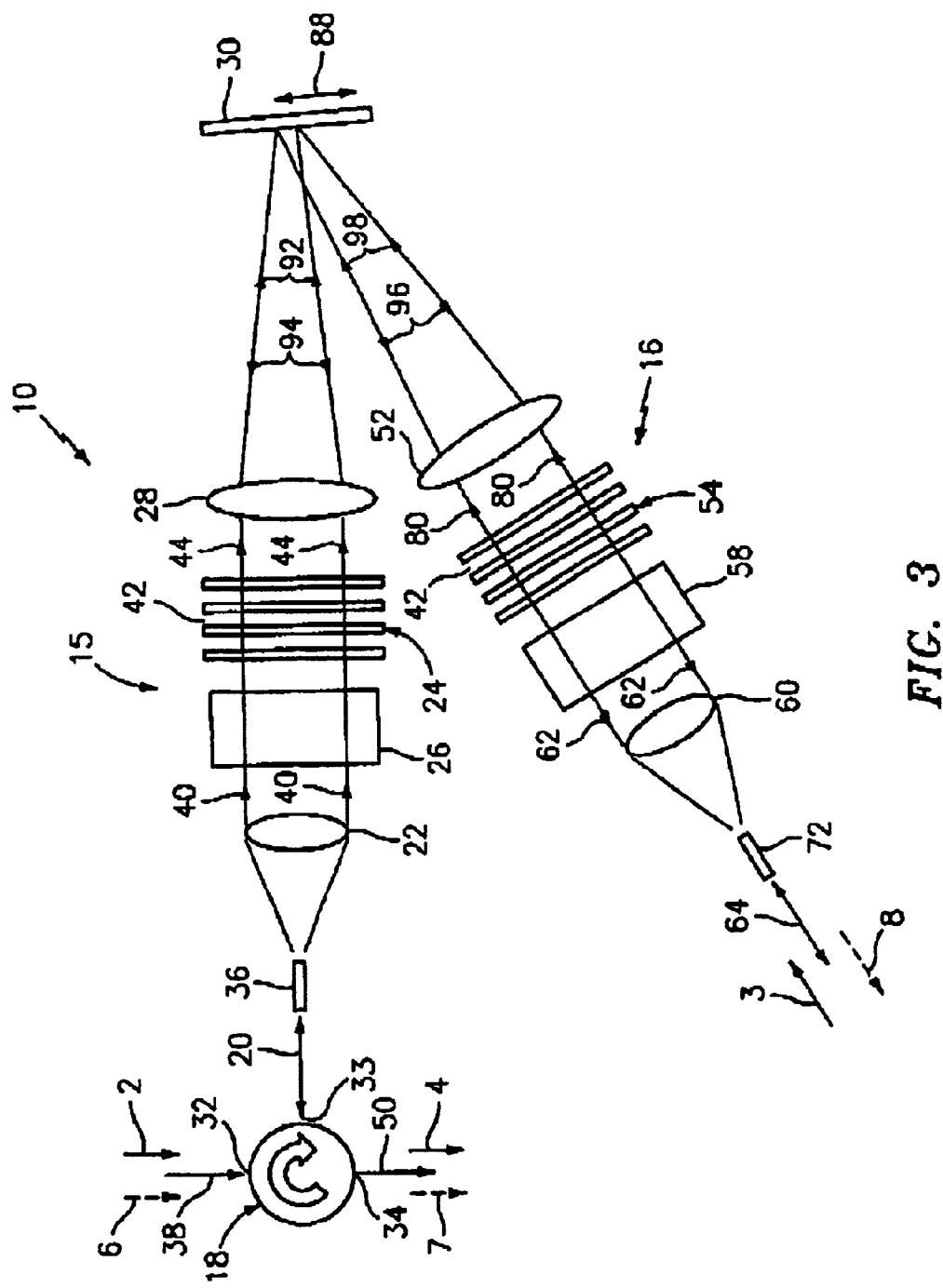
FIG. 3 is a plan view of a block diagram of a reconfigurable optical interleaver/deinterleaver device including a spatial light modulator in accordance with the present invention.

FIGS. 3–7 show an embodiment of the basic invention which features an optical interleaver/de-interleaver device generally indicated as 10 including an optical arrangement 15, 16 for receiving a pair of optical input signals, each optical input signal having a respective set of at least one optical wavelength band or channel, and including a spatial light modulator 30 having a micro-mirror device (FIGS. 5–8) with an array of micro-mirrors 84 for reflecting the two or more optical signals provided thereon. The optical arrangement 15, 16 comprises a free optic configuration having one or more light dispersion elements for separating the optical input signal(s) so that each optical band or channel is reflected by a respective plurality of micro-mirrors 100, 101, 102, 103 (FIG. 8) to selectively either combine two respective sets of the at least one optical band or channel into one optical output signal, or de-combine one set of the one optical channel(s) into two optical output signals each having a different set of the optical channel(s).

The optical arrangement 15, 16 includes a first optical portion 15 and a second optical portion 16 that provide the more optical input signals 2, 3 to the spatial light modulator 30, and also provide the optical output signal 4 having the combined optical channels after channels. The scope of the invention is not intended to be limited to any particular type of optical portion. Embodiments are shown and described by way of example below having may many different types of optical portions. The scope of the invention is not intended to be limited to only those types of optical portions shown and described herein.

The spatial light modulator 30 may be programmable for reconfiguring the interleaver/deinterleaver 10 by changing a switching algorithm that drives the array of micro-mirrors 84 to accommodate different WDM input signal structures (i.e. channel spacing, beam shape). For example the ROADM may be modified to accommodate WDM signals having a 50 GHz or 100 GHz spacing.

In FIG. 3, the reconfigurable optical interleaver/deinterleaver device 10 may function as an interleaver device of FIG. 1 or a deinterleaver device of FIG. 2. The input signals 2, 3 and output signal 4 of the interleaver device are shown as solid arrows, while the input signal 6 and the output signals 7, 8 of the deinterleaver device are shown as dashed arrows. To simplify the description of the present invention, each of the embodiments are described hereinafter as an interleaver, however, one should appreciate that each of the embodiments may function as a deinterleaver by configuring one of the input ports to an output port, as illustrated by the dashed arrows 6–8.

Accordingly, the interleaver device 10 of FIG. 3 comprises a pair of optical portions 15,16 that focuses and receives light to and from a spatial light modulator 30. FIG. 3 is a plan view of the interleaver device 10 in the horizontal plane. Each optical portion 15,16 includes substantially the same components disposed in substantially the same configuration. To better understand the interleaver device 10 of FIG. 3, a side elevational view of one of the optical portions 15 is illustrated in FIG. 3A and will be described with the understanding that the other complementary optical portion 16 functions in a similar manner.

Figure 3A:
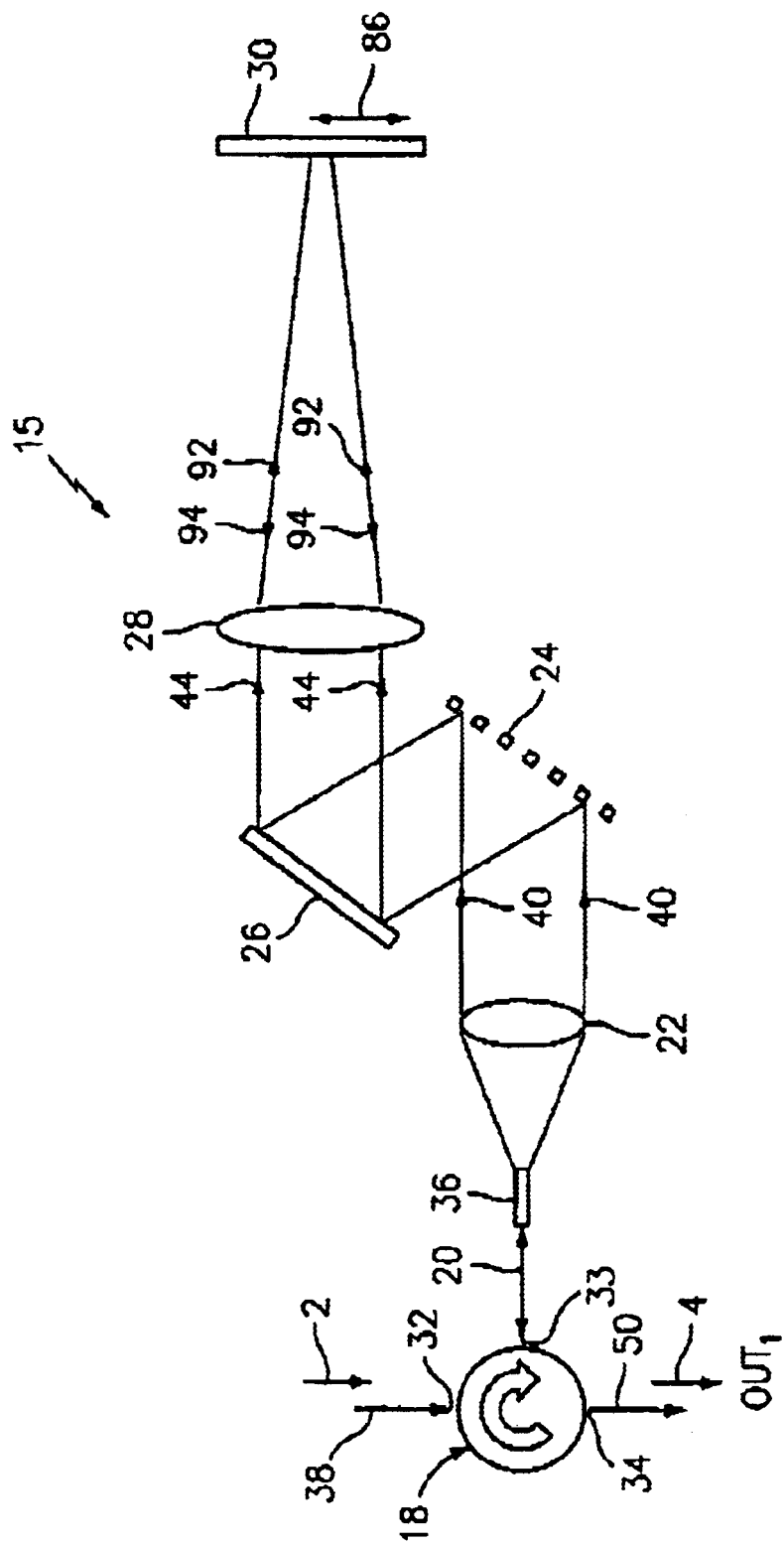
FIG. 3A is a side elevational view of a block diagram of the interleaver/deinterleaver device of FIG. 3.

As shown in FIG. 3A, the optics of the optical portion 15 is disposed in two tiers or horizontal planes. Specifically, the optical portion 15 includes an optical fiber or pigtail 20, a collimator 22, a light dispersive element 24, a mirror 26, and a bulk lens 28 for directing light to and from the spatial light modulator 30. A three-port circulator 18 is optically connected to the pigtail 20 to provide input signals 2,3 to and receive an output signal 4 from the optical portion 15. As shown, the pigtail 20, the collimator 22 and the light dispersive element 24 are disposed in a first tier or plane parallel to the horizontal plane. The mirror 26, bulk lens 28 and the spatial light modulator 30 are disposed in the second tier also parallel to the horizontal plane.

Figure 4:
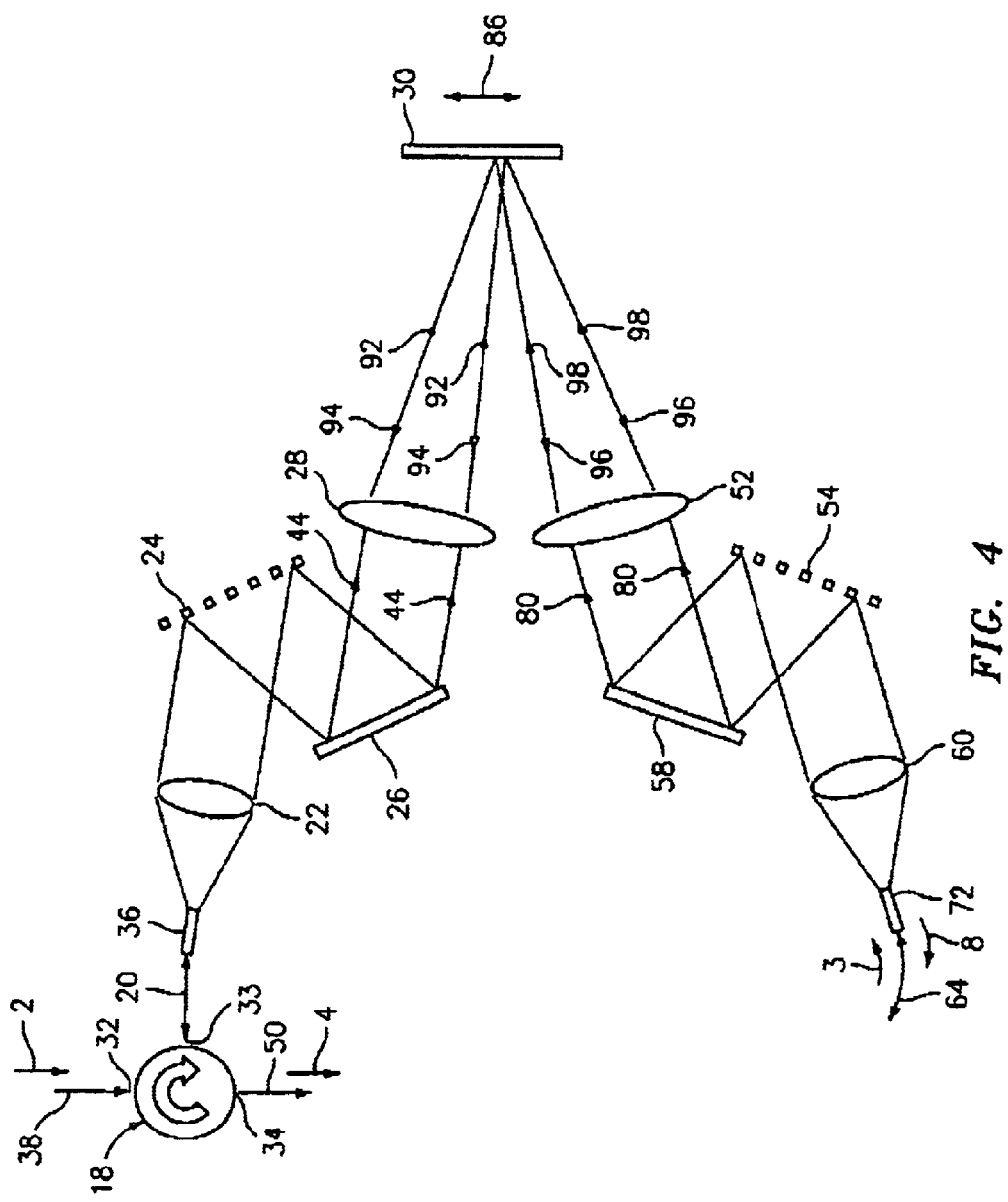
FIG. 4 is a plan view of a block diagram of another embodiment of an interleaver/de-interleaver in accordance with the present invention.

Referring to FIGS. 3 and 4, the circulator 18 directs light from a first port 32 to a second port 33 and from the second port to a third port 34. The first pigtail 20 is optically connected to the second port of the circulator 18. A capillary tube 36, which may be formed of glass, is attached to one end of the first pigtail 20 such as by epoxying or collapsing the tube onto the first pigtail. The first port 32 of the circulator 18 receives the first input signal 2 from an optical network (not shown) via optical fiber 38, and directs the input light to the first pigtail 20. The first input signal 2 exits the first pigtail (into free space) and passes through the first collimator 22, which collimates the input signal. The collimator 22 may be an aspherical lens, an achromatic lens, a doublet, a GRIN lens, a laser diode doublet or similar collimating lens. The collimated input signal 40 is incident on the first light dispersion element 24 (e.g., a diffraction grating or a prism), which separates spatially the optical channels of the collimated input signal 40 by diffracting or dispersing the light from (or through) the first light dispersion element.

In one embodiment, the first diffraction grating 24 is comprised of a blank of polished fused silica or glass with a reflective coating (such as evaporated gold or aluminum), wherein a plurality of grooves 42 (or lines) are etched, ruled or otherwise formed in the coating. The first diffractive grating 24 has a predetermined number of lines, such as 600 lines/mm, 850 lines/mm and 1200 lines/mm. The resolution of the interleaver device improves as the number of lines/mm in the grating increases. The grating 24 may be similar to those manufactured by Thermo RGL, part number 3325FS-660 and by Optometrics, part number 3-9601. Alternatively, the first diffraction grating may be formed using holographic techniques, as is well known in the art. Further, the first light dispersion element may include a prism or optical splitter to disperse the light as the light passes therethrough, or a prism having a reflective surface or coating on its backside to reflect the dispersed light.

As best shown in FIG. 3A, the diffraction grating 24 directs the separated light 44 to the first mirror 26 disposed in the second tier. The first mirror 26 reflects the separated light 44 to the first bulk lens 28 (e.g., a Fourier lens), which focuses the separated light onto the spatial light modulator 30, as shown in FIG. 5.

In response to a switching algorithm and input command 46, the spatial light modulator 30 reflects the optical input channel(s) 14 of first input signal back through the same optical path to the first pigtail 20, as best shown in FIG. 3. The returned optical input channel(s) propagates from the second port 33 to the third port 34 of the optical circulator 18 to provide an output signal 4 from optical fiber 50.

The optical channels 14' of the second input signal 3 are combined with or added to the output signal 4. The channel 14' of the second input signal 3 exit the second pigtail 64 and passes through the second collimator 60 to the second diffraction grating 54, which separates spectrally the channels 14' of the collimated second input signal 3 by dispersing or diffracting from (or through) the second diffraction grating 54. The diffraction grating 54 directs the separated light 80 to the second mirror 58 disposed in the second tier, similar to that described above in FIG. 3A for the optical portion 15. The mirror 58 reflects the separated light 80 to the second bulk lens 52, which focuses the separated light 80 onto the spatial light modulator 30. As shown in FIG. 5, the separated light 44 of the first input signal 2 and the separate light 80 of the second input signal 3 occupy different, alternating portion (or sections) of the spatial light modulator 30. The spatial light modulator 30 reflects the channel 14' of the separated light 80 to the first bulk lens 28.

The channel 14' of the second input signal 3 passes through the first bulk lens 28, which are then reflected off the first mirror 26 onto the first diffraction grating 24. The first diffraction grating further converges the channel 14' onto the first collimator 22 which focuses the channels 14' to the first pigtail 22. The channels 14' propagate from the first pigtail 20 to optical fiber 50, to thereby combine the channels 14' to the output signal 4.

As shown in FIG. 5, the spatial light modulator 30 comprises a micro-mirror device 82 having a two-dimensional array of micro-mirrors 84, which cover a surface of the micro-mirror device. The micro-mirrors 84 are generally square and typically 14–20 um wide with 1 um spaces between them. FIG. 6a illustrates a partial row of micro-mirrors 84 of the micro-mirror device 82, when the micro-mirrors are disposed in a first position to reflect the light back along the return path and provide the channels 14 of the first input signal 2 to the output fiber 50. FIG. 6b illustrates a partial row of micro-mirrors 84 when the micro-mirrors are disposed in a second position, and therefore combine/add the channels 14' of the second input signal 3 to the output fiber 50, as will be described in greater detail hereinafter. The micro-mirrors may operate in a "digital" fashion. In other words, as the micro-mirrors either lie flat in a first position, as shown in FIG. 6a, or be tilted, flipped or rotated to a second position, as shown in FIG. 6b.

As described herein before, the positions of the mirrors, either flat or tilted, are described relative to the optical path wherein "flat" refers to the mirror surface positioned orthogonal to the light path, either coplanar in the first position or parallel as will be more fully described hereinafter. The micro-mirrors flip about an axis 85 parallel to the spectral axis 86, as shown in FIG. 7, wherein the spectral axis is defined by the direction the channels ($\lambda_n$) of the optical input signal 2 is spread by the diffraction grating 24. One will appreciate, however, that the micromirrors may flip about any axis, such as parallel to the spatial axis 88 or at a 45 degrees angle to the spatial axis.

Referring to FIG. 5, the micro-mirrors 84 are individually flipped between the first position and the second position in response to a control signal 87 provided by a controller 90 in accordance with a switching algorithm and an input command 46. The switching algorithm may provide a bit (or pixel) map indicative of the state (flat or tilted) of each of the micro-mirrors 84 of the array to return, drop and/or add the desired optical channel(s) 14 to provide the express/output signal 48 at optical fiber 50 (see FIG. 3), and thus requiring a bit map for each configuration of channels to be dropped and added.

Alternatively, each group of mirrors 84, which reflect a respective optical channel 14, may be individually controlled by flipping the group of micro-mirrors to direct the channel along a desired optical path (i.e., return, drop or add).

One will appreciate that the interleaver device 10 may be selectively configured or modified for any wavelength plan by simply modifying the software. For example, an interleaver device for filtering a 50 GHz WDM optical signal may be modified to filter a 100 GHz or 25 GHz WDM optical signal by simply modifying or downloading a different switching algorithm, without modifying the hardware.

In other words, any changes to the WDM signal structure (such as varying the spacing of the channels, the shapes of the light beams, and center wavelength of the light beams) may be accommodated within the interleaver/de-interleaver by simply modifying statically or dynamically the switching algorithm (e.g., modifying the bit map).

As shown in FIGS. 3 and 6a, the micro-mirror device 82 is oriented to reflect the focused light 92 of the first input signal 2 back through the first bulk lens 28 to the first pigtail 20, as indicated by arrows 94, to provide the output signal 4. As shown in FIGS. 3 and 6b, the channels 14' of the second input signal 3 reflects, as indicated by arrows 98, back through the first bulk lens 28 to the first pigtail 20, as indicated by arrows 94, which is added to the output signal 4. This "digital" mode of operation of the micro-mirrors advantageously eliminates the need for any type of feedback control for each of the micro-mirrors. The micro-mirrors are either "on" or "off" (i.e., first position or second position), respectively, and therefore, can be controlled by simple binary digital logic circuits.

FIG. 5 further illustrates the outline of the optical channels 14, 14' of the first and second input signals 2,3, respectively, which are dispersed off respective diffraction gratings 24,54 and focused by bulk lens 28,52 respectively, onto the array of micro-mirrors 84 of the micro-mirror device 82. Each channel 14,14' is distinctly separated from other channels across the spectrum and have a generally circular cross-section, such that the optical channels do not substantially overlap spatially when focused onto the spatial light modulator 30. The optical channels have a circular cross-section to project as much of the beam as possible over a multitude of micro-mirrors 84, while keeping the optical channels separated by a predetermined spacing. One will appreciate though that the diffraction gratings 24, 54 and bulk lens 28, 52 may be designed to reflect and focus any optical channel or group of optical channels with any desired cross-sectional geometry, such as elliptical, rectangular, square, polygonal, etc. Regardless of the cross-sectional geometry selected, the cross-sectional area of the channels 14 should illuminate a plurality of micro-mirrors 84, which effectively pixelates the optical channels. In an exemplary embodiment, the cross sectional area of the optical channels 14, 14' is generally circular in shape, whereby the width of the optical channel beam spans over approximately 11 micromirrors.

Figure 8:
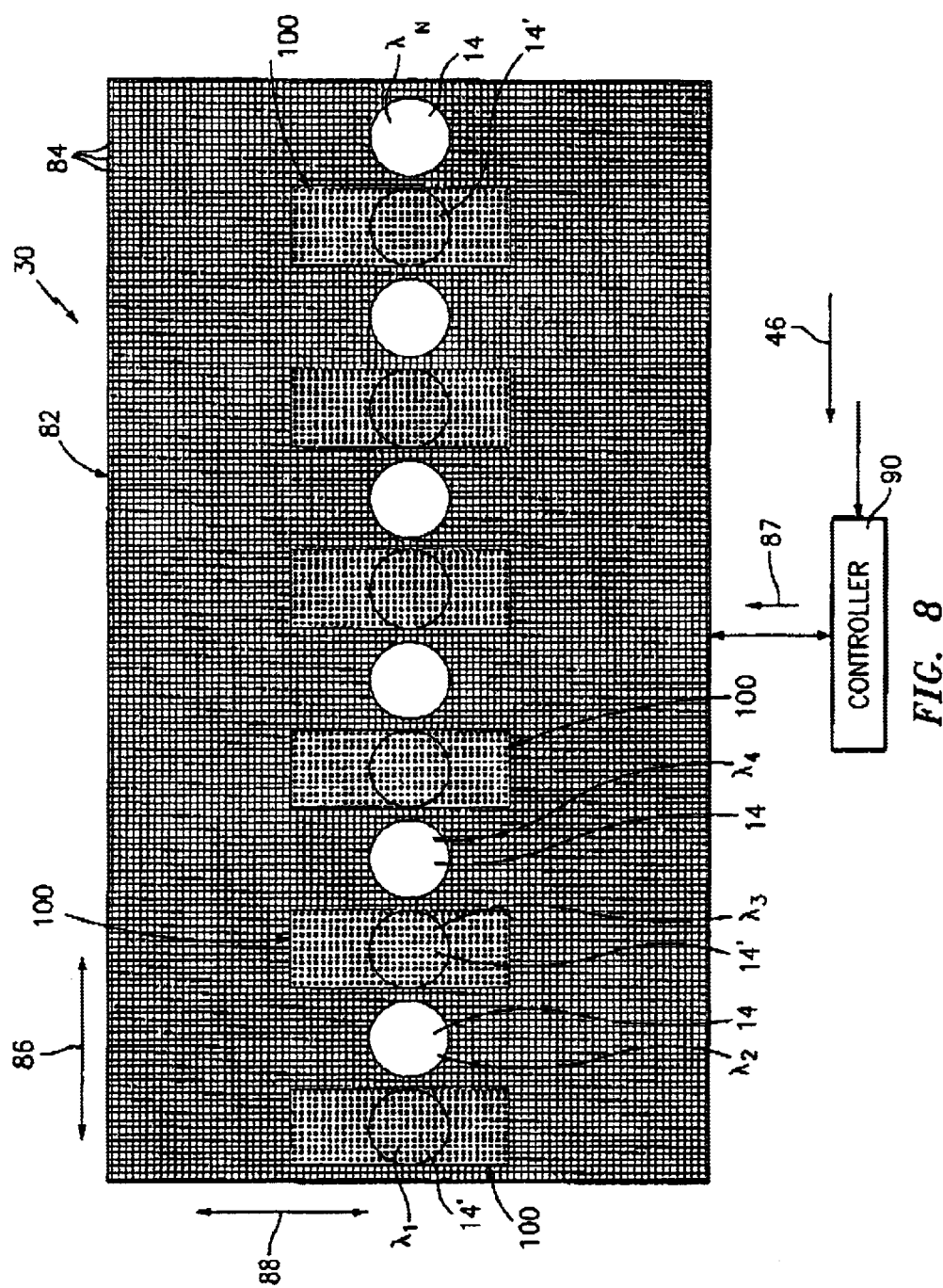
FIG. 8 is a block diagram of a spatial light modulator of the interleaver/deinterleaver device of FIG. 5, wherein six groups of micro-mirrors are tilted to redirect a respective optical channel of the WDM input signal, in accordance with the present invention.

FIG. 8 is illustrative of the position of the micro-mirrors 84 of the micro-mirror device 82 for combining the optical channels 14, 14' of the input signals 2, 3. The outline of each channel 14, 14' is shown to provide a reference to visually locate the groups of tilted mirrors 100. As shown, the groups of mirrors 100 associated with each respective optical channel 14' at $\lambda_1$, $\lambda_3$, $\lambda_5$, $\lambda_7$, $\lambda_9$, $\lambda_{11}$, of the second input signal 3 are tilted away from the return path to the second position, as indicated by the blackening of the micro-mirrors 84. Each group of tilted mirrors 100 provides a generally rectangular shape, but one will appreciate that any pattern or shape may be tilted to redirect an optical channel. In an exemplary embodiment, each group of micro-mirrors 100 reflects substantially all the light of each respective optical channel 14' and reflects substantially no light of any adjacent channels. The remaining micro-mirrors 84 reflects substantially all the light of each channel 14 at $\lambda_2$, $\lambda_4$, $\lambda_6$, $\lambda_8$, $\lambda_{12}$ are flat (i.e., first position), as indicated by the white micro-mirrors, to reflect the light 92 back along the return path to the first pigtail 20, as described hereinbefore.

FIG. 4 shows an alternative embodiment to the interleaver/de-interleaver shown in FIGS. 3 and 3A, wherein the micromirror device 30 is oriented so that the micromirrors 84 pivot or tilt on an axis 85' that is perpendicular to the spectral axis 86 as best shown in FIG. 5A. (As shown, the tilt axis 85' runs into and out of FIG. 5.) This embodiment is particularly important when implementing the chisel prism arrangement discussed below in relation to FIGS. 35–37. Similar elements in FIGS. 3, 3A and 4 are labelled with similar reference numerals.

Figure 9A:
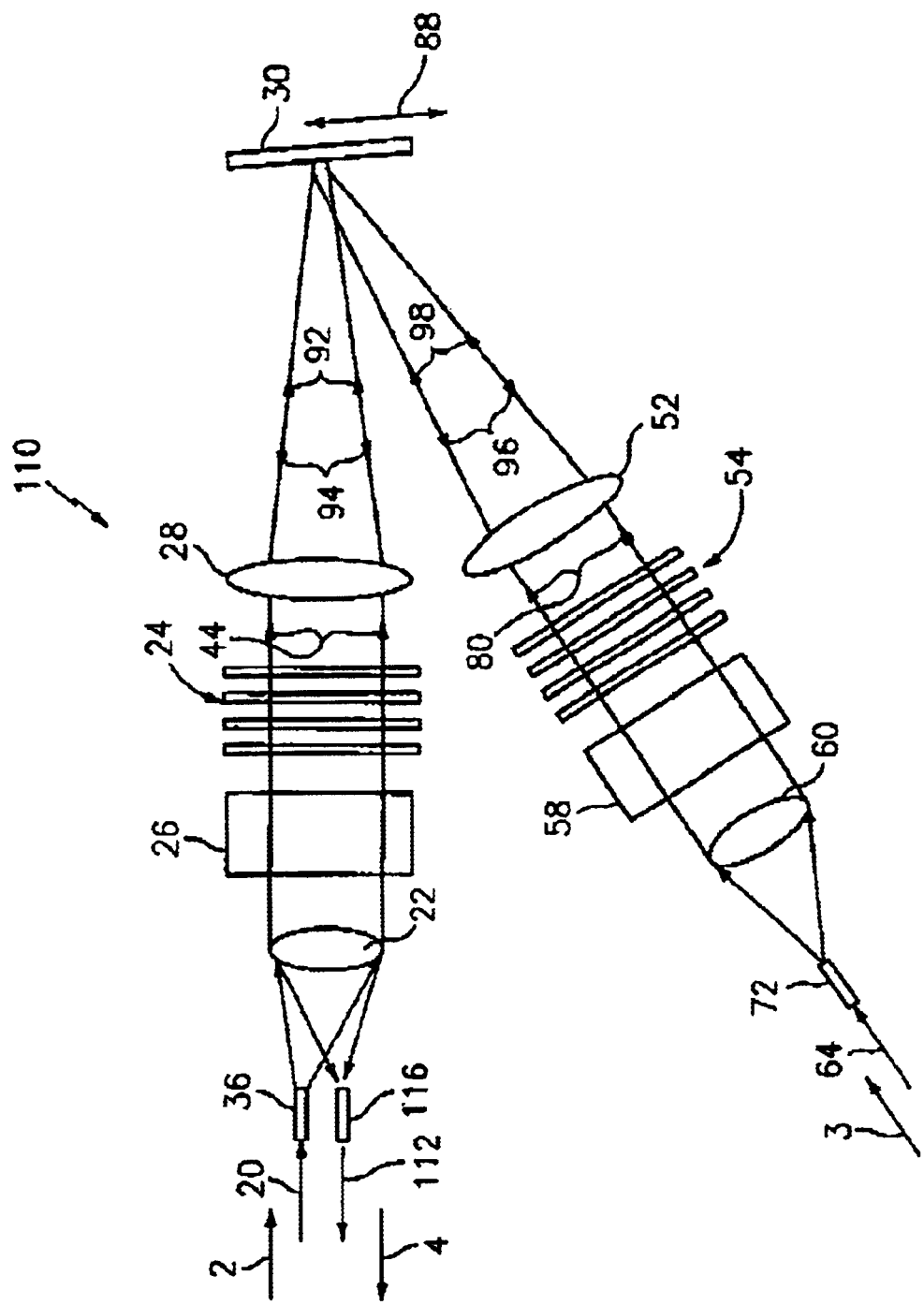
FIG. 9A is a block diagram of another embodiment of an interleaver/deinterleaver device including a spatial light modulator, in accordance with the present invention.
Figure 9B:
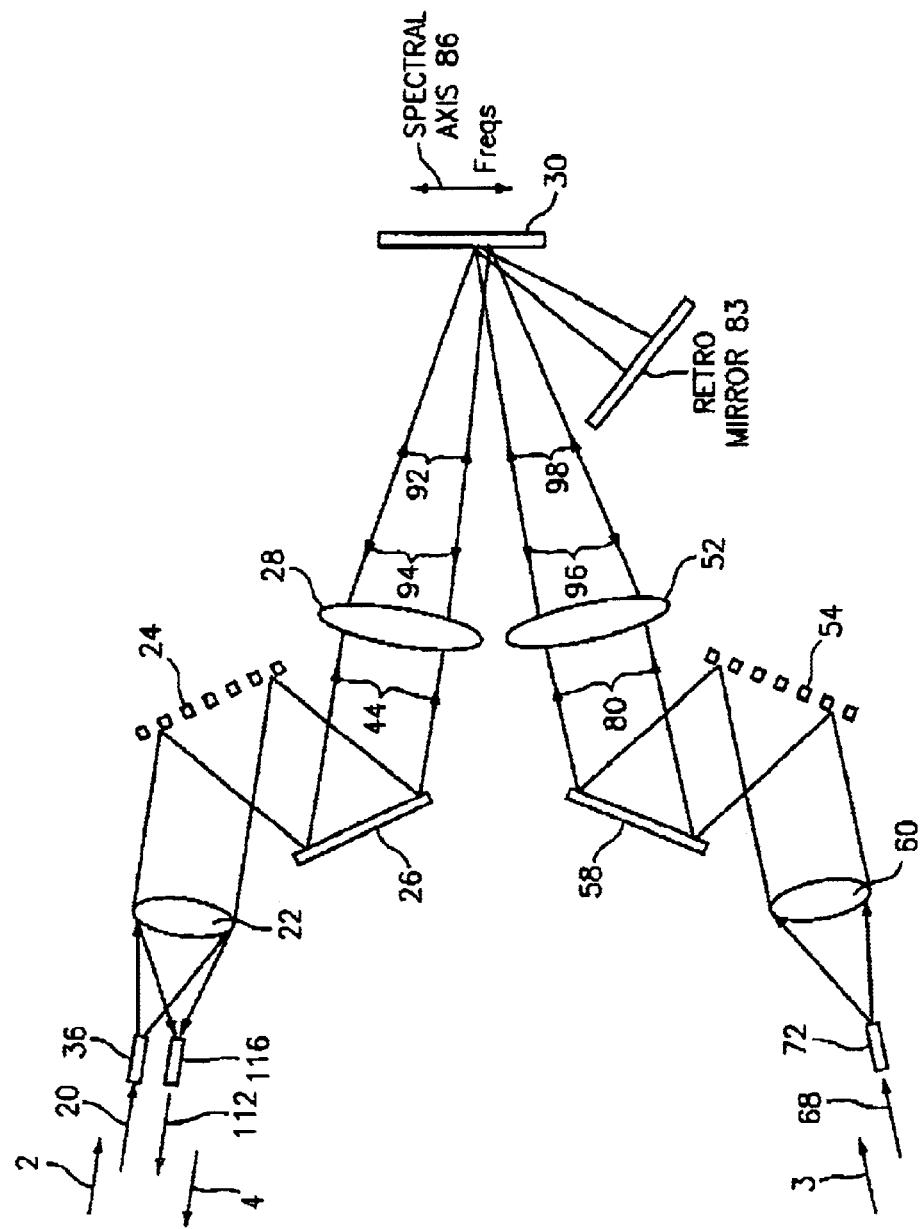
FIG. 9B is a-block diagram of another embodiment of an interleaver/de-interleaver in accordance with the present invention.
Figure 9C:
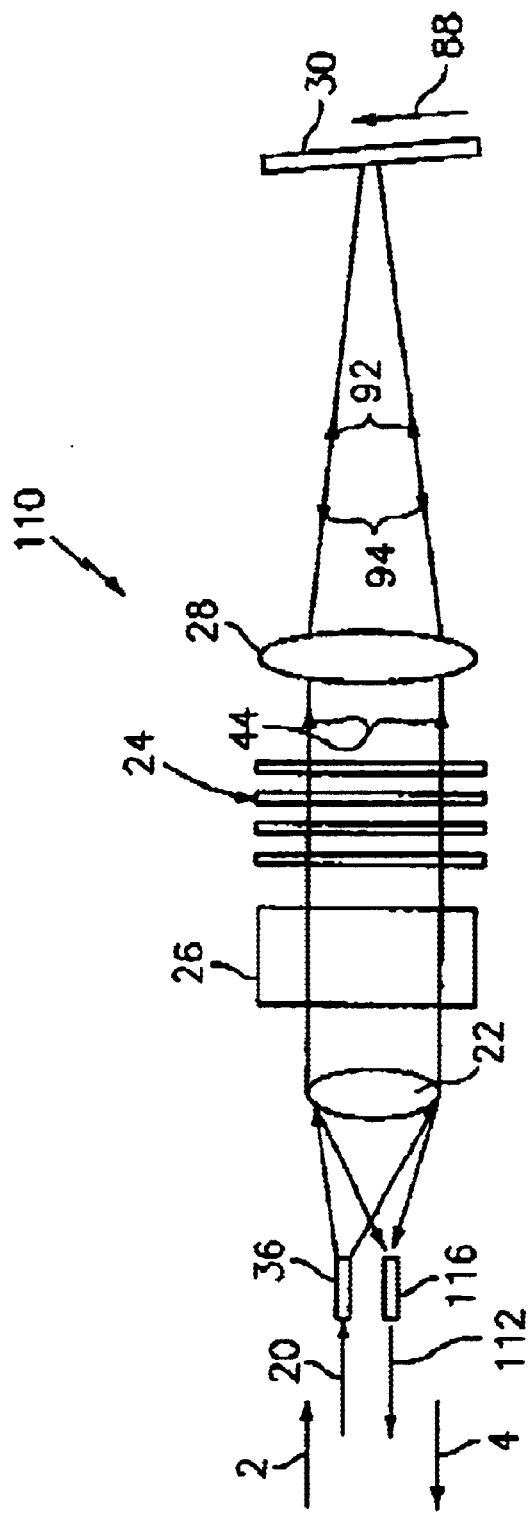
FIG. 9C is a block diagram of another embodiment of an interleaver/de-interleaver in accordance with the present invention.

FIGS. 9A–9C: Interleaver/De-Interleaver 110

FIG. 9A shows another exemplary embodiment of an interleaver device generally indicated as 110 that is substantially similar to the interleaver device 10 of FIG. 3, and therefore, common components have the same reference numeral. The interleaver device 110 replaces the circulator 18 of FIG. 3 with a third pigtail 112. The pigtail 112 has a glass capillary tube 116 attached to one end of the pigtail. The pigtail 112 receives the optical channels 14,14' reflected from the micro-mirror device back along another optical path.

To accomplish this expected return path, the spatial light modulator 30 cannot be an image plane of the first pigtail 20 along the spatial axis 88. These conditions can be established by ensuring that the lens system 22 and 28 be astigmatic. In particular, the lens 28 may be a cylindricalized lens with its cylindrical axis parallel to the spatial axis 88. By tilting the spatial light modulator 30, the return path can be displaced to focus at pigtail 112.

FIGS. 9B and 9C show alternative embodiments to that shown in FIG. 9A, wherein the DMD device 30 is oriented so that the micro-mirrors 84 tilt on the spatial axis 85' that is perpendicular to the spectral axis 86 as best shown in FIG. 5A. (As shown, the tilt axis 85' runs into and out of the FIGS. 9B and 9C. These embodiments are particularly important when implementing the chisel prism arrangement discussed below in relation to FIGS. 35–37. Similar elements in FIGS. 9A, 9B and 9C are labelled with similar reference numerals.

FIGS. 10–17: Interleaver/De-Interleaver 170

Figure 10:
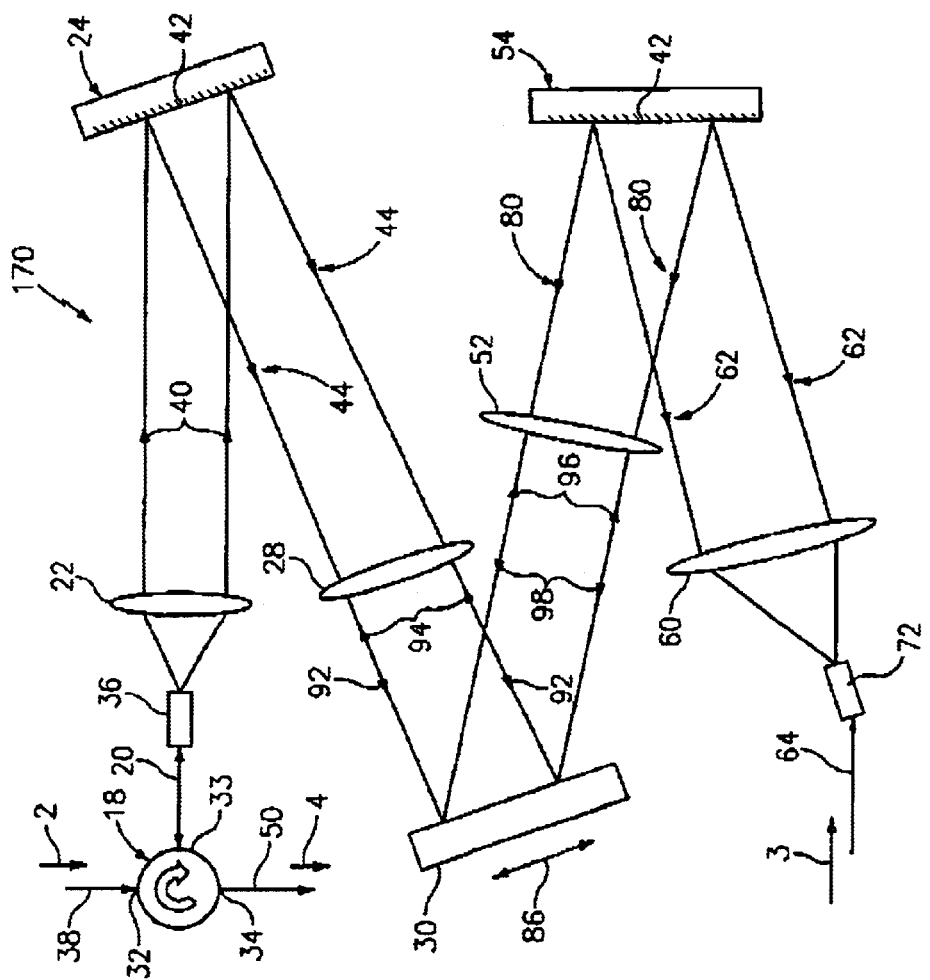
FIG. 10 is a block diagram of another embodiment of an interleaver/deinterleaver device including a spatial light modulator, in accordance with the present invention.

FIG. 10 illustrates another embodiment of an interleaver device 170 in accordance with the present invention, which is similar to the interleaver device 10 of FIG. 3, and therefore similar components have the same reference numerals. The interleaver device 170 is substantially the same as the interleaver device depicted in FIG. 3, except the optical components of the interleaver device 170 are disposed in one horizontal plane, rather than two tiers or planes, as shown in FIG. 3A. Rather than using a mirror 26,58 (in FIGS. 3 and 3A) to direct the dispersed light 44,80 to the bulk lens 28,52 and the spatial light modulator 30, the diffraction gratings 24,54 are tilted to directly disperse the light onto bulk lens which focuses the light onto the spatial light modulator.

Figure 11:
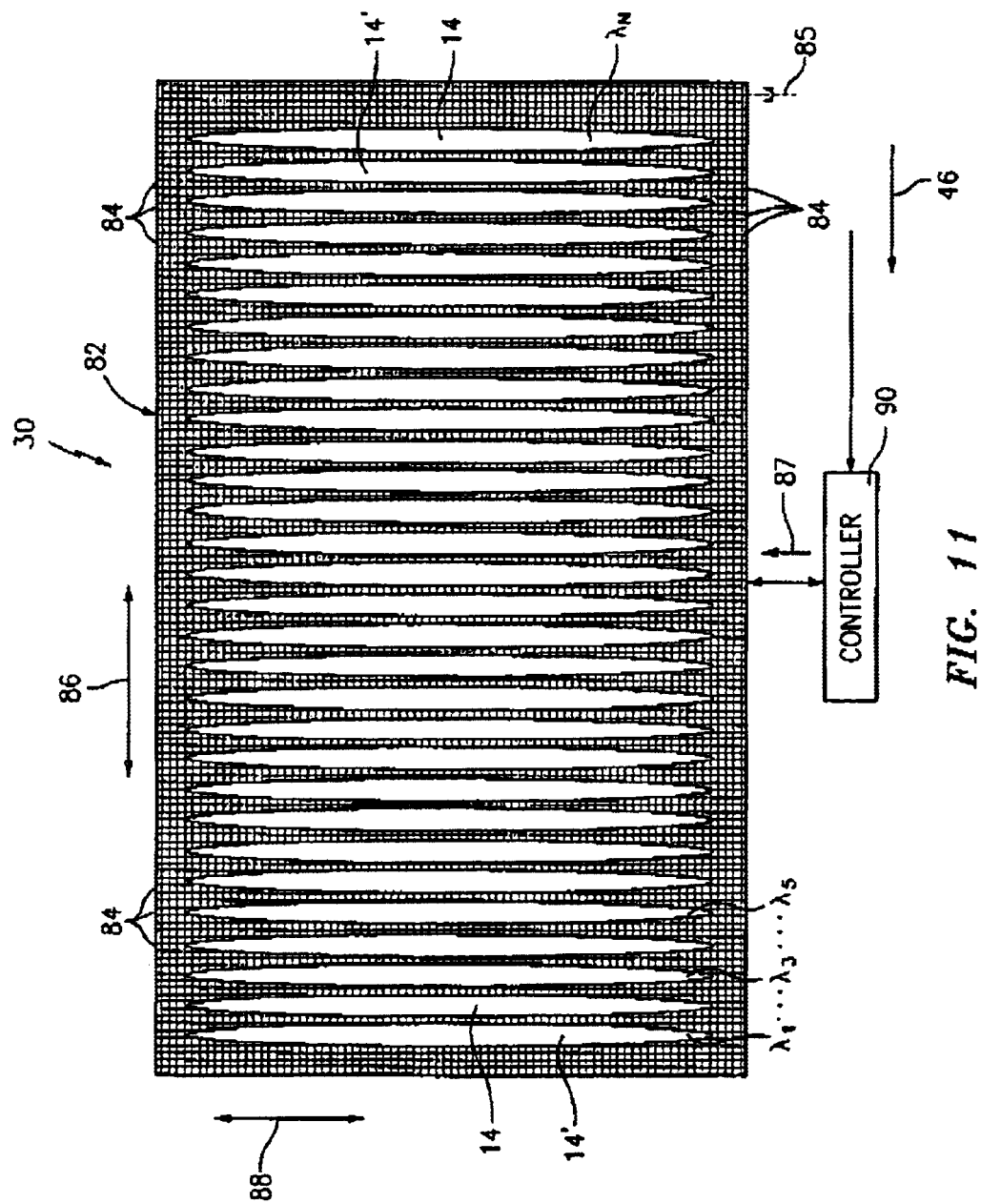
FIG. 11 is a block diagram of a spatial light modulator of the interleaver/deinterleaver device of FIG. 10 having a micro-mirror device, wherein the optical channels of a WDM input signal are distinctly projected onto the micro-mirror device, in accordance with the present invention.

Functionally, the interleaver device 170 of FIG. 10 and interleaver device 10 of FIG. 3 are substantially the same. For illustrative purposes however, the diffraction gratings 24, 54 and the bulk lens 28,52 of the interleaver device 170 are different to provide dispersed optical channels 14,14' incident on the micro-mirror device 82 having a substantially elliptical cross-section, as shown in FIG. 11. Further, the diffraction gratings are rotated approximately 90 degrees such that the spectral axis 86 of the optical channels 14,14' is parallel to the horizontal plane, and the micro-mirror device 82 is similarly rotated approximately 90 degrees such that the spectral axis 86 of the optical channels 14,14' is perpendicular to the tilt axis 85 of the micro-mirrors 84.

Figure 12:
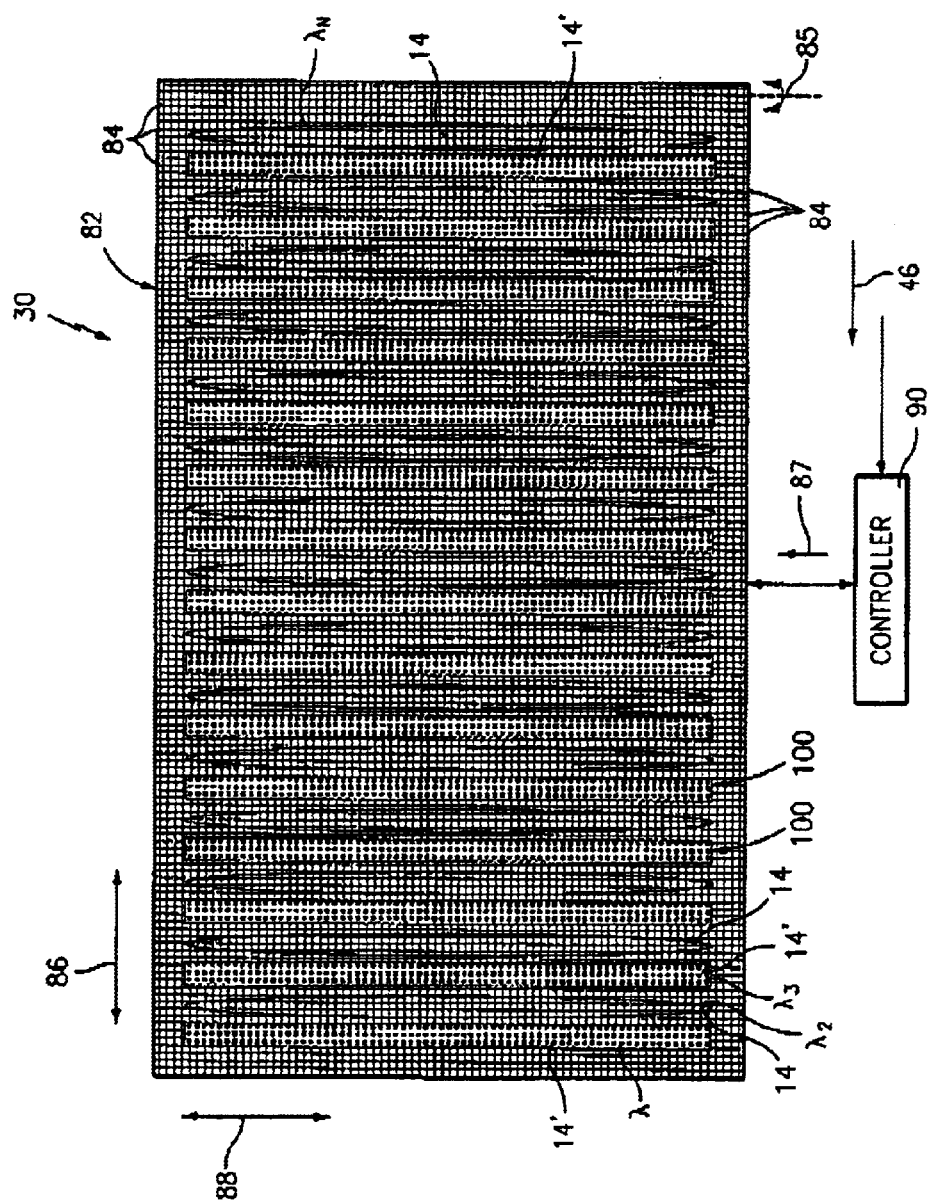
FIG. 12 is a block diagram of a spatial light modulator of the interleaver/deinterleaver device of FIG. 10, wherein groups of micro-mirrors are tilted to redirect a respective optical channel of the WDM input signal, in accordance with the present invention.

FIG. 12 is illustrative of the position of the micro-mirrors 84 of the micro-mirror device 82 for combining the optical channels 14,14' of the input signals 2,3. The outline of each channel 14,14' is shown to provide a reference to visually locate the groups of tilted mirrors 100. As shown, the group of mirrors 100 associated with each optical channel 14' at $\lambda_1$, $\lambda_3$, $\lambda_5$, $\lambda_7$, etc. are tilted away from the return path to the second position, as indicated by the blackening of the micro-mirrors 84. Each group of tilted mirrors 100 provides a generally rectangular shape. In an exemplary embodiment, the group of micro-mirrors 100 reflects substantially all the light of each respective optical channel 14' and reflects substantially no light of any adjacent channels. The remaining micro-mirrors 84 reflects substantially all the light of each channel 14 at $\lambda_2$, $\lambda_4\lambda_6$, $\lambda_8$, etc. are flat (i.e., first position), as indicated by the white micro-mirrors, to reflect the light 92 back along the return path to the first pigtail 20, as described hereinbefore.

The micro-mirror device 82 of FIGS. 3–5 is similar to the Digital Micromirror Device™ (DMD™) manufactured by Texas Instruments and described in the white paper entitled "Digital Light Processing™ for High-Brightness, High-Resolution Applications", white paper entitled "Lifetime Estimates and Unique Failure Mechanisms of the Digital Micromirror Device (DMD)", and news release dated September 1994 entitled "Digital Micromirror Display Delivering On Promises of 'Brighter' Future for Imaging Applications", which are incorporated herein by reference.

Figure 13:
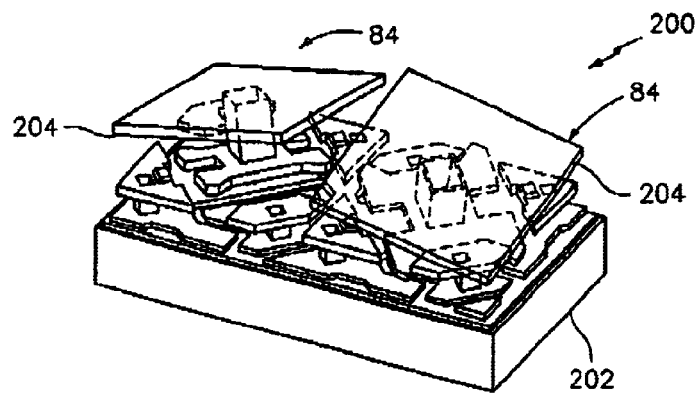
FIG. 13 is a perspective view of a portion of a known micro-mirror device.
Figure 14:
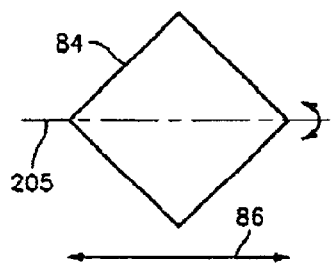
FIG. 14 is a plan view of a micro-mirror of the micro-mirror device of FIG. 13.

FIGS. 13–14: Micro-Mirror Device 200

FIG. 13 illustrates a pair of micro-mirrors 84 of a micromirror device 200 manufactured by Texas Instruments, namely a digital micromirror device (DMD™). The micromirror device 200 is monolithically fabricated by CMOS-like processes over a CMOS memory 202. Each micromirror 84 includes an aluminum mirror 204, 16 um square, that can reflect light in one of two directions, depending on the state of the underlying memory cell 202. Rotation, flipping or tilting of the mirror 204 is accomplished through electrostatic attraction produced by voltage differences between the mirror and the underlying memory cell. With the memory cell 202 in the on (1) state, the mirror 204 rotates or tilts approximately +10 degrees. With the memory cell in the off (0) state, the mirror tilts approximately –10, degrees. As shown in FIG. 14, the micro-mirrors 84 flip about an axis 205.

Figure 15A:
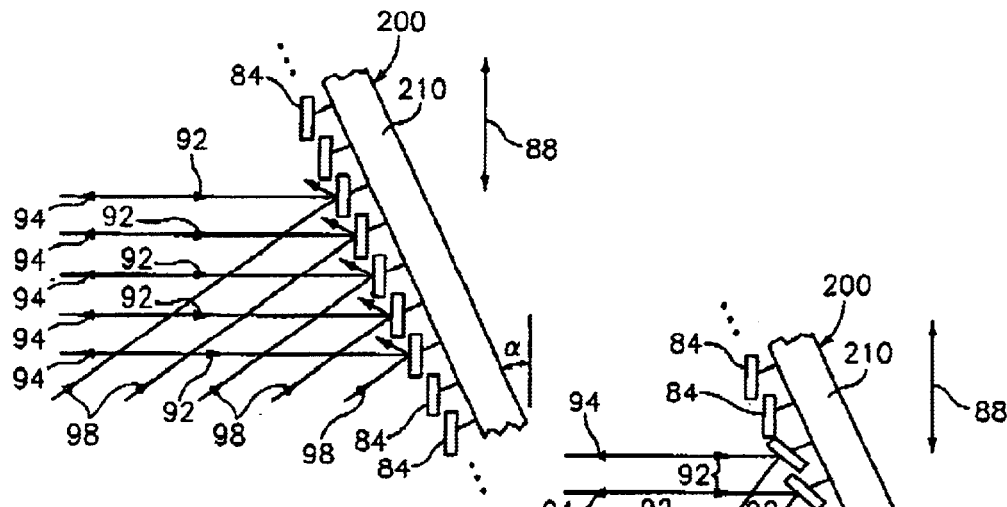
FIG. 15a is a pictorial cross-sectional view of the micro-mirror device of FIG. 13 showing a partial row of micro-mirrors, when the micro-mirrors are disposed in a second position non-orthogonal to the light beam of the input signal in accordance with the present invention.
Figure 15B:
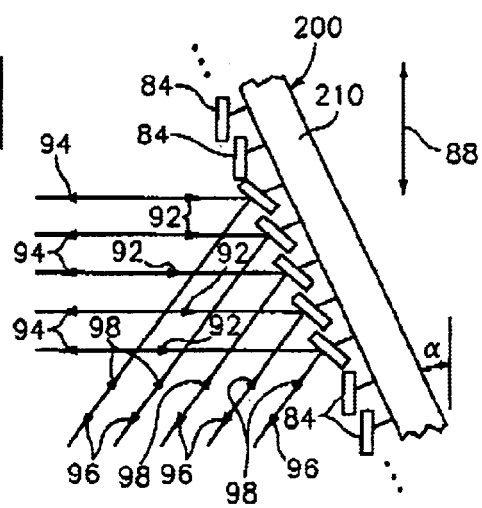
FIG. 15b is a pictorial cross-sectional view of the micro-mirror device of FIG. 13 showing a partial row of micro-mirrors, when the micro-mirrors are disposed in a first position perpendicular to the light beam of the input signal in accordance with the present invention.

FIGS. 15a and 15b illustrate the orientation of a micromirror device 200 similar to that shown in FIG. 14, wherein neither the first or second position (i.e., on or off state) of the micro-mirrors 84 is parallel to the base or substrate 210 of the micromirror device 200, as shown in FIGS. 6a and 6b. Consequently as shown in FIG. 15a, the base 210 of the micro-mirror device 200 is mounted at a non-orthogonal angle á relative to the collimated light 83 to position the micro-mirrors 84, which are disposed at the first position, perpendicular to the collimated light 44, so that the light reflected off the micro-mirrors in the first position reflect substantially back through the return path, as indicated by arrows 94, to provide the output signal 4 at optical fiber 50. Consequently, the tilt angle of the mirror between the horizontal position and the first position (e.g., 10 degrees) is approximately equal to the angle á of the micro-mirror device. FIG. 15b is illustrative of the micro-mirror device 200 when the micro-mirrors 84 are disposed in the second position to provide channels 14' to the output signal 4 at optical fiber 50.

Figure 16:
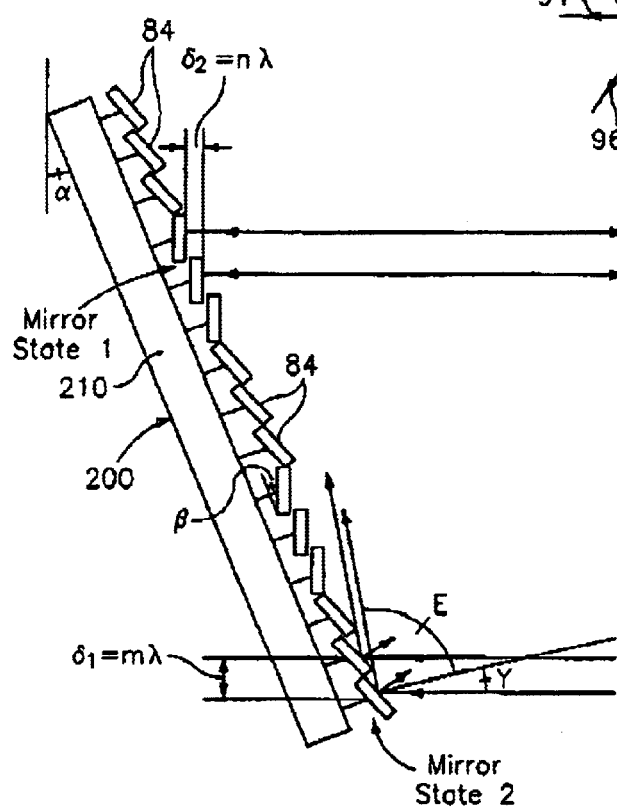
FIG. 16 is a pictorial cross-sectional view of the micro-mirror device of FIG. 13 disposed at a predetermined angle in accordance with the present invention.

In using the micro-mirror array device 200, it is important that the reflection from each micro-mirror 84 adds coherently in the far-field, so the angle á to which the micro-mirror device 200 is tilted has a very strong influence on the overall efficiency of the device. FIG. 16 illustrates the phase condition of the micro-mirrors in both states (i.e., State 1, State 2) for efficient reflection in either condition.

Figure 17:
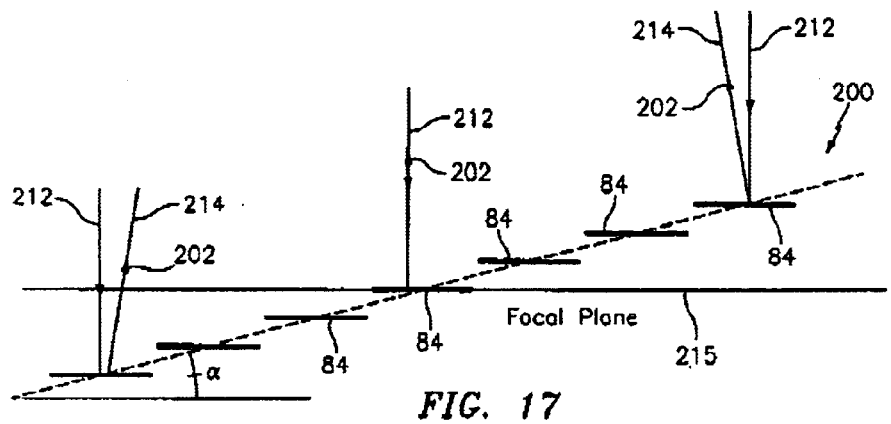
FIG. 17 is a graphical representation of the micro-mirror device of FIG. 16 showing the reflection of the incident light.

FIGS. 16–17: Phase Condition and Pixel Pitch

FIG. 16 illustrates the phase condition of the micro-mirrors in both states (i.e., State 1, State 2) for efficient reflection in either condition. In using the micro-mirror array device 200, it is important that the reflection from each micro-mirror 84 adds coherently in the far-field, so the angle α to which the micro-mirror device 200 is tilted has a very strong influence on the overall efficiency of the device.

In an exemplary embodiment of the micro-mirror device 200 in FIG. 17, the effective pixel pitch ñ is about 19.4 um (see FIG. 20), so for a mirror tilt angle â of 9.2 degrees, the array is effectively blazed for Littrow operation in the n=+2 order for the position indicated as Mirror State 1 in FIG. 18 (i.e., first position). For Mirror State 2, the incident angle á on the micro-mirror device 200 is now 9.2 degrees and the exit angle á from the array is 27.6 degrees. Using these numbers, the micro-mirror device is nearly blazed for fourth-order for mirrors in Mirror State 2.

FIG. 17 graphically illustrates the micro-mirror device 200 wherein the micro-mirrors 84 are disposed in the retro-reflective operation (i.e., first position), such that the incident light reflects back along the return path, as indicated by arrows 202. For retro-reflective operation, the micro-mirror device 200 acts as a blazed grating held in a "Littrow" configuration, as shown in FIG. 3, with the blaze angle equal to the mirror tilt "á" (e.g., 10 degrees). The grating equation provides a relationship between the light beam angle of incidence, $\theta_i$; angle of reflection, $\theta_m$; the pitch of the micro-mirror array; the mirror tilt; and the wavelength of the incident light. Because the wavelength varies across the micro-mirror array for parallel input beams, the angle of reflection of the beams varies across the apparatus. Introducing the micro-mirror device 200 at the focal plane 215 implements the critical device feature of providing separately addressable groups of mirrors to reflect different wavelength components of the beam. Because of the above reflection characteristics of the micro-mirror device 200, the beam is reflected as from a curved concave mirror surface, as shown in FIG. 18 with the micro-mirror device 200 in the focal plane 215. Consequently, when the micro-mirror device is oriented to retro-reflect at a wavelength hitting near the mirror center, wavelengths disposed away from the center are reflected toward the beam center as if the beam were reflected from a curved concave mirror. In other words, the micro-mirror device 200 reflects the incident light 212 reflecting off the central portion of the array of micro-mirrors directly back along the incident angle of the light, while the incident light 212 reflecting off the micro-mirrors disposed further away from the central portion of the array progressively direct the light inward at increasing angles of reflection, as indicated by 214.

FIGS. 18a, 18b

FIGS. 18a and 18b illustrate a technique to compensate for this diffraction effect introduced by the micromirror array, described hereinbefore.

FIG. 18a illustrates the case where a grating order causes the shorter wavelength light to hit a part of the micromirror array 100 that is closer than the section illuminated by the longer wavelengths. In this case the Fourier lens 34 is placed at a distance "d" from the grating 30 that is shorter than focal length "f" of the Fourier lens. For example, the distance "d" may be approximately 71 mm and the focal length may be approximately 82 mm. It may be advantageous to use this configuration if package size is limited, as this configuration minimizes the overall length of the optical train.

FIG. 18b illustrates the case where the grating order causes the longer wavelengths to hit a part of the micromirror array 100 that is closer than the section illuminated by the shorter wavelengths. In this case the Fourier lens is placed a distance "d" from the grating 30 that is longer than focal length "f" of the Fourier lens 34. This configuration may be advantageous to minimize the overall area illuminated by the dispersed spectrum on the micromirror array.

Figure 19:
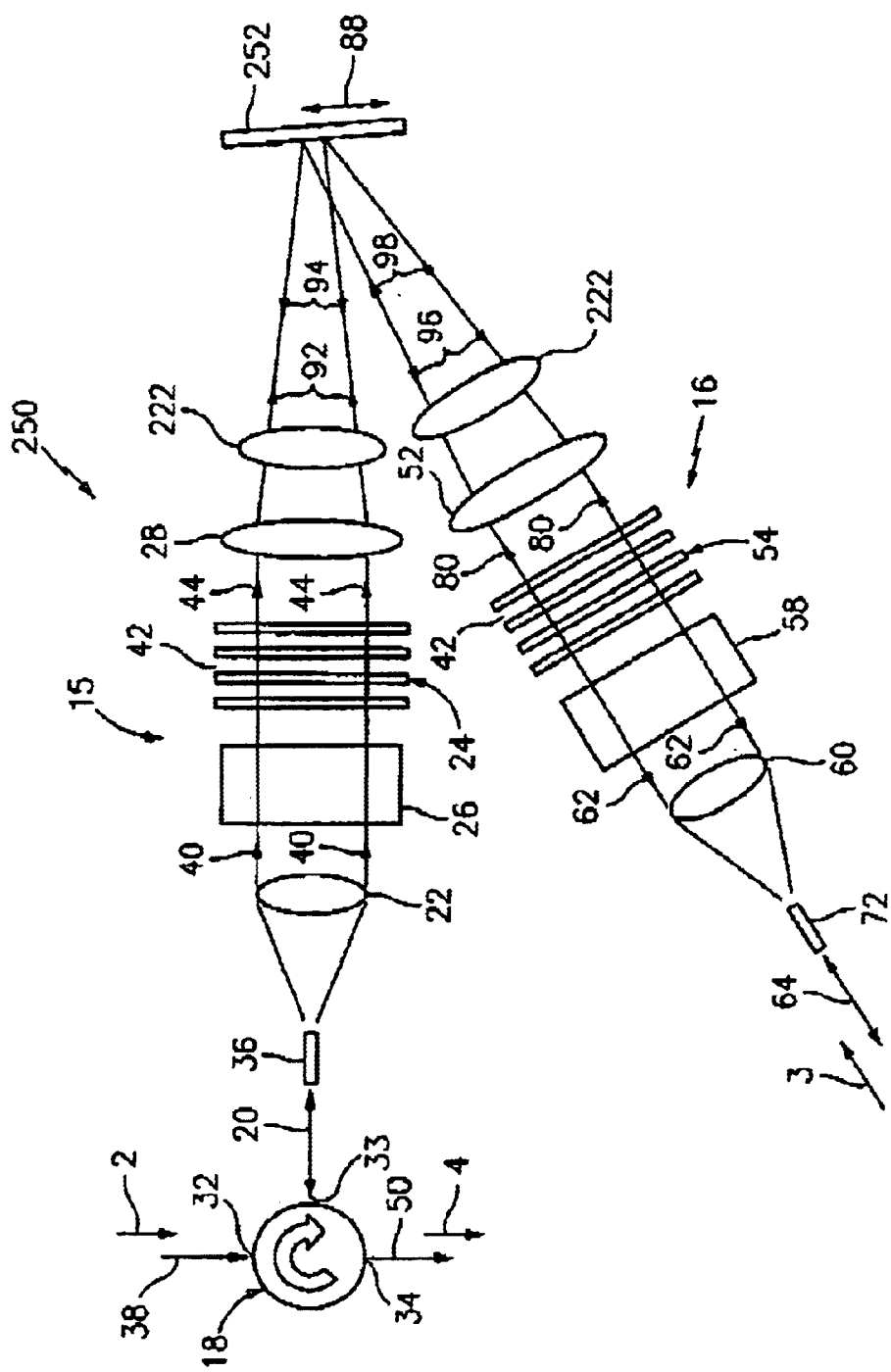
FIG. 19 is a plan view of a block diagram of another embodiment of an interleaver/deinterleaver device including a spatial light modulator in accordance with the present invention.

FIG. 19: Interleaver/De-Interleaver 250

FIG. 19 shows an exemplary embodiment of an interleaver device 250 that is similar to the interleaver device 10 of FIG. 3, and therefore similar components have the same reference numeral. In effect, the effective curvature of the micro-mirror device 200 is compensated for using a "field correction" lens 222. The interleaver device 250 includes a field correction lens 222 disposed optically between respective bulk lens 28,52 and the spatial light modulator 252, which includes micro-mirror device 200. The "field correction" lens 222 respectively compensate for the channels reflecting off the spatial light modulator 252.

Figure 19A:
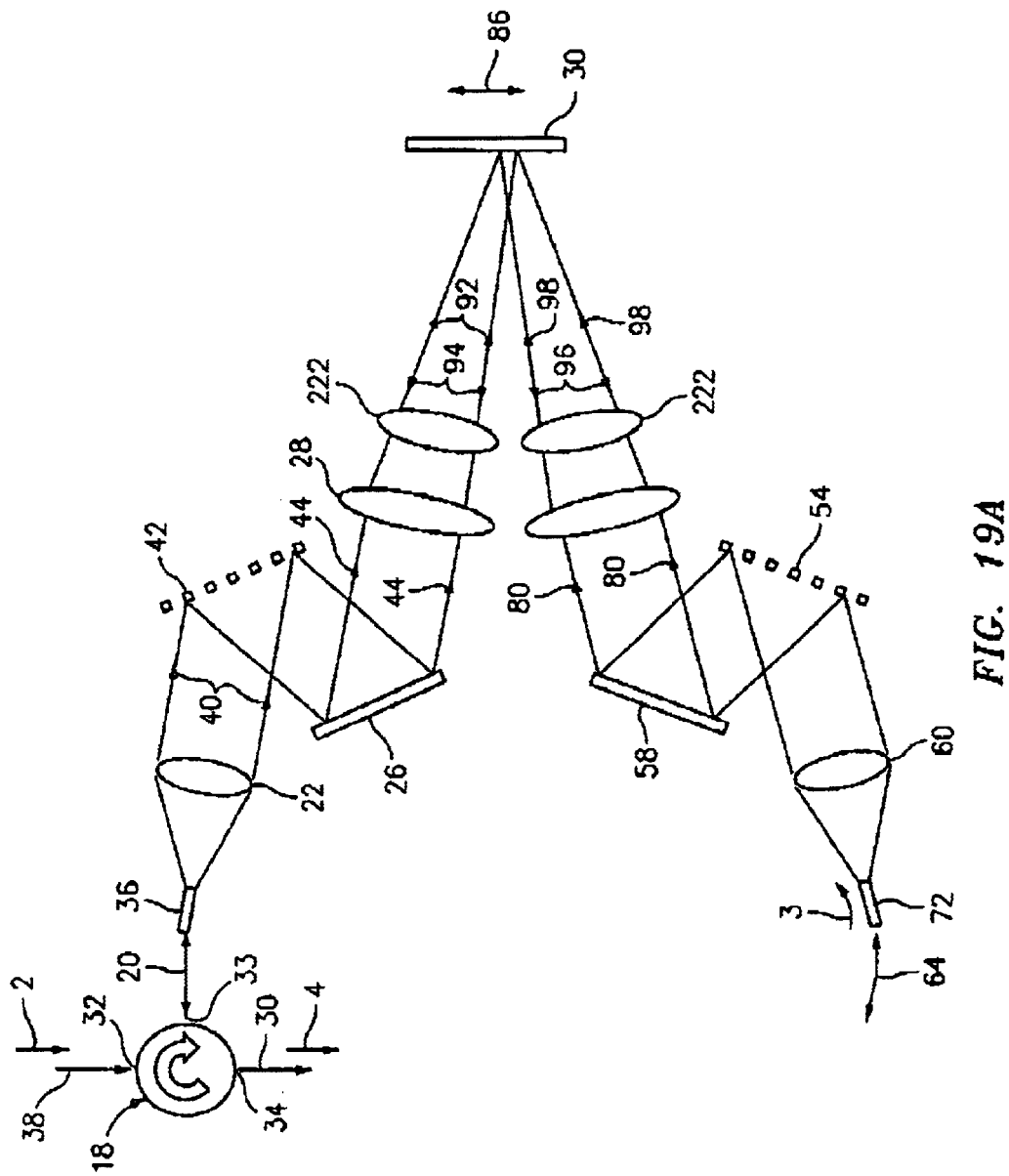
FIG. 19A is a plan view of a block diagram of another embodiment of an interleaver/de-interleaver in accordance with the present invention.

FIG. 19A shows an alternative embodiment to that shown in FIG. 19, wherein the DMD device 30 is oriented so that the mirrors 84 tilt on a spatial axis 85' that is perpendicular to the spectral axis 86 as best shown in FIG. 5A. (As shown, the spatial axis 85' runs into and out of FIG. 19A.) This embodiment is particularly important when implementing the chisel prism arrangement discussed below in relation to FIGS. 35–37. Similar elements in FIGS. 19 and 19A are labelled with similar reference numerals.

Figure 20:
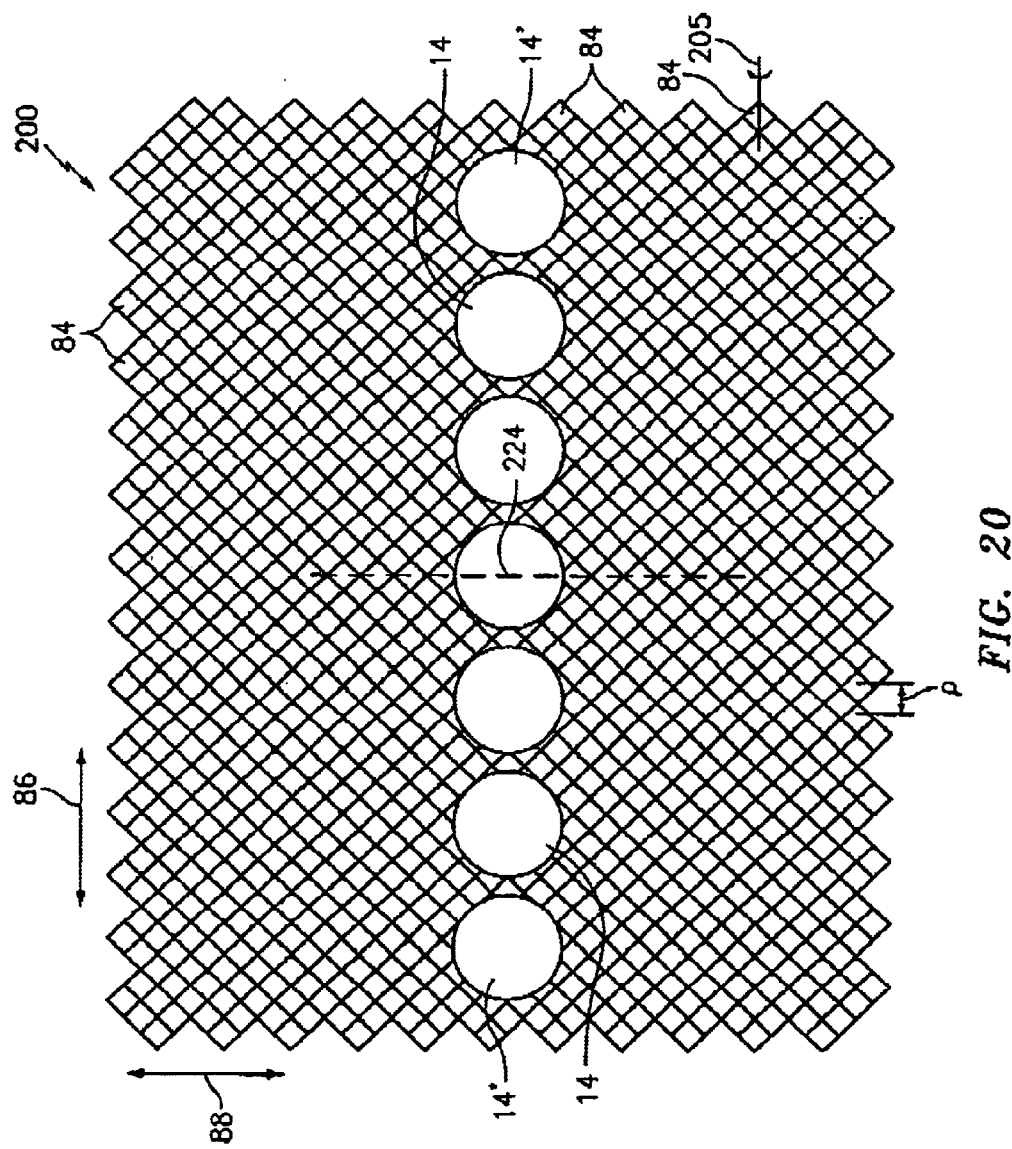
FIG. 20 is an expanded view of the micro-mirror device of the spatial light modulator of FIG. 19, wherein the optical channels of a WDM input signal are distinctly projected onto the micro-mirror device, in accordance with the present invention.

FIG. 20: 45° Rotation of Micro-Mirror Device

As described hereinbefore, the micro-mirrors 84 of the micro-mirror device 200 flip about a diagonal axis 205 as shown in FIGS. 14 and 20. In an exemplary embodiment of the present invention shown in FIG. 20, the optical input channels 14,14' are focused on the micro-mirror device 200 such that the spectral axis 86 of the optical channels 14,14' is parallel to the tilt axis 205 of the micro-mirrors. This configuration is achieved by rotating the micro-mirror device 45 degrees compared to the configuration shown in FIG. 5.

Alternatively, the optical channels 14, 14' may be focused such that the spectral axis 86 of the channels are perpendicular to tilt axis 205 of the micro-mirrors similar to that shown in FIGS. 10 and 11. Further, one will appreciate that the orientation of the tilt axis 205 and the spectral axis 86 may be at any angle.

Figure 22:
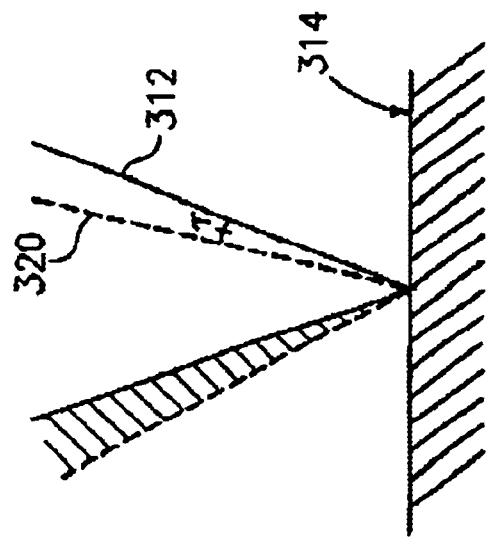
FIG. 22 is a graphical representation of the light of an optical channel reflecting off a spatial light modulator, wherein the light is focused relatively loose compared to that shown in FIG. 18, in accordance with the present invention.
Figure 21:
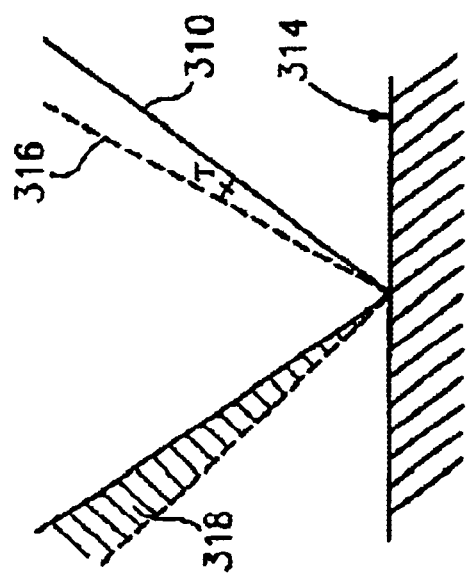
FIG. 21 is a graphical representation of the light of an optical channel reflecting off a spatial light modulator, wherein the light is focused relatively tight, in accordance with the present invention.

FIGS. 21–22: Ringing of Mirror During Transition

FIGS. 21 and 22 illustrate the effect of the ringing of micro-mirrors during their transition.

In the operation of the micro-mirror device 200 manufactured by Texas Instruments, described hereinbefore, all the micro-mirrors 84 of the device 200 release when any of the micro-mirrors are flipped from one position to the other.

In other words, each of the mirrors will momentarily tilt towards the horizontal position upon a position change of any of the micro-mirrors. Consequently, this momentary tilt of the micro-mirrors 84 creates a ringing or flicker in the light reflecting off the micro-mirrors. To reduce or eliminate the effect of the ringing of the light during the transition of the micro-mirrors 84, the light is focused tightly on the micro-mirror device 200. FIGS. 21 and 22 illustrate the effect of the ringing of micro-mirrors during their transition. Both FIGS. 21 and 22 show an incident light beam 310, 312, respectively, reflecting off a mirror surface at different focal lengths. The light beam 310 of FIG. 22 has a relatively short focal length, and therefore has a relatively wide beam width. When the micro-mirror surface 314 momentarily tilts or rings a predetermined angle ô, the reflected beam 316, shown in dashed lines, reflects off the mirror surface at the angle ô. The shaded portion 318 is illustrative of the lost light due to the momentary ringing, which represents a relatively small portion of the incident light 310. In contrast, the light beam 312 of FIG. 22 has a relatively long focal length, and therefore has a relatively narrow beam width. When the micro-mirror surface 314 momentarily tilts or rings a predetermined angle ô, the reflected beam 320, shown in dashed lines, reflects off the mirror surface at the angle ô. The shaded portion 322 is illustrative of the lost light due to the momentary ringing, which represents a greater portion of the incident light 312, than the lost light of the incident light of FIG. 21. Consequently, the sensitivity of the momentary tilt of the micro-mirrors is minimized by tightly focusing the optical channels on the micro-mirror device 200. Advantageously, tightly focusing of the optical channels also reduces the tilt sensitivity of the micro-mirror device due to other factors, such as thermal changes, shock and vibration.

FIGS. 23–26b: Interleaver/De-Interleaver 350

Referring to FIGS. 23–26b, another exemplary embodiment of an interleaver device 350 is shown that is similar to the interleaver device 10 of FIG. 3 having a micro-mirror device 200 of the spatial light modulator 300, and therefore, similar components have the same reference numerals. The interleaver device 350 directs both the first and second input signals 2,3 through a set of common optical components. To better understand the interleaver device 350, a side elevational view of the input optical components 18,20 and the common optical components 22, 24, 26, 28, 300 are illustrated in FIG. 24.

In FIG. 24, the optical components are disposed in two tiers or horizontal planes. Specifically, the three-port circulator 18, the first pigtail 20, the collimator 22 and the diffraction grating 24 are disposed in a first tier or horizontal plane. As will be appreciated, the second circulator 66 and the second pigtail 64 are disposed in the first tier. The mirror 26, the bulk lens 28 and the spatial light modulator 200 are disposed in the second tier or horizontal plane. Further, the mirrors 352, 354 and the lens 356, 358 of FIG. 23 are disposed in the second tier.

Figure 25:
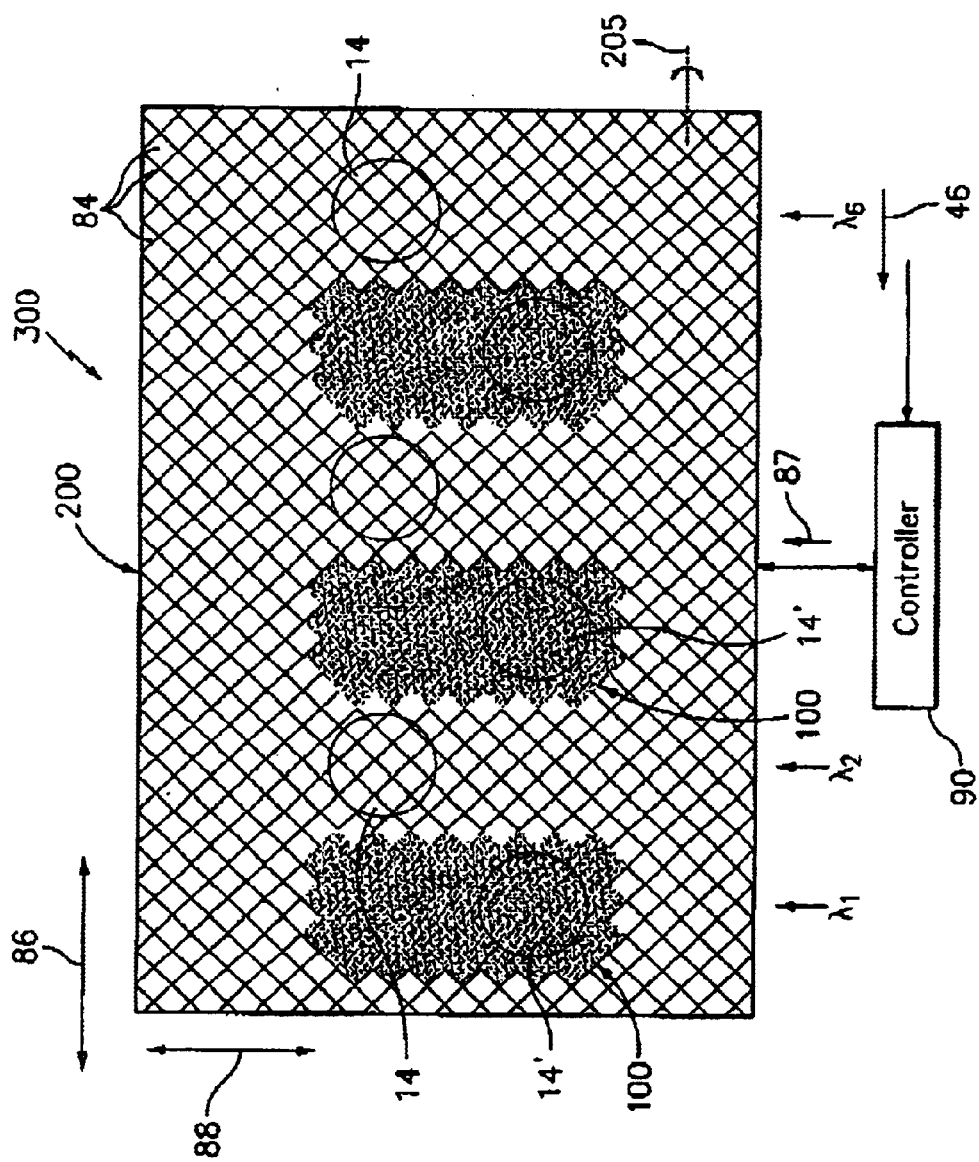
FIG. 25 is a block diagram of a spatial light modulator of the interleaver/deinterleaver device of FIG. 23 having a micro-mirror device, wherein the optical channels of a WDM input signal are distinctly projected onto the micro-mirror device, in accordance with the present invention.

In FIGS. 23 and 24, the first circulator 18 directs the input signal 12 from the optical fiber 38 to the first pigtail 20. The input signal 12 exits the first pigtail (into free space) and passes through the collimator 22, which collimates the input signal. The collimated input signal 40 is incident on the diffraction grating 24, which separates spatially the optical input channels 19 of the collimated input signal 40 by diffracting or dispersing the light from the diffraction grating. As best shown in FIG. 24, the diffraction grating 24 directs the separated light 44 to the mirror 26 disposed in the second tier. The mirror 26 reflects the separated light 44 to the bulk lens 28 (e.g., a Fourier lens), which focuses the separated light onto the micro-mirror device 200 of the spatial light modulator 300, as shown in FIG. 25. In response to a switching algorithm and input command 46, the micro-mirror device 200 of the spatial light modulator 300 selectively reflects each optical input channel 14 in one of two optical paths 360,362 away from the bulk lens 28 through a pair of respective focusing lens 356,358 to corresponding mirrors 352,354.

The input channels 14 of the first optical signal 2 directed along the optical path 360 reflect back to the first pigtail 20 to provide the output signal 4 at optical fiber 50, while the light directed along the optical path 362 are redirected to the second optical pigtail 64. An optical isolator 379 is coupled to the second pigtail 64 to attenuate or block the light reflected back thereto.

Similarly, the optical channels 14' of the second input signal 3 propagates through the common optical components to the micro-mirror device 200 of the spatial light modulator 300, which reflects each input channel 14' in one of the two optical paths, as described hereinbefore. The channels 14' are directed along the optical path 360 reflect back to the first pigtail 20 to be combined with the output signal 4 at optical fiber 50, while the light directed along the optical path 362 is redirected to the second optical pigtail 64.

FIG. 25 illustrates the outline of the channels 14 of the first input signal 2 and channels 14' of the second input signal 3, which are dispersed off the diffraction grating 24 and focused by the bulk lens 28 onto the array of micro-mirrors 84 of the micro-mirror device 200. The input channels 14,14' are spectrally separated and have a generally circular cross-section, such that the optical channels 14,14' of each optical signal 2,3 do not substantially overlap spatially when focused onto the micro-mirror device 200. Further, the ends 36,72 are positioned (e.g., spatially spaced) such that the input channels 14,14' are initially focused onto different groups of mirrors. In other words, the spectrum of the input channels 14 and the spectrum of the input channels 14' are spaced spatially along the spatial axis 88.

Further, FIG. 25 is illustrative of the position of the micro-mirrors 84 of the micro-mirror device 200 for combining the optical channels 14,14' of the input signals 2,3. The outline of each channel 14,14' is shown to provide a reference to visually locate the groups of tilted mirrors 100. As shown, the group of mirrors 100 associated with each respective optical channel 14' at $\lambda_1, \lambda_3, \lambda_5$, $\lambda_5$ are tilted away from the incident light 92 to the second position (see FIG. 26), as indicated by the blackening of the micro-mirrors 84 to the mirror 354. Each group of tilted mirrors 100 provides a generally rectangular shape. In an exemplary embodiment, the group of micro-mirrors 100 reflects substantially all the light of each respective optical channel 14' and reflects substantially no light of any adjacent channels. The distance between the micro-mirror device and the mirror 354 is approximately two times the focal length (i.e., 2f), which causes the input channels 14' to switch spatially such that the input channels 14' reflect off the micro-mirror device to the first pigtail 20 to be combined with the output signal 4, while the other light reflects off the micro-mirror device 200 to the second pigtail 64.

Conversely, the micro-mirrors 84 of the other optical channels 14 at wavelengths of $\lambda_2, \lambda_4, \lambda_6$ are disposed in the first position, as indicated by the white micro-mirrors, to reflect the light 92 along the optical path 360 to the mirror 352. The distance between the micro-mirror device and the mirror 352 is approximately four times the focal length (i.e., 4f), which causes the input channel 14 to return to the same group of micro-mirrors 84 such that the input channel 14 reflects off the micro-mirror device 200 back to the first pigtail 20 to provide the output signal 4 at optical fiber 50, while the other light reflects off the micro-mirror device back to the second pigtail 64.

Figure 26B:
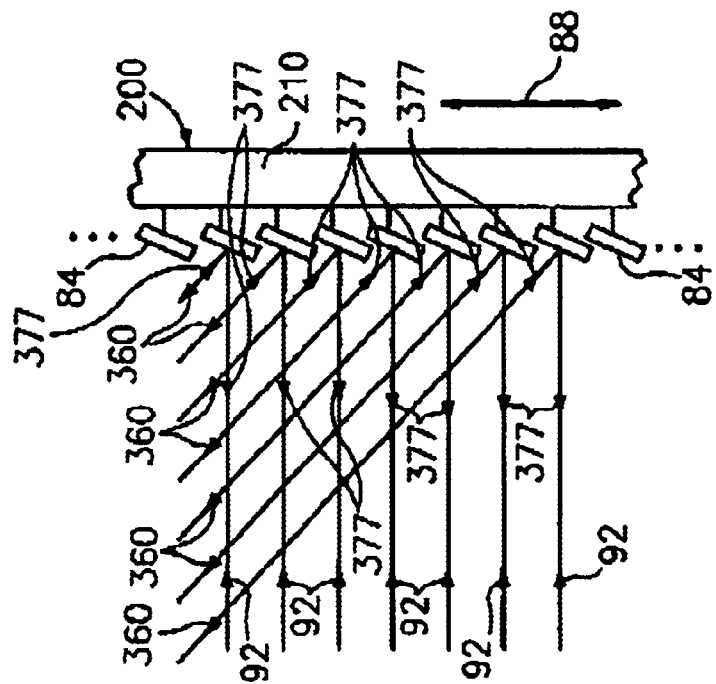
FIG. 26b is a pictorial cross-sectional view of the micro-mirror device of FIG. 13 showing a partial row of micro-mirrors, when the micro-mirrors are disposed in a second position, in accordance with the present invention.
Figure 26A:
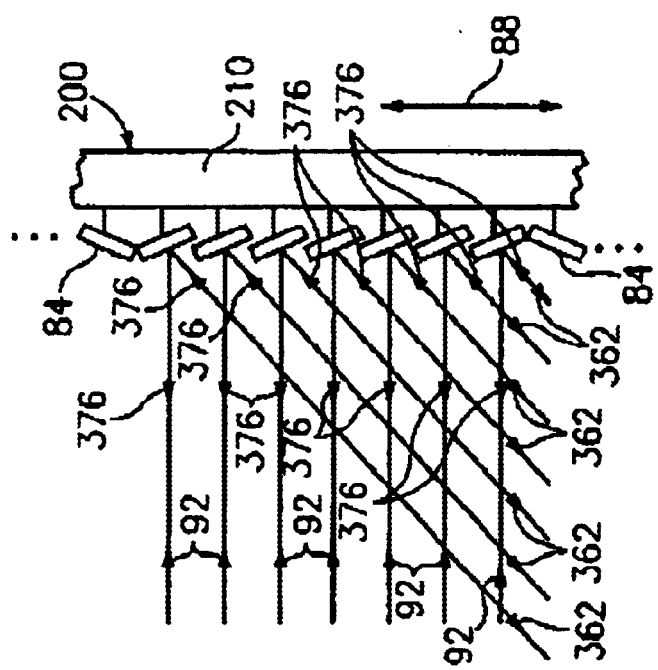
FIG. 26a is a pictorial cross-sectional view of the micro-mirror device of FIG. 13 showing a partial row of micro-mirrors, when the micro-mirrors are disposed in a first position, in accordance with the present invention.

As shown in FIG. 26a, the micro-mirror device 200 is oriented to reflect the focused light 92 of selected input channels 14,14' to mirror 354, as indicated-by arrows 362, which are then reflected back along corresponding optical paths 376, as described hereinbefore, when the micro-mirrors 84 are disposed in the second position. As shown in FIG. 26b, the focused light 92 of selected input channels 14,14' reflects off the micro-mirror device 200 to mirror 352, as indicated by arrows 360, which are then reflected back along the same optical paths, as described hereinbefore, when the micro-mirrors 84 are disposed in the first position.

Figure 27:
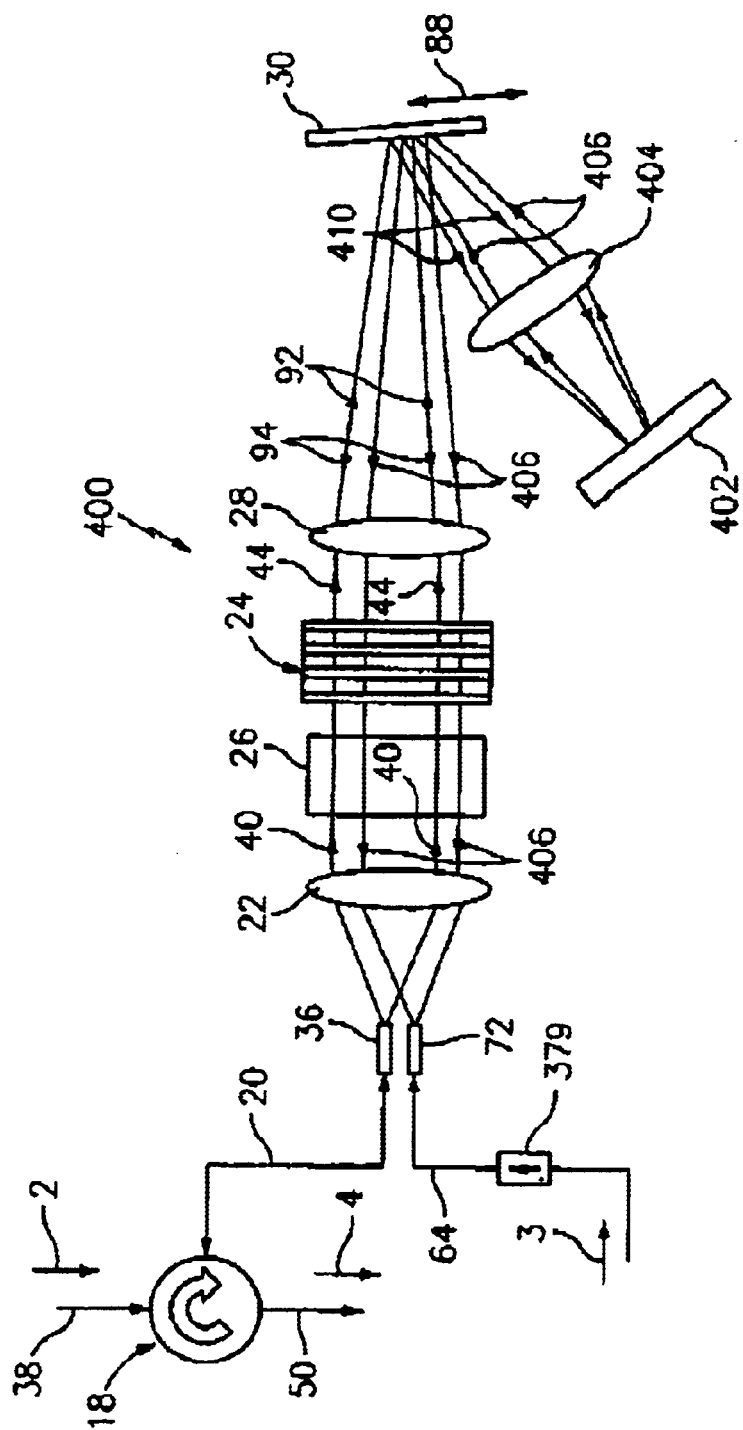
FIG. 27 is a plan view of a block diagram of another interleaver/deinterleaver device including a spatial light modulator having a micro-mirror device of FIG. 3, in accordance with the present invention.

FIG. 27: Interleaver/De-Interleaver 400

FIG. 27 shows another exemplary embodiment of an interleaver device 400 that is similar to the interleaver device 10 of FIG. 3, and therefore, similar components have the same reference numerals. The interleaver device 400 directs both the first and second input signal 14,14' through a set of common optical components. The optical components are disposed in two tiers or horizontal planes similar to the embodiments discussed hereinbefore. Specifically, the three-port circulator 18, the pigtails 20,64, the collimator 22 and the diffraction grating 24 are disposed in a first tier or horizontal plane. The mirror 26, the bulk lens 28 and the spatial light modulator 30 are disposed in the second tier or horizontal plane, which is parallel to the first horizontal plane. Further, the mirror 402 and the lens 404 of FIG. 27 are disposed in the second tier.

The circulator 18 directs the first input signal 2 from the optical fiber 38 to the first pigtail 20. The input signal 12 exits the first pigtail (into free space) and passes through the collimator 22, which collimates the input signal. The collimated input signal 40 is incident on the diffraction grating 24, which separates spatially the optical input channels 14 of the collimated input signal 40 by diffracting or dispersing the light from the diffraction grating. The diffraction grating 24 directs the separated light 44 to the mirror 26 disposed in the second tier. The mirror 26 reflects the separated light 44 to the bulk lens 28 (e.g., a Fourier lens), which focuses the separated light onto the micro-mirror device 82 of the spatial light modulator 30, as shown in FIG. 3A. In response to a switching algorithm and input command 46, the spatial light modulator 300 selectively reflects each input channel through the lens 404 to the mirror 402, or back through the common optical components to pigtail 20.

In the operation of the interleaver device 400, the micro-mirrors 84 of the spatial light modulator 30 are tilted to a first position to reflect selected input channels 14 of the input signal 12 back along the return path 94 to provide the output signal 4 at optical fiber 50. The micromirrors 84 of the spatial light modulator 30 are tilted to a second position to reflect the remaining light through the lens 404 to the mirror 402. The mirror 402 is tilted such that the remaining light is reflected along a slightly different path, as indicated by arrows 406 than the return path 94. The remaining light propagates to the second pigtail 72, as indicated by arrows 406. An optical isolator 379 is coupled to the second pigtail 64 to attenuate or block the light reflected back thereto.

Similarly, the channels 14' of the second input signal 21 propagate through the common optical components to the micro-mirror device 82 of the spatial light modulator 30, which selectively reflects each channel 14' in one of the two optical paths, as described hereinbefore. The channels 14' directed along the optical return path 94 reflect back to the first pigtail 20 to be combined with the output signal 4 at optical fiber 50, while the remaining light directed along the optical path 410 is redirected to the mirror 402 and reflected back to the second optical pigtail 64 along the optical path 406.

Figure 28:
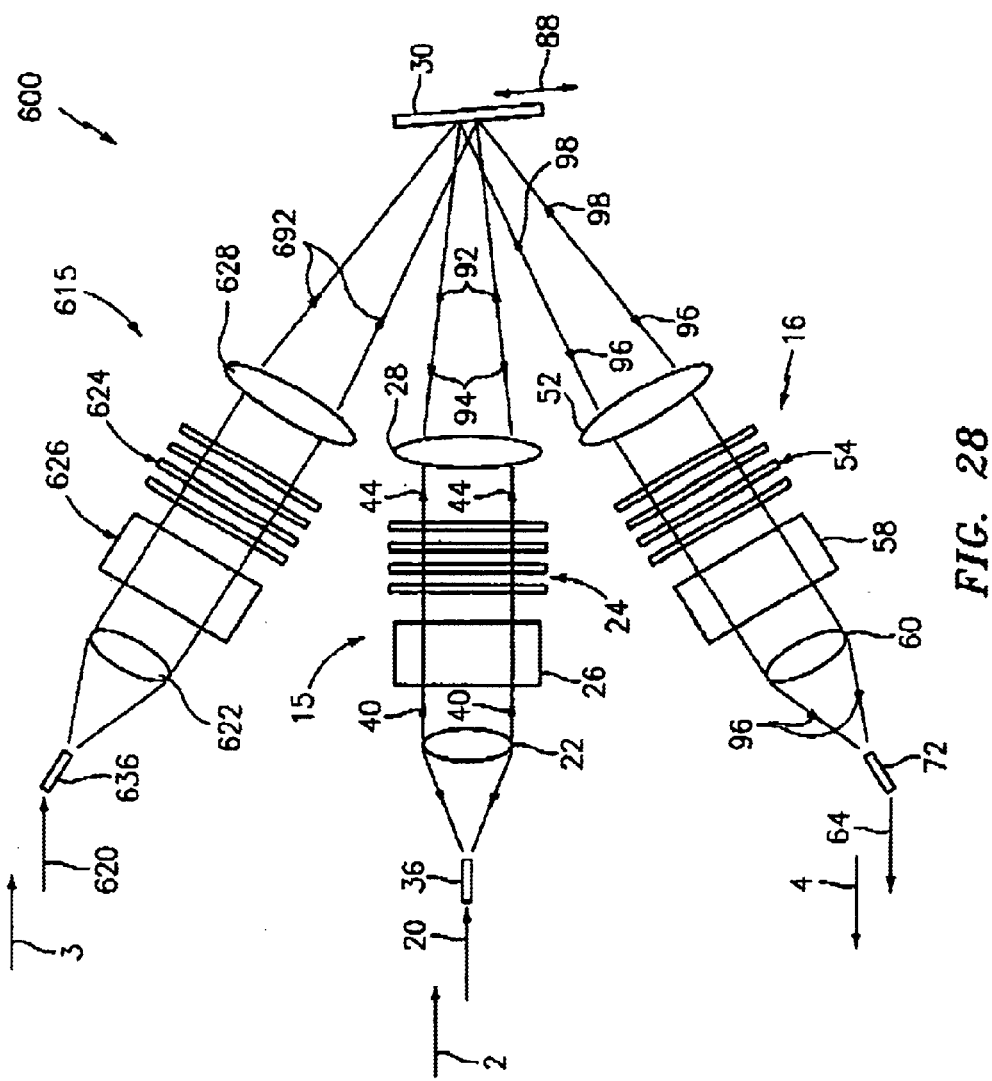
FIG. 28 is a plan view of a block diagram of another interleaver/deinterleaver device including a spatial light modulator having a micro-mirror device of FIG. 3, in accordance with the present invention.

FIG. 28: Interleaver/De-Interleaver 600

FIG. 28 shows another exemplary embodiment of an interleaver device 600 that is similar to the interleaver device 10 of FIG. 3, and therefore, similar components have the same reference numerals. The interleaver device 600 operates similarly to the interleaver device 10 except the input channels 2,3 and combined output signal pass through respective optical portions 15,16,615, wherein third optical portion 615 is substantially similar to the first and second optical portions 15,16.

In the operation of the interleaver device 600, the optical input channels 14 of the first signal 2 at the first pigtail 20 propagate through the first optical portion 15 to the micro-mirror device 82 of the spatial light modulator 30, which reflects light of the first input signal 2 in one of the two optical paths. When the micromirrors 84 of the spatial light modulator 30 are tilted to a second position, the channels 14 are reflected along the optical path indicated by arrows 96 to the second pigtail 64 to provide the output signal 4. When the micro-mirrors 84 of the spatial light modulator 30 are tilted to a first position, the remaining light of the first input signal 2 reflect back along the return path 94.

Similarly, the channels 14' of the second input signal 3 propagate through the third optical portion 616 to the micro-mirror device 82 of the spatial light modulator 30, which reflects light of the second input signal 3 in one of the two optical paths. When the micro-mirrors 84 of the spatial light modulator 30 are tilted to the first position, the input channels 14' of the second input signal 3 propagating along the optical path 692 reflect along the optical path 96 through the second optical portion 16 to the second optical pigtail 64 to combine the channels 14' with the output signal 4. When the micro-mirrors 84 of the spatial light modulator 30 are tilted to the second position, the remaining light of the second input signal 3 reflect along the optical path 94 to the second pigtail 20.

Figure 29:
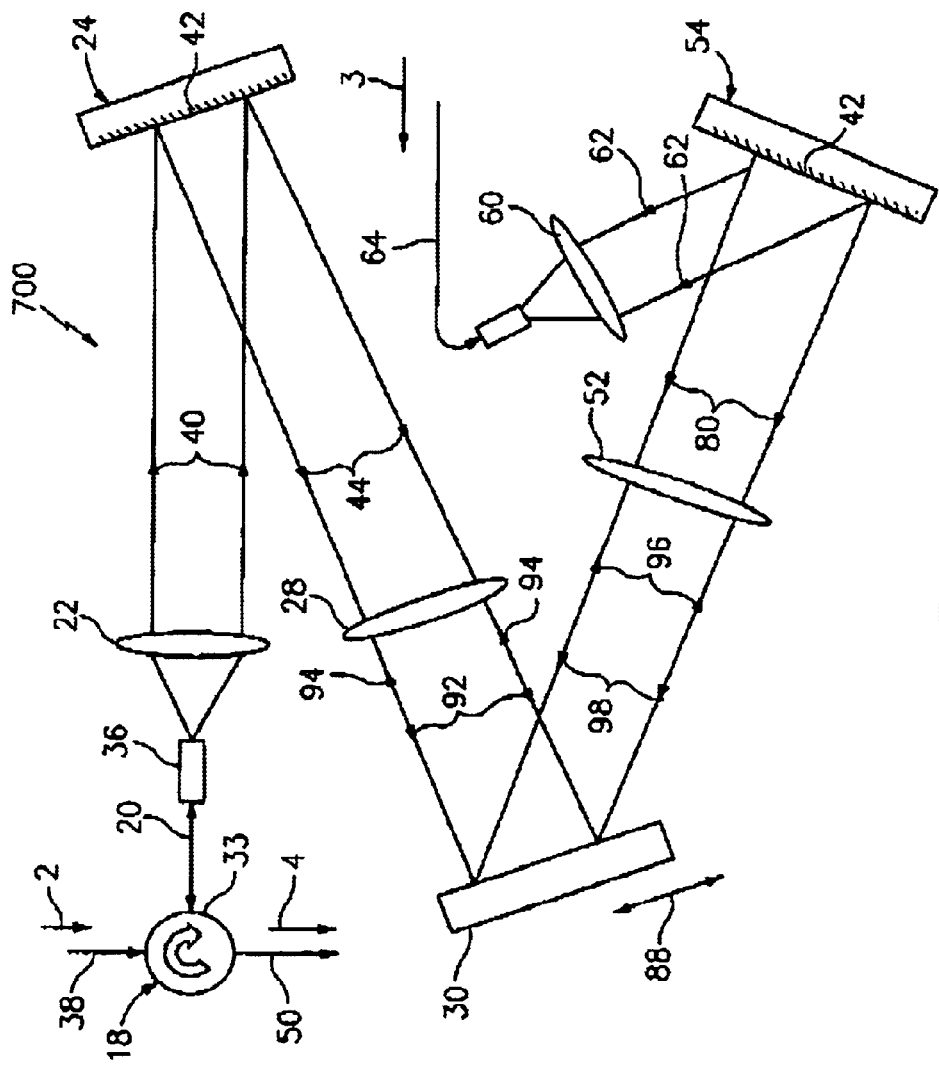
FIG. 29 is a plan view of a block diagram of another interleaver/deinterleaver device including a spatial light modulator having a micro-mirror device of FIG. 3, in accordance with the present invention.

FIG. 29: Interleaver/De-Interleaver 700

FIG. 29 shows another exemplary embodiment of an interleaver device 700 that is similar to the interleaver device 170 of FIG. 10, and therefore, similar components have the same reference numerals. The interleaver device 700 operates similarly to the interleaver device 170 except the first diffraction gratings 24,54 are rotated 90 degrees so that the input channels 14 of input signals 2,3 are dispersed on micro-mirror device 82 of the spatial light modulator 30 such that the sprectral axis 86 of optical channels 14,14' are perpendicular to the horizontal plane that the optical components of the interleaver device 700 are disposed. Further, the diffraction grating 54 is tilted at a predetermined angle to reflect the optical channels 14,14' in an optical path 62 (upward as shown in FIG. 28) to equalize the path length of each of the optical channels through the interleaver device 700.

While the embodiments of the present invention described hereinabove illustrate a single interleaver device using a set of optical components, it would be advantageous to provide an embodiment including a plurality of interleaver devices that uses a substantial number of the optical components, including the spatial light modulator.

Figure 30:
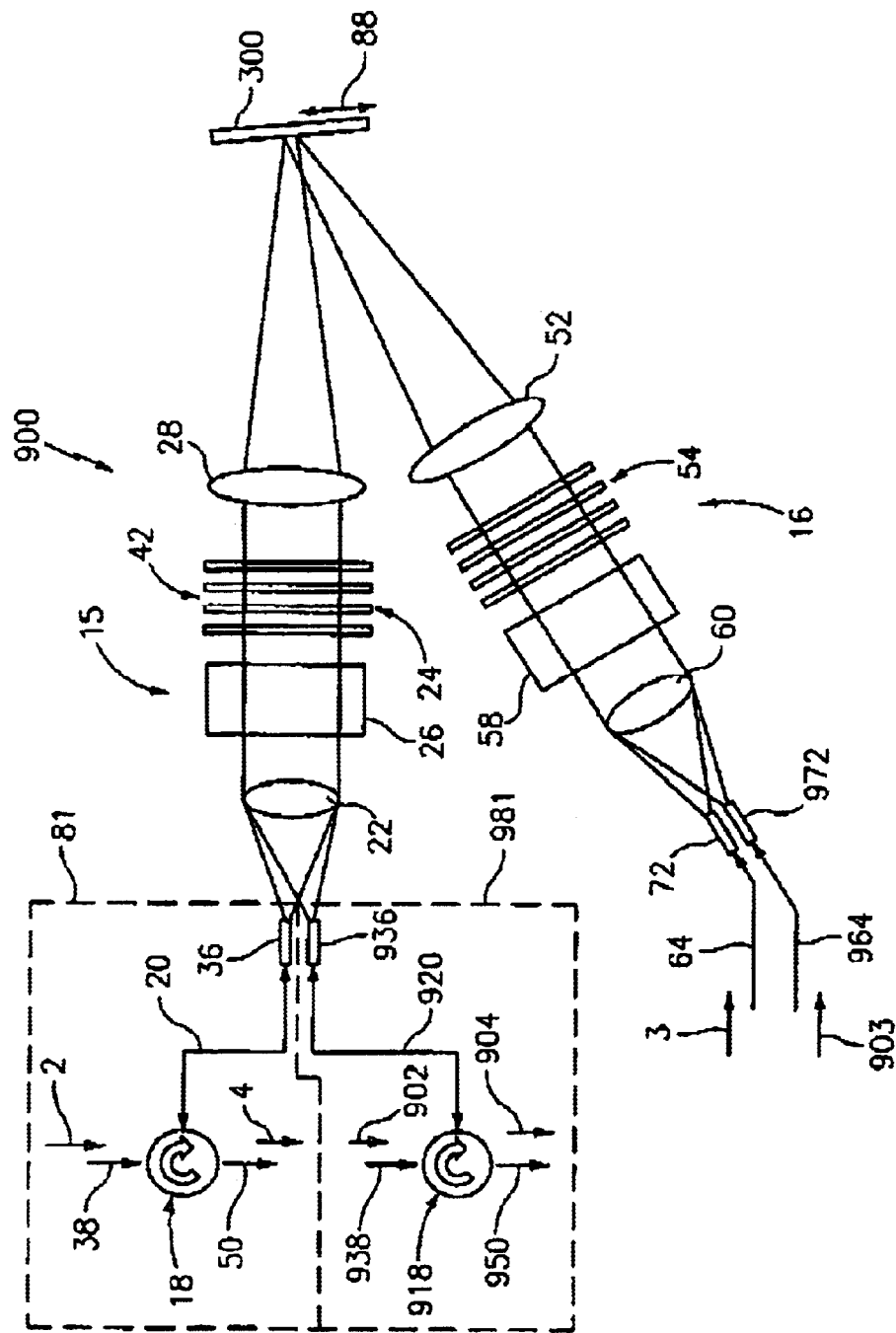
FIG. 30 is a block diagram of another embodiment of an interleaver/deinterleaver device including a plurality of interleaver/deinterleaver devices using a single spatial light modulator, in accordance with the present invention.

FIG. 30: Interleaver/De-Interleaver 900

FIG. 30 illustrates such an embodiment of an interleaver device 900, which is substantially the same as the interleaver device 10 in FIG. 3 having a spatial light modulator 300 in FIG. 13. Common components between the embodiments have the same reference numerals. The interleaver device 400 provides a pair of interleaver devices (i.e., $I/L_1$, $I/L_2$), each of which use substantially all the same optical components, namely the collimating lens 22,60, the mirrors 26,58, the diffraction gratings 24,54, the bulk lens 28,52 and the spatial light modulator 300. The first interleaver device ($I/L_1$) is substantially the same as the interleaver device 10 of FIG. 12. The second interleaver device ($I/L_2$) is provided by adding a complementary set of input optical components 981,964. The input optical components 81,83 of $I/L_1$ and the input optical components 981,964 of $I/L_2$ are the same, and therefore have the last two numerals of the input optical components 981,964 of $I/L_2$ are the same as those of the similar components 81,83 of the $I/L_1$.

Figure 31:
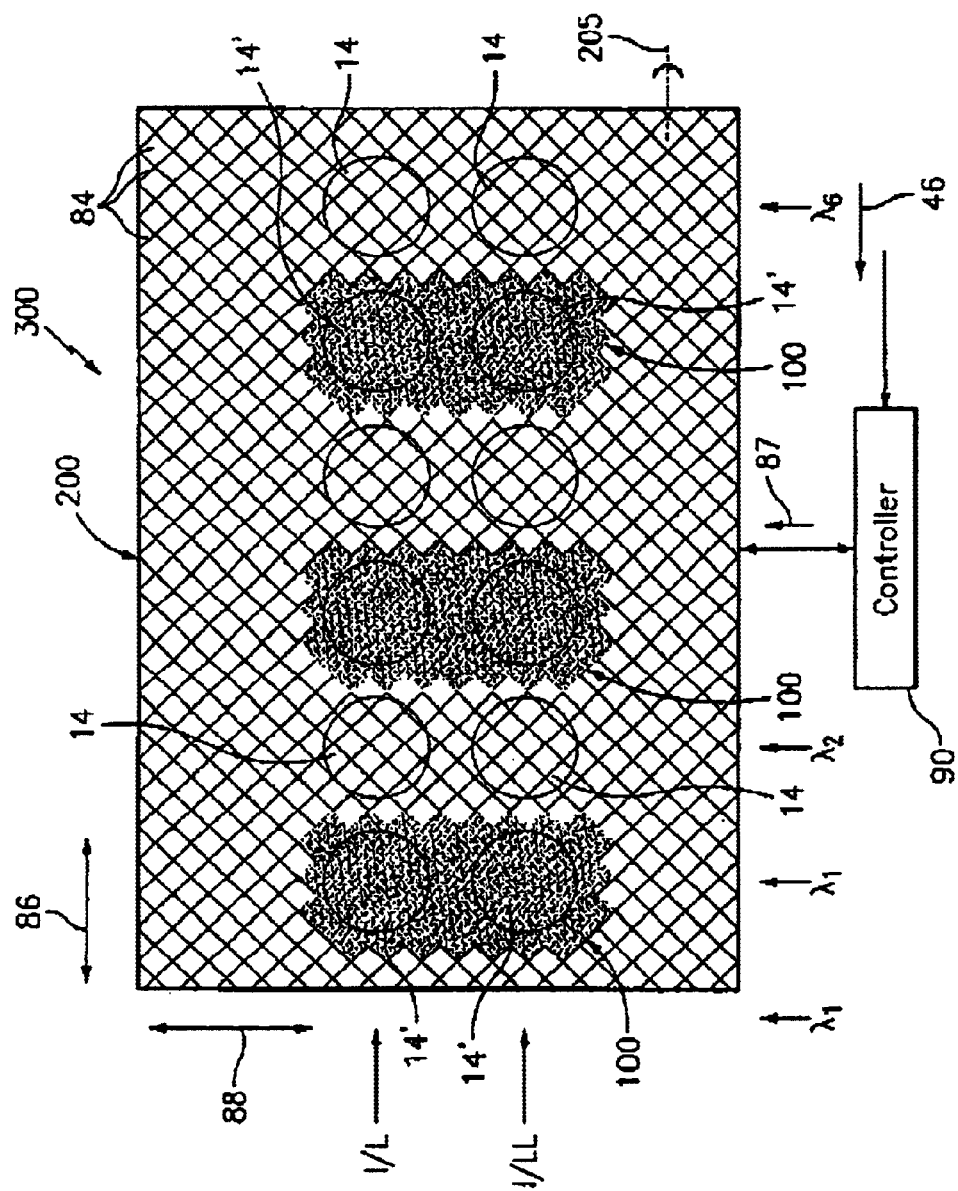
FIG. 31 is a block diagram of the spatial light modulator of the interleaver/deinterleaver device of FIG. 27, wherein the optical channels of a plurality of WDM input signals are distinctly projected onto the micro-mirror device, in accordance with the present invention.

To provide a plurality of interleaver devices ($I/L_1$, $I/L_2$) using similar components, each interleaver device uses a different portion of the micro-mirror device 200, as shown in FIG. 31, which is accomplished by spacing spatially the ends 36,72,936,972 of the pigtails 20,64,920,964 of the interleaver devices. As shown, the input channels and output channels of each interleaver device are spaced a predetermined distance in the spatial axis 88. Similar to that described hereinabove, the groups 100 of shaded micro-mirrors 84 combined the optical channels 14,14' of both interleaver devices ($I/L_1$,$I/L_2$). One will recognize that while the same optical channels are combined in the embodiment shown in FIG. 31, the micro-mirrors 84 may be tilted to individually combined optical channels 14,19,914,919 as shown in FIG. 32.

FIG. 32

Figure 32:
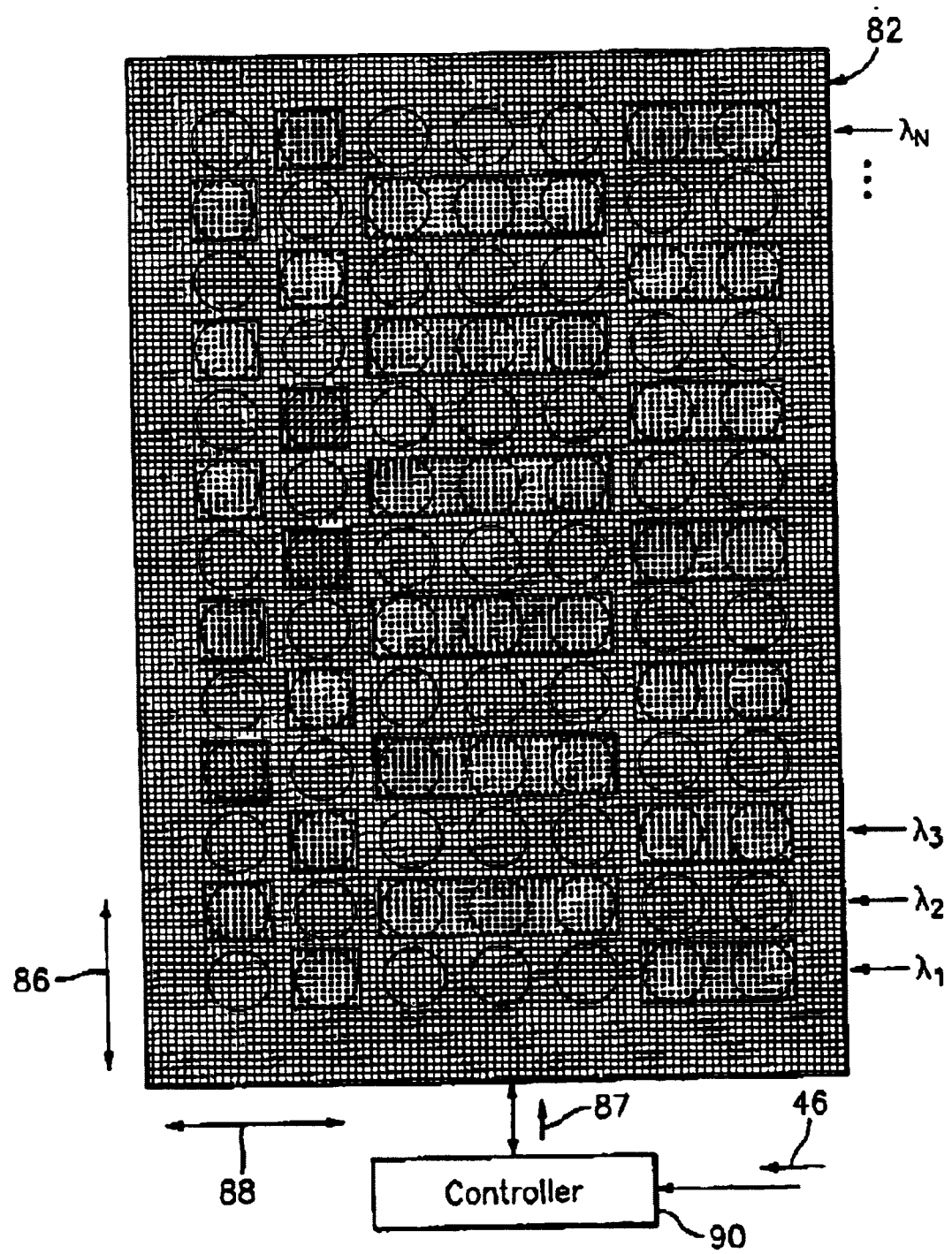
FIG. 32 is a block diagram of a spatial light modulator of the interleaver/deinterleaver device of FIG. 27, wherein groups of micro-mirrors are tilted to redirect respective optical channels of the plurality of WDM input signals, in accordance with the present invention.

FIG. 32 illustrates another embodiment of the present invention similar to that shown in FIG. 31, wherein the embodiment has N number of interleaver devices ($I/L_1$-$I/L_N$) using substantially the same optical components, as described hereinabove.

One skilled in the art will appreciate that a diffraction grating has a predetermined polarization dependence loss (PDL) associated therewith. The PDL of a diffraction grating 24 is dependent on the geometry of the etched grooves 42 of the grating. Consequently, means to mitigate PDL may be desired. One method of mitigating the PDL for any of the embodiments described hereinbefore is to provide a λ/4 plate (not shown) between the spatial light modulator 30 and the diffraction grating(s) 24,54 (before or after the bulk lens 28,52). The fast axis of the λ/4 plate is aligned to be approximately 45 degrees to the direction or axis of the lines 42 of the diffraction grating 24. The mirror is angled to reflect the separated channels back through the λ/4 plate to the diffraction grating. In the first pass through the λ/4 plate, the λ/4 plate circularly polarizes the separated light. When the light passes through the λ/4 plate again, the light is linearly polarized to effectively rotate the polarization of the separated channels by 90 degrees. Effectively, the λ/4 plate averages the polarization of the light to reduce or eliminate the PDL. One will appreciate that the λ/4 plate may not be necessary if the diffraction grating has low polarization dependencies, or other PDL compensating techniques are used.

While the micro-mirrors 84 may switch discretely from the first position to the second position, as described hereinabove, the micro-mirrors may move continuously (in an "analog" mode) or in discrete steps between the first position and second position. In the "analog" mode of operation the micro-mirrors can be can be tilted in a continuous range of angles. The ability to control the angle of each individual mirror has the added benefit of much more attenuation resolution than in the digital control case. In the "digital" mode, the attenuation step resolution is determined by the number of micro-mirrors 84 illuminated by each channel. In the "analog" mode, each mirror can be tilted slightly allowing fully continuous attenuation of the return beam. Alternatively, some combination of micro-mirrors may be switched at a predetermined or selected pulse width modulation to attenuate the optical channel or band.

While the interleaver device combine a pair of WDM input signals 2,3 having each channel 14,14' spaced a channel width apart, one will recognize that the channels of each input signal 2,3 may be grouped in any order, provided the input signals 2,3 have no common input channels. For example, one input signal 2 may include every fourth channel (i.e., $\lambda_4, \lambda_8, \lambda_{12}$) and the other input channel 3 includes the other channels (i.e., $\lambda_1$-$\lambda_3$, $\lambda_5$-$\lambda_7$, $\lambda_9$-$\lambda_{11}$). Further, the distribution of the input channels is not required to be periodic.

Similarly, while the deinterleaver device separates a WDM input signal 6 into a pair of output signals 7,8 having every other input channel 14,14' spaced a channel width apart, one will recognize that the channels of each output signal 7,8 may be separated in any desired pattern or grouping. For example, one output signal 7 may include every third channel (i.e., $\lambda_3$, $\lambda_6$, $\lambda_9$) and the other output channel includes the other channels (i.e., $\lambda_1$, $\lambda_2$, $\lambda_4$, $\lambda_5\lambda_7$, $\lambda_8$). Further, the distribution of the output channels 7, 8 is not required to be periodic.

Further, one will appreciate that while the spacing between the channels are uniform, the spacing between may be non-uniform. For example, one grouping of channels may be spaced to correspond to a 100 GHz spacing, and another group of channels that are spaced to correspond to a 50 GHz spacing.

Micro-Mirror Switching

While the micro-mirrors 84 may switch discretely from the first position to the second position, as described hereinabove, the micro-mirrors may move continuously (in an "analog" mode) or in discrete steps between the first position and second position. In the "analog" mode of operation the micro-mirrors can be tilted in a continuous range of angles. The ability to control the angle of each individual mirror has the added benefit of much more attenuation resolution than in the digital control case. In the "digital" mode, the attenuation step resolution is determined by the number of micro-mirrors 84 illuminated by each channel. In the "analog" mode, each mirror can be tilted slightly allowing fully continuous attenuation of the return beam. Alternatively, some combination of micro-mirrors may be switched at a predetermined or selected pulse width modulation to attenuate the optical channel or band.

FIGS. 33A–33E: The Collimator Assembly

Figure 33A:
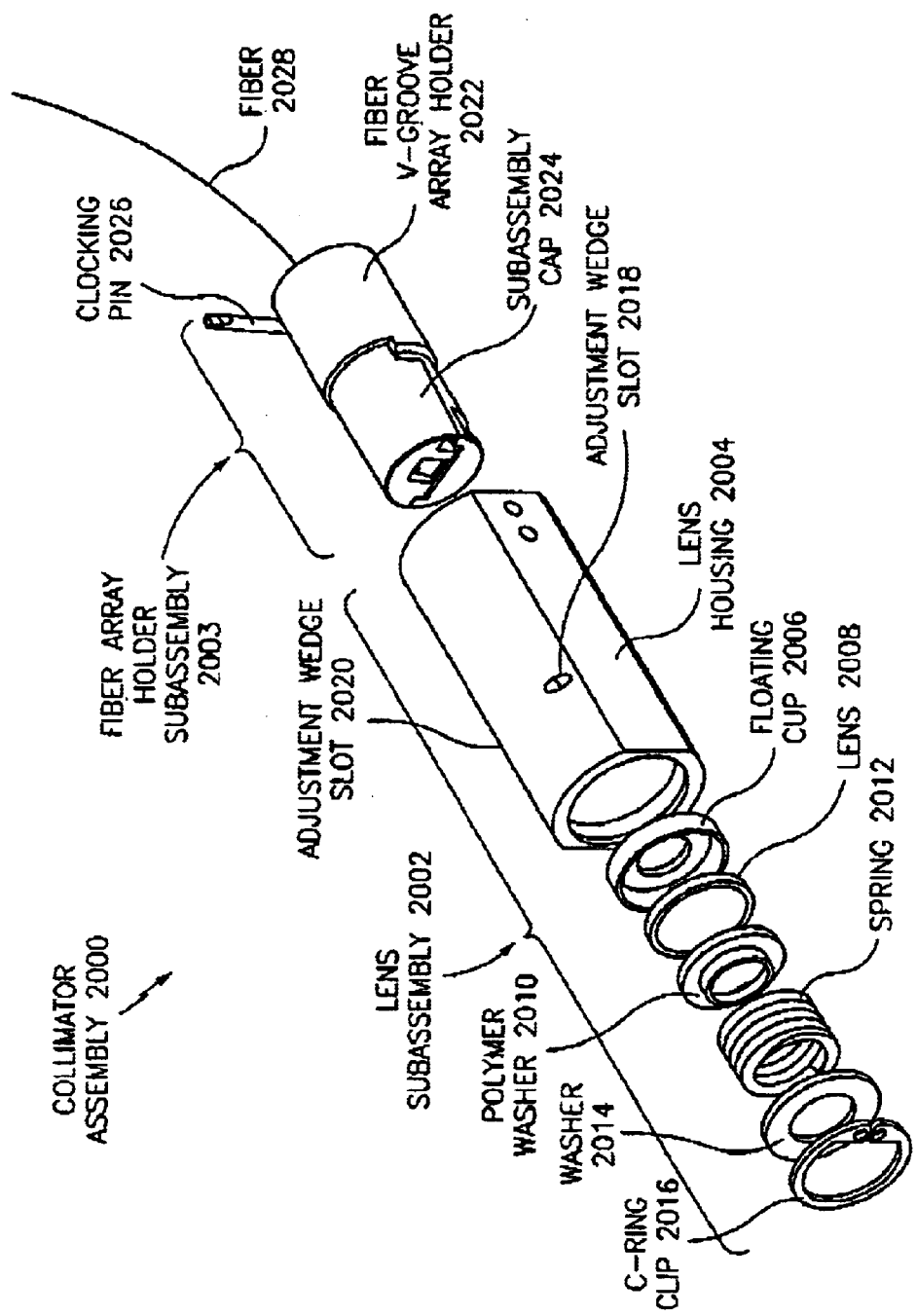
FIG. 33A is an exploded view of a collimator assembly according to the present invention.

FIG. 33A shows a collimator assembly generally indicated as 2000. The collimator assembly 2000 may be used in place of the arrangement of either the capillary tube 36 and the collimator lens 22, the capillary tube 72 and the collimator lens 60, the capillary tube 636 and the collimator lens 622, the capillary tube 936 and the collimator lens 22, the capillary tube 972 and the collimator lens 60, or any combination thereof, in any one or more of the embodiments described above.

The collimator assembly has a lens subassembly 2002 and a fiber array holder subassembly 2003. The lens subassembly 2002 includes a lens housing 2004 for containing a floating lens cup 2006, a lens 2008, a polymer washer 2010, a spring 2012, a washer 2014 and a C-ring clip 2016. The lens housing 2004 also has two adjustment wedge slots 2018, 2020. The fiber array holder subassembly 2003 includes a fiber V-groove array holder 2022, a subassembly cap 2024 and a clocking pin 2026. The fiber 2028 is arranged in the fiber array holder subassembly 2003. The V-groove array holder 2022 is designed to place the one or more fibers 2028 on the nominal origin of an optical and/or mechanical access. The clocking pin 2026 sets the angle of a semi-kinematic mount, and therefore the angle of the one or more fibers 2028 relative to the nominal optical/mechanical access.

Figure 33B:
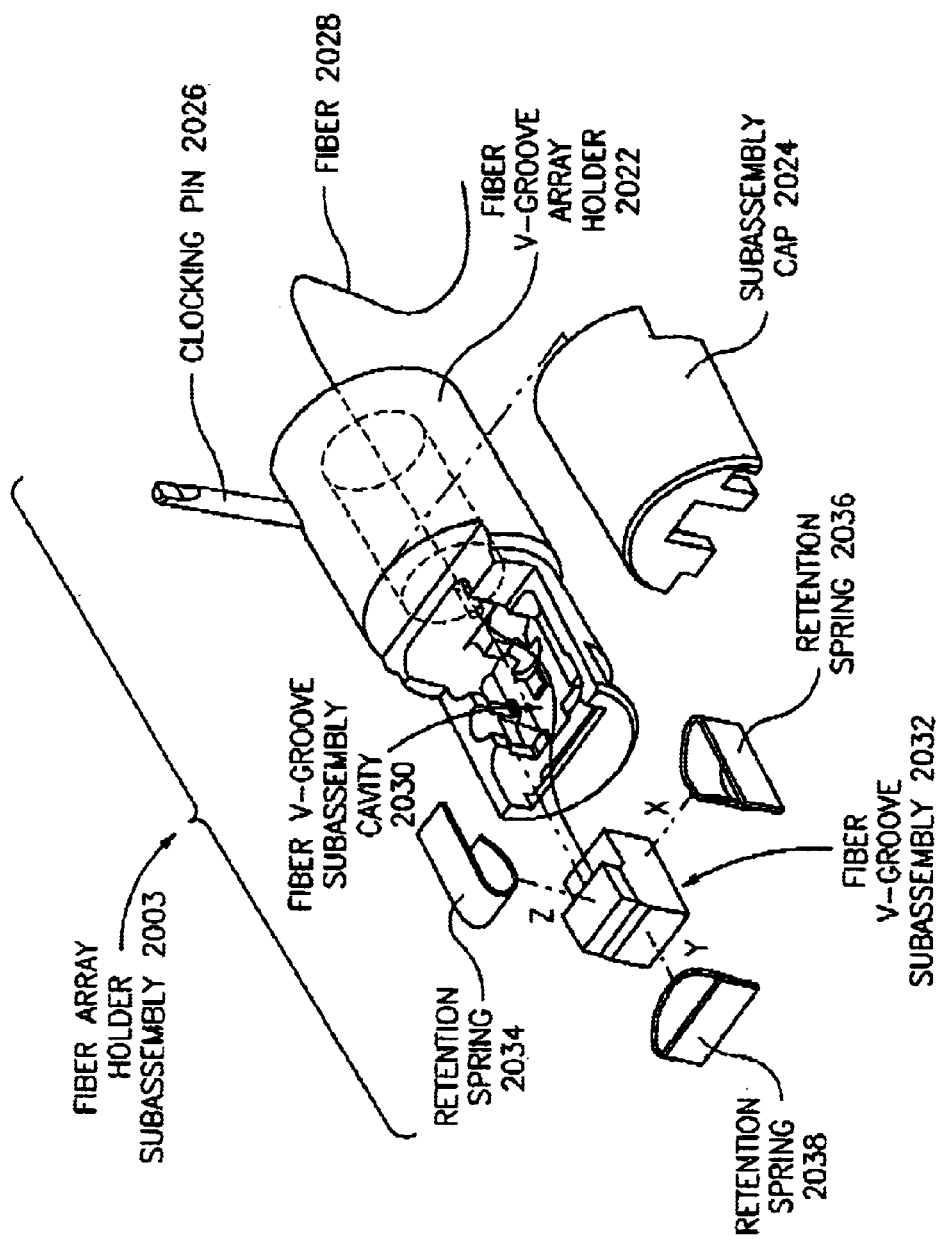
FIG. 33B is an exploded view of a fiber array holder subassembly that forms part of the collimator assembly shown in FIG. 33A.

FIG. 33B shows the fiber array holder subassembly 2003 having a fiber V-groove subassembly cavity generally indicated as 2030 for mounting a fiber V-groove subassembly generally indicated as 2032. The fiber V-groove subassembly 2032 is semi-kinematically mounted and maintained in the fiber V-groove subassembly cavity 2030 by three retention springs 2034, 2036, 2038 and the subassembly cap 2024. For example, the mounting of the fiber V-groove subassembly 2032 is characterized as follows: (1) the precision substrate of fiber V-groove array is arranged in the fiber V-groove subassembly cavity 2030; (2) The retention spring 2036 restrains the fiber V-groove subassembly 2032 in the X direction; (3) the two retention springs 2034, 2038 constrain the fiber V-groove subassembly 2032 in the Y and Z directions; and (4) the subassembly cap 2024 is welded to the fiber V-groove array holder 2022 to complete retention of the fiber V-groove subassembly 2032 in a semi-kinematic mount.

Figures 33C, 33D:
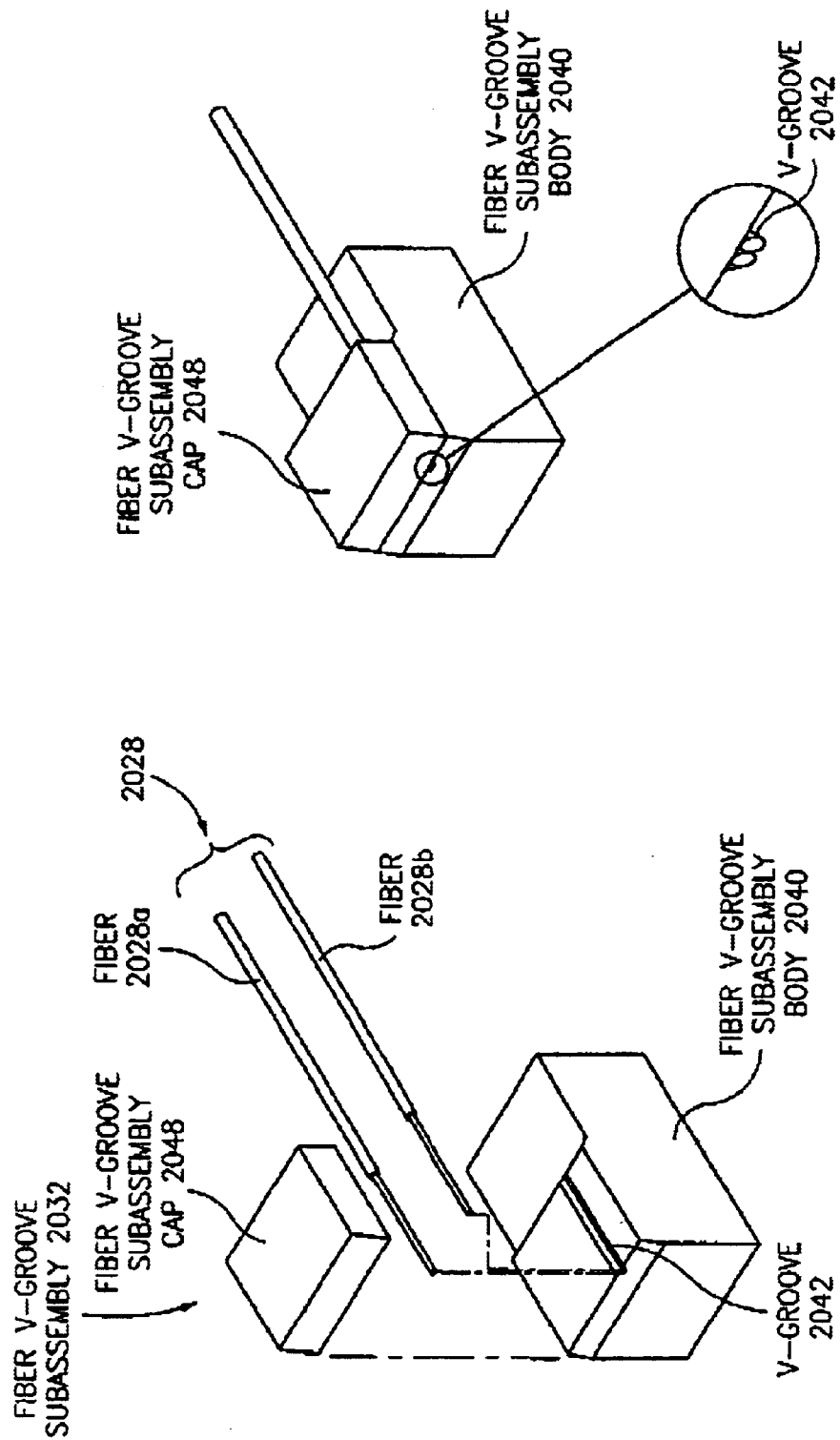
FIGS. 33C and 33D are exploded views of a fiber V-groove subassembly shown in FIG. 33B.

FIGS. 33C and D show, by way of example, the fiber V-groove subassembly 2032 having a fiber V-groove subassembly body 2040 having a V-groove 2042 arranged therein for receiving the one or more fibers 2028a, 2028b. The fiber V-groove subassembly 2032 also has a fiber V-groove subassembly cap 2048 for enclosing and holding the fibers 2028a, 2028b in the V-groove 2042, as best shown in FIG. 33D.

Figure 33E:
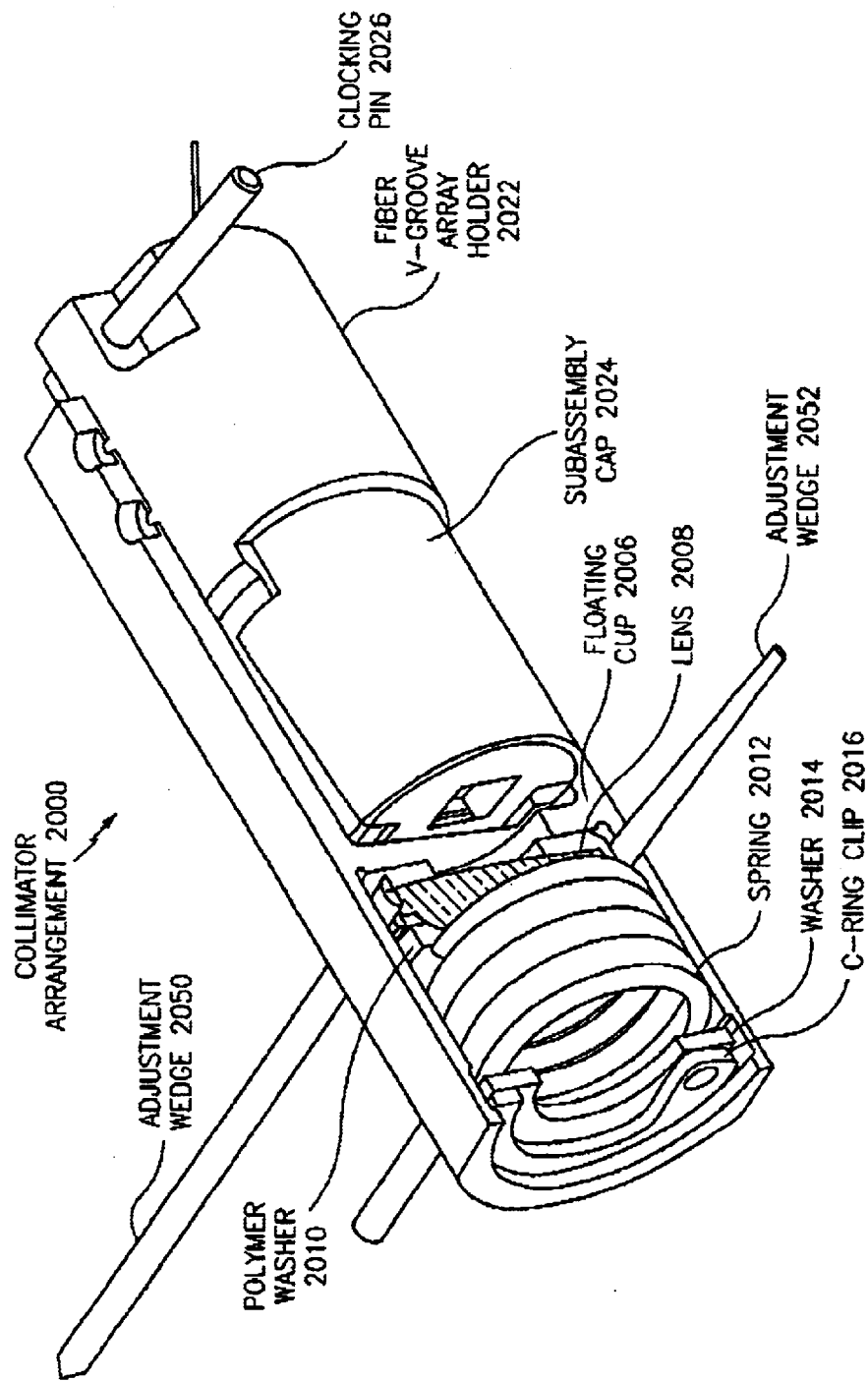
FIG. 33E is a view of a constructed collimator assembly shown in FIG. 33A.

FIG. 33E shows a complete collimator assembly generally indicated as 2000. In the complete collimator assembly 2000, the lens subassembly 2002 is welded to the fiber array holder subassembly 2003. The fully welded collimator assembly 2000 is mounted on a mounting or focusing tool or configuration (not shown) for providing coarse optical/mechanical alignment. Control of the basic mechanics of the mounting configuration is typically in the range of about +/−25 microns and about 0.1°. However, initial and final positioning of other optical components on the mounting configuration require a coarse adjustment of the actual access of the collimator assembly 2000 to match with the optical access of the other components. The coarse adjustment of the collimator optical access is achieved by moving the lens 2008 in the X and Y directions while maintaining a fixed position of the fiber array holder subassembly 2003. Tuning wedges 2050, 2052 are used to move the lens floating cap 2006 in the X and Y directions to provide coarse lens adjustment to about +/−500 microns, as discussed below. However, with use of a piezoelectric impact tool fine displacement with a resolution that is a small fraction of about a micron may be achievable.

The collimator assembly is assembled as follows:

First, the lens subassembly 2002 is assembled. The lens 2008 sits in the floating lens cup 2006. The interfaces between the floating lens cup 2006 and the precision tube of the lens housing 2004 are precision ground. The polymer washer 2014 restrains the lens 2008 in the floating lens cup 2006 under force from the compression spring 2012. The washer 2014 and the C-ring clip 2016 are used to provide a reaction surface so that the compression spring 2012 can hold the floating lens cup 2006 against the interface with the inner surface of the subassembly tube of the lens housing 2004. The lens housing has notches 2018, 2020 to accommodate use of the tuning wedges 2050, 2052. As discussed below, the tuning wedge 2050, 2052 may be inserted into the notches 2018, 2020 so as to react against the surface in order to push the floating lens cup 2006 in adjustment relative to the mechanical access of the tube of the lens housing 2004.

Next, the array holder 2022 is fit into the precision tube of the lens housing 2004 for a focus adjustment and weld. To accomplish the collimation adjustment, the array holder 2022 and the tube of the lens housing 2004 are installed into the focusing tool (not shown) along with the lens subassembly 2002. The lens subassembly 2002 is aligned and adjusted for optimum collimation. The array holder 2022 is welded to the precision tube of the lens housing 2004. At this point, the lens subassembly 2004 and the fiber array holder subassembly 2003 are a matched pair.

In operation, the collimator assembly 2000 will interface optical signals on an optical fiber with the optics of another optical device by creating a parameter-matched, free space beam; collect a returning beam from the other optical device and re-introduce it into the optical fiber with minimal loss; interface the collimator on the other optical device chassis with accuracy of about +/−25 microns and about +/−1 mR; point the free space beam into the optical access of the other optical device with a coarse adjustment of about +/−2 mR and a fine adjustment of about +/−0.002 mR. Moreover, adhesives are not in the optical path and are not desired for connecting any of the precisely aligned optical/mechanical components.

Figure 34:
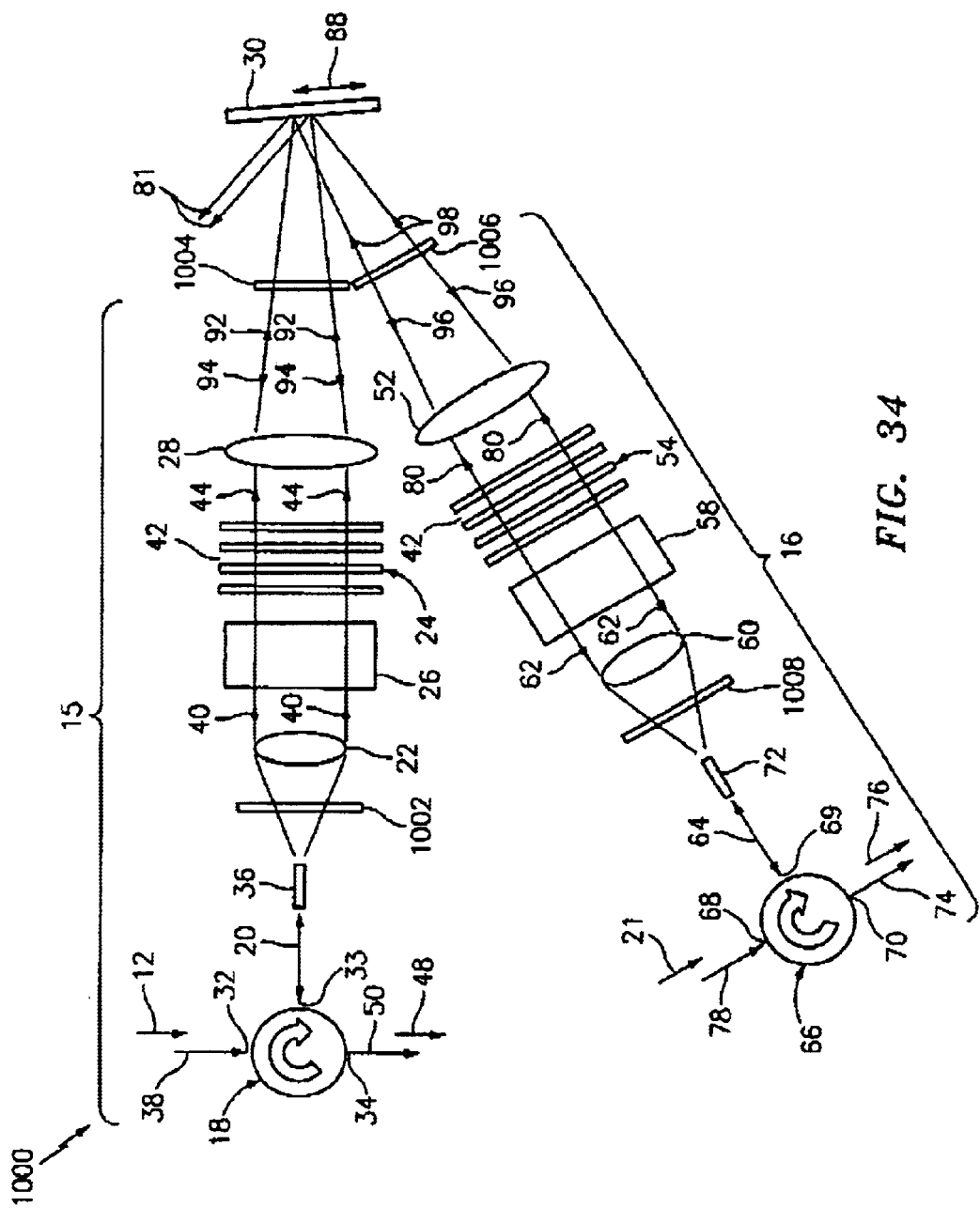
FIG. 34 shows an alternative embodiment of an interleaver/de-interleaver having one or more optic devices for minimizing polarization dispersion loss (PDL)

FIG. 34: Polarization Dependence Loss (PDL) and λ/4 Plate Solution

FIG. 34 shows an embodiment of an interleaver/de-interleaver generally indicated as 1000 having optical portions 15, 16 with one or more optical PDL devices 1002, 1004, 1006, 1008 for minimizing polarization dependence loss (PDL). The one or more optical PDL devices 1002, 1008 are arranged between the capillary tube 36 and the grating 24, while the one or more optical PDL devices 1004, 1006 are arranged between the grating 24 and the spatial light modulator 30.

The optical PDL device 1002 may include a polarization splitter for splitting each channel into its pair of polarized light beams and a rotator for rotating one of the polarized light beams of each optical channel. The optical PDL device 1008 may include a rotator for rotating one of the previously rotated and polarized light beams of each optical channel and a polarization splitter for combining the pair of polarized light beams of each channel.

The one or more optical devices 1002 and 1004 may be incorporated in any of the embodiments shown and described above, including but not limited to the embodiments shown in FIGS. 3, 3A, 4, 9A, 9B, 9C, 19, 19A, 23, 27–31 and 33.

In effect, as a person skilled in the art will appreciate, a diffraction grating such as the optical elements 42, 54 has a predetermined polarization dependence loss (PDL) associated therewith. The PDL of the diffraction grating 24 is dependent on the geometry of the etched grooves 42 of the grating. Consequently, means to mitigate PDL may be desired. The λ/4 plate between the spatial light modulator 30 and the diffraction grating(s) 24, 54 (before or after the bulk lens 28, 52) mitigates the PDL for any of the embodiments described hereinbefore. The fast axis of the λ/4 plate is aligned to be approximately 45 degrees to the direction or axis of the lines 42 of the diffraction grating 24. The mirror is angled to reflect the separated channels back through the λ/4 plate to the diffraction grating. In the first pass through the λ/4 plate, the λ/4 plate circularly polarizes the separated light. When the light passes through the λ/4 plate again, the light is linearly polarized to effectively rotate the polarization of the separated channels by 90 degrees. Effectively, the λ/4 plate averages the polarization of the light to reduce or eliminate the PDL. One will appreciate that the λ/4 plate may not be necessary if the diffraction grating has low polarization dependencies, or other PDL compensating techniques are used that are known now or developed in the future.

As shown and described herein, the polarized light beams may have a generally circular cross-section and are imaged at separate and distinct locations on the spatial light modulator 30, such that the polarized light beams of the optical channels do not substantially overlap spatially when focused onto the spatial light modulator, as shown, for example, in FIGS. 6, 18, 25, 34 and 35.

Figure 35:
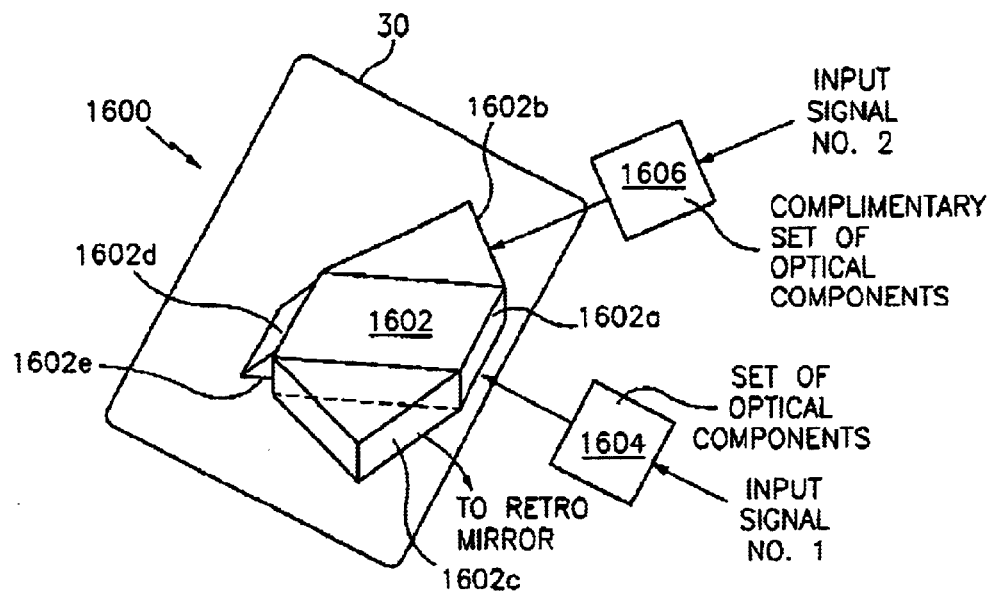
FIG. 35 shows an embodiment of an interleaver/de-interleaver having a chisel prism in accordance with the present invention.

FIG. 35: The Chisel Prism

FIG. 35 shows an interleaver/de-interleaver generally indicated as 1600 similar to that shown above, except that the micromirror device is oriented such that the tilt axis 85 is perpendicular to the spectral axis 86. The interleaver/de-interleaver 1600 has a chisel prism 1602 arranged in relation to the spatial light modulator 30 as well as a set of optical components 1604 and a complimentary set of optical components 1606. The underlying configuration of the interleaver/de-interleaver 1600 may be implemented in any of the embodiments show and described in relation to FIGS. 4, 9B, 9C and 19A described above in which the pivot or tilt axis of the mirrors of the micromirror device 30 is perpendicular to the spectral axis of the channels projected on the micromirror device 30.

The set of optical components 1604 and the complimentary set of optical components 1606 are similar to the optical portions 15, 16 shown and described herein. For example, see FIG. 1. The spatial light modulator 30 is shown and described herein as the well known DMD device. The chisel prism 1602 has multiple faces, including a front face 1602a, first and second beveled front faces 1602b, 1602c, a rear face 1602d and a bottom face generally indicated by 1602e. (It is noted that in embodiments having no retroflector or a third optical path only two front faces are used, and in embodiments having a retroflector all three front faces are used.) Light from the set of optical components 1604 and the complimentary set of optical components 1606 passes through the chisel prism 1602, reflects off the spatial light modulator, and passes back through the chisel prism 1602.

The chisel prism design described herein addresses a problem in the optical art when using micromirror devices.

The problem is the ability to send a collimated beam out to a reflective object and return it in manner that is insensitive to the exact angular placement of the reflective object. Because a light beam is typically collimated and spread out over a relatively large number of micromirrors, any overall tilt of the array causes the returned beam to "miss" the optical component, such as a pigtail, intended to receive the same.

The present invention provides a way to reduce the tilt sensitivity by using a classical optical design that certain combinations of reflective surfaces stabilize the reflected beam angle with respect to angular placement of the reflector. Examples of the classical optical design include a corner-cube (which stabilize both pitch and yaw angular errors) or a dihedral prism (which stabilize only one angular axis.).

One advantage of the configuration of the present invention is that it removes the tilt sensitivity of the optical system (which may comprise many elements besides a simple collimating lens such as element 26 shown and described above) leading up to the retro-reflective spatial light modulator 30. This configuration allows large beam sizes on the spatial light modulator without the severe angular alignment sensitivities that would normally be seen.

Patent application Ser. No. 10/115,647 (CC-0461), which is hereby incorporated by reference, shows and describes the basic principal of these highly stable reflective elements in which all the surfaces of the objects being stable relative to one another, while the overall assembly of the surfaces may be tilted without causing a deviation in reflected angle of the beam that is large compared to the divergence angle of the input beam.

FIG. 36

Figure 36:
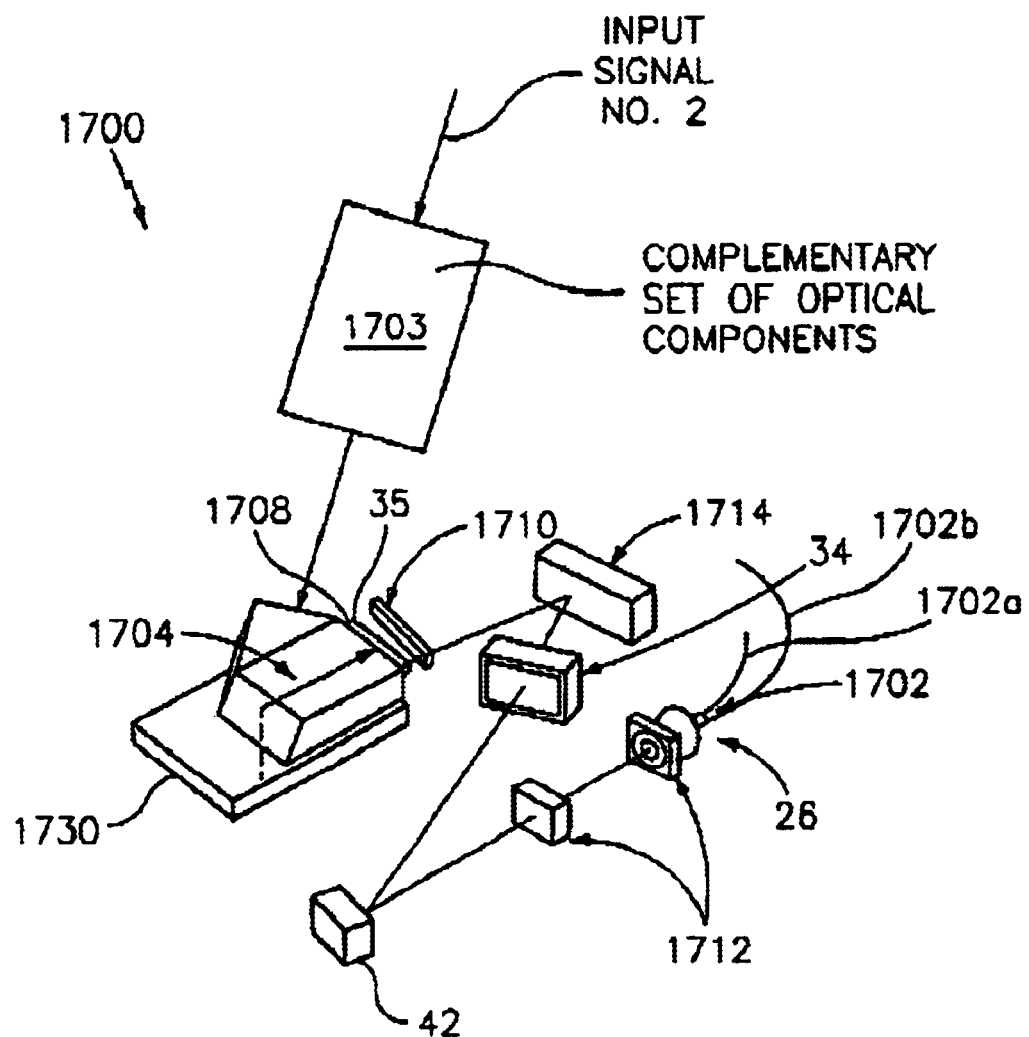
FIG. 36 shows an alternative embodiment of an interleaver/de-interleaver having a chisel prism in accordance with the present invention.

FIG. 36 illustrates a schematic diagram of an interleaver/de-interleaver generally indicated as 1700 that provides improved sensitivity to tilt, alignment, shock, temperature variations and packaging profile, which incorporates such a tilt insensitive reflective assembly.

Similar to the embodiments described hereinbefore, the interleaver/de-interleaver 1700 includes a first set of optical components having a dual fiber pigtail 1702 (circulator free operation), the collimating lens 26, a bulk diffraction grating 42, a Fourier lens 34, a ¼λ plate 35, a reflector 26 and a spatial light modulator 1730 (similar to that shown above). The dual fiber pigtail 601 includes a transmit fiber 1702a and a receive fiber 1702b. The first set of optical components typically provide a first optical input signal having one or more optical bands or channels on the receive fiber 1702b, as well as providing an optical output signal on the transmit fiber 1702b.

Similar to the embodiments described hereinbefore, the interleaver/de-interleaver 1700 also includes a complimentary set of optical components 1703 for providing a second optical input signal, which is typically an optical signal to be added to the first optical input signal.

The interleaver/de-interleaver 1700 also includes a chisel prism 1704 having multiple internally reflective surfaces, including a top surface, and a back surface, as well as transmissive surfaces including three front surfaces and a bottom surface, similar to that shown in FIG. 35. The micro-mirror device 1730 is placed normal to the bottom surface, as shown. In operation, the chisel prism 1704 reflects the first optical input signal from the first set of optical components and the second optical input signal from the complimentary set of optical components 1703 both to the spatial light modulator 1730, and reflects the optical output signal back to the first set of optical components.

The chisel prism 1704 decreases the sensitivity of the optical filter to angular tilts of the optics. The insensitivity to tilt provides a more rugged and robust device to shock vibration and temperature changes. Further, the chisel prism 1704 provides greater tolerance in the alignment and assembly of the optical filter 1700, as well as reduces the packaging profile of the filter. To compensate for phase delay associated with each of the total internal reflection of the reflective surfaces of the prism (which will be described in greater detail hereinafter), λ/9 wave plate 1708 is optically disposed between the prism 1704 and the λ/4 wave plate 35. An optical wedge or lens 1710 is optically disposed between the λ/4 wave plate 35 and the diffraction grating 30 for directing the output beam from the micro-mirror device 1730 to the receive pigtail 1702a of the dual fiber pigtail 1702b. The optical wedge or lens 1710 compensates for pigtail and prism tolerances.

The optical device 1700 further includes a telescope 1712 having a pair of cylindrical lens that are spaced a desired focal length. The telescope 1712 functions as a spatial beam expander that expands the input beam (approximately two times) in the spectral plane to spread the collimated beam onto a greater number of lines of the diffraction grating. The telescope 1712 may be calibrated to provide the desired degree of beam expansion. The telescope advantageously provides the proper optical resolution, permits the package thickness to be relatively small, and adds design flexibility.

A folding mirror 1714 is disposed optically between the Fourier lens 34 and the λ/4 wave plate 35 to reduce the packaging size of the optical filter 1700.

FIG. 37

Figure 37:
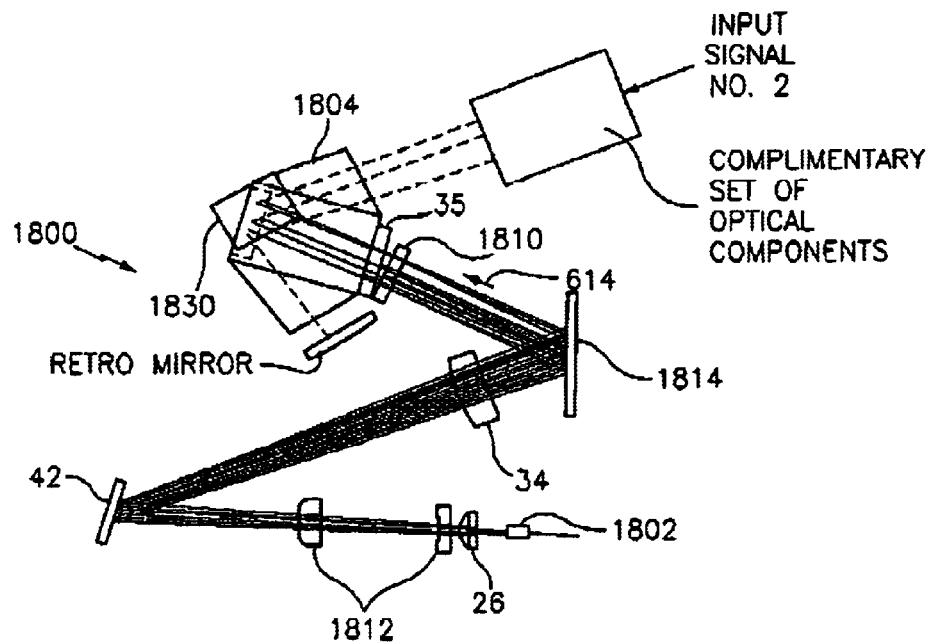
FIG. 37 shows a diagram of an alternative embodiment of the present invention having a tilt insensitive reflection assembly.

FIG. 37 shows a practical embodiment of a tilt-insensitive reflective assembly 1800 comprising a specially shaped prism 1804 (referred as the "chisel prism") and the micromirror device 1830. Unlike an ordinary 45 degree total internal reflection (TIR) prism, in this embodiment the back surface of the prism 1804 is cut at approximately a 48 degree angle relative to the bottom surface of the prism 1804. The top surface of the prism 1804 is cut at a 4 degree angle relative to the bottom surface to cause the light to reflect off the top surface via total internal reflection. The front surface of the prism 1804 is cut at a 90 degree angle relative to the bottom surface. The prism 1704 therefore provides a total of 4 surface reflections in the optical assembly (two TIRs off the back surface, one TIR off the micromirror device 1830, and one TIR off the top surface.)

In order to remove the manufacturing tolerances of the prism angles, a second smaller compensating prism or wedge 1810 (or wedge), having a front surface cut at a shallow angle (e.g., as 10 degrees) with respect to a back surface, may also be used. Slight tilting or pivoting about a pivot point of the compensation wedge 1810 causes the light beam to be pointed in the correct direction for focusing on the receive pigtail 1802.

The combination of the chisel prism 1804 and the compensation wedge 1810 allows for practical fabrication of optical devices that spread a beam out over a significant area and therefore onto a plurality of micromirrors, while keeping the optical system robust to tilt errors introduced by vibration or thermal variations.

Figure 38:
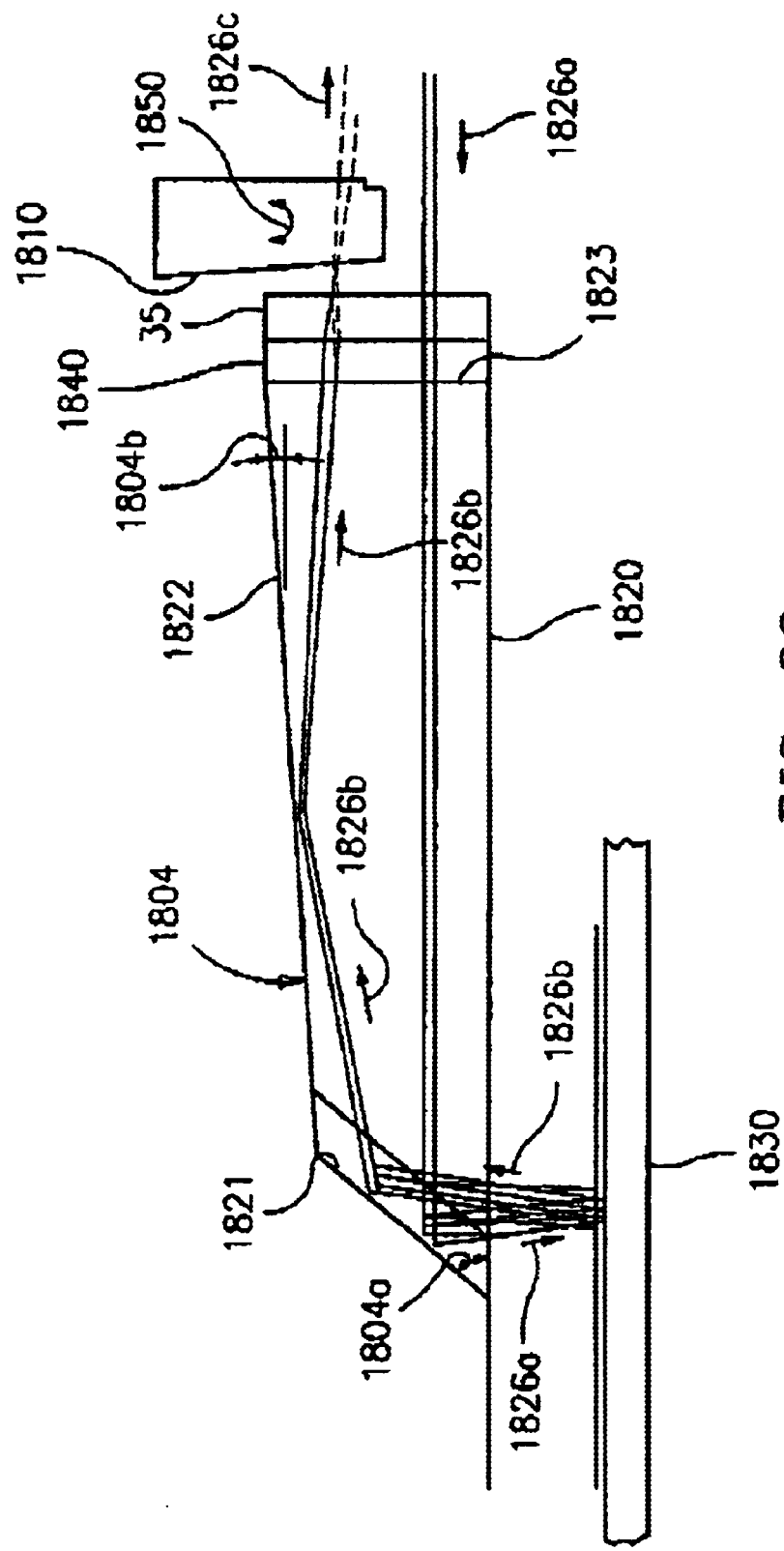
FIG. 38 shows a more detailed view of the wedge 1810, chisel prism 1804 and micromirror device 1830 of the embodiment shown in FIG. 37.

In FIG. 38, the input light rays 1826a first pass through the λ/4 wave plate 35 and the λ/9 wave plate 1840. The input rays 1826a reflect off the back surface 1821 of the prism 1804 the micro-mirror device 1830. The rays 1826b then reflect off the micromirror device 1830 back to the back surface 1821 of the prism 1804. The rays 1826b then reflect off the top surface 1822 for a total of 4 surfaces (an even number) and passes through the front surface 1823 of the prism 1804. The rays 1826b then pass back through the λ/4 wave plate 35 and the λ/9 wave plate 1840 to the wedge 1810. The wedge 1810 redirects the output rays 1826c to the receive pigtail 1802. As shown by arrows 1851, the wedge 1810 may be pivoted about its long axis 1850 during assembly to slightly steer the output beam 1826c to the receive pigtail 1802 with minimal optical loss by removing manufacturing tolerances of the chisel prism.

In FIG. 37, the prism 1804 (with wave plates 35, 1840 mounted thereto) and the micro-mirror device 1830 are mounted or secured in fixed relations to each other. The prism 1804 and micro-mirror device 1830 are tilted a predetermined angle off the axis of the input beam 614 (e.g., approximately 9.2 degrees) to properly direct the input beam onto the micromirrors of the micromirror device, as described hereinbefore. The wedge 1810 however is perpendicular to the axis of the input beam 1826a. Consequently, the receive pigtail of the dual fiber pigtail 1802 is rotated a predetermined angle (approximately 3 degrees) from a vertically aligned position with the transmit pigtail. Alternatively, the wedge 1810 may be rotated by the same predetermined angle as the prism and the micromirror device (e.g., approximately 9.2 degrees) from the axis of the input beam. As a result, the receive pigtail of the dual pigtail assembly 1802 may remain vertically aligned with transmit pigtail.

While the interleaver/de-interleaver device has been described as combining/separating every other channel of a WDM input signal(s), the present invention contemplates selectively combining/separating any group of channels. For example, every third, fourth, fifth or sixth channel may be combined/separated, every other group of channels of a WDM signal(s) may be combined/separated, or any other epriodic or aperiodic pattern desired.

The Scope of the Invention

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical interleaver/de-interleaver device including an optical arrangement for receiving two or more optical signals, each optical signal having a respective set of at least one optical band or channel, and including a spatial light modulator having a micro-mirror device with an array of micro-mirrors for reflecting the one or more optical signals provided thereon, characterized in that the optical arrangement comprises a free optic configuration having one or more light dispersion elements for separating the two or more optical signals so that each optical band or channel is reflected by a respective plurality of micro-mirrors to selectively either combine two respective sets of the at least one optical band or channel into one optical output signal, or de-combine one set of the at least one optical band or channel into two optical output signals each having a different set of the at least one optical band or channel.

2. An optical interleaver/de-interleaver device according the claim 1, wherein the one or more light dispersion elements include either a diffraction grating, an optical splitter, a holographic device, a prism, or a combination thereof.

3. An optical interleaver/de-interleaver device according the claim 2, wherein the diffraction grating is a blank of polished fused silica or glass with a reflective coating having a plurality of grooves either etched, ruled or suitably formed thereon.

4. An optical interleaver/de-interleaver device according the claim 2, wherein the diffraction grating is tilted and rotated approximately 90° in relation to the spatial axis of the dispersed optical signal.

5. An optical interleaver/de-interleaver according to claim 2, wherein the diffraction grating has a low PDL.

6. An optical interleaver/de-interleaver according the claim 1, wherein the spatial light modulator is programmable for reconfiguring the optical interleaver/de-interleaver by changing a switching algorithm that drives the array of micro-mirrors.

7. An optical interleaver/de-interleaver according the claim 6, wherein the spatial light modulator is reconfigurable by statically or dynamically modifying the switching algorithm to accommodate different channel spacing, the shape of the light beam, or the center wavelength of the light beam of reflected optical signals.

8. An optical interleaver/de-interleaver according the claim 6, wherein the switching algorithm is based on the wavelength of the optical signal and the one or more optical bands or channels being switched.

9. An optical interleaver/de-interleaver according the claim 1, wherein the array of micro-mirrors includes a multiplicity of micro-mirrors that are separately controllable for tilting on an axis depending on a control signal in accordance with a switching algorithm.

10. An optical interleaver/de-interleaver according the claim 1, wherein the two or more optical signals include a wavelength division multiplexed (WDM) optical signal having a plurality of wavelengths and a corresponding plurality of optical bands or channels, each optical channel reflecting off a respective group of micro-mirrors of the micro-mirror device.

11. An optical interleaver/de-interleaver according the claim 1, wherein the respective group of micro-mirrors are collectively tilted to reflect channels in the two or more optical signals.

12. An optical interleaver/de-interleaver according the claim 1, wherein each micro-mirror is tiltable in either a first position or a second position along an axis either parallel to the spectral axis of the micro-mirror device, parallel to the spatial axis of the micro-mirror device, or at an angle of 45° in relation to the spatial axis.

13. An optical interleaver/de-interleaver according the claim 1, wherein the optical arrangement includes one or more optical portions that provide the two or more optical signals to the spatial light modulator.

14. An optical interleaver/de-interleaver according the claim 13, wherein the one or more optical portions include either one or more waveguides, one or more capillary tubes, or a combination thereof.

15. An optical interleaver/de-interleaver according the claim 14, wherein the one or more optical portions provide the two or more optical signals to the spatial light modulator.

16. An optical interleaver/de-interleaver according the claim 14, wherein the one or more waveguides includes a pair of circulators.

17. An optical interleaver/de-interleaver according the claim 14 wherein the one or more capillary tubes includes a pair of capillary tubes.

18. An optical interleaver/de-interleaver according the claim 14, wherein the one or more circulators includes a three port circulator.

19. An optical interleaver/de-interleaver according the claim 13, wherein the one or more optical portions include a pair of optical portions, including one optical portion for providing one optical signal to the spatial light modulator, and another optical portion for providing another optical signal to the spatial light modulator.

20. An optical interleaver/de-interleaver according the claim 13, wherein the one or more optical portions include a collimator, a reflective surface, a dispersion device, a bulk lens, or a combination thereof.

21. An optical interleaver/de-interleaver according the claim 20, wherein the collimator includes either an aspherical lens, an achromatic lens, a doublet, a GRIN lens, a laser diode doublet, or a combination thereof.

22. An optical interleaver/de-interleaver according the claim 20, wherein the reflective surface includes a mirror.

23. An optical interleaver/de-interleaver according the claim 20, wherein the reflective surface is curved.

24. An optical interleaver/de-interleaver according the claim 20, wherein the bulk lens includes a Fourier lens.

25. An optical interleaver/de-interleaver according the claim 13, wherein the one or more optical portions provide the two or more optical as different channels having different wavelengths on the spatial light modulator.

26. An optical interleaver/de-interleaver according the claim 25, wherein the different channels have a desired cross-sectional geometry, including elliptical, rectangular, square or polygonal.

27. An optical interleaver/de-interleaver according the claim 25 wherein the spatial light modulator is configured so one group of channels is spaced at 100 GHz and another group of channels is spaced at 50 GHz.

28. An optical interleaver/de-interleaver according the claim 13, wherein the one or more optical portions further comprise a further optical portion for receiving the two or more optical signals from the spatial light modulator and providing these same optical signals back to the spatial light modulator.

29. An optical interleaver/de-interleaver according the claim 28, wherein the further optical portion includes a pair of reflective surfaces and lens, one reflective surface arranged at one focal length in relation to one lens and the spatial light modulator, and another reflective surface arranged at a different focal length in relation to another lens and the spatial light modulator.

30. An optical interleaver/de-interleaver according the claim 29, wherein the one focal length is twice the length of the other focal length.

31. An optical interleaver/de-interleaver according the claim 29, wherein the further optical portion includes a single reflective surface and lens arrangement.

32. An optical interleaver/de-interleaver according the claim 31, wherein the lens is arranged between a reflective surface and the spatial light modulator.

33. An optical interleaver/de-interleaver according to claim 13, wherein the one or more optical portions include one or more optical PDL mitigating devices for minimizing polarization dependence loss (PDL).

34. An optical interleaver/de-interleaver according to claim 33, wherein one optical PDL mitigating device is arranged between a waveguide and a grating in the optical arrangement, and another optical PDL mitigating device is arranged between a grating and the spatial light modulator.

35. An optical interleaver/de-interleaver according to claim 33, wherein the one or more optical PDL mitigating devices include a pair of optical PDL mitigating devices.

36. An optical interleaver/de-interleaver according to claim 33, wherein the one or more optical PDL mitigating devices includes one optical PDL mitigating device having a polarization splitter for splitting each channel into a pair of polarized light beams and a rotator for rotating one of the polarized light beams of each optical channel.

37. An optical interleaver/de-interleaver according to claim 36, wherein the one or more optical PDL mitigating devices includes another optical PDL mitigating device having a rotator for rotating one of the previously rotated and polarized light beams of each optical channel and a polarization splitter for combining the pair of polarized light beams of each channel.

38. An optical interleaver/de-interleaver according to claim 33, wherein the one or more optical PDL mitigating devices includes a λ/4 plate.

39. An optical interleaver/de-interleaver according to claim 13, wherein the optical arrangement includes a chisel prism having multiple faces for modifying the direction of the one or more optical signals.

40. An optical interleaver/de-interleaver according to claim 13, wherein the multiple faces include at least a front face, first and second beveled front faces, a rear face, a top face and a bottom face.

41. An optical interleaver/de-interleaver according to claim 39, wherein optical light from first or second optical portions passes through one or more faces of the chisel prism, reflects off one or more internal surfaces of the chisel prism, reflects off the spatial light modulator, again reflects off the one or more internal surfaces of the chisel prism, and passes back to the first or second optical portions.

42. An optical interleaver/de-interleaver multiplexer according to claim 13, wherein the one or more optical portions includes three optical portions, including a first optical portion for providing a first optical signal having one or more first channels to be interleaved to the spatial light modulator, a second optical portion for providing a second optical signal having one or more second channels to be interleaved to the spatial light modulator, and a third optical portion for providing the optical output signal having interleaved channels from the spatial light modulator.

43. An optical interleaver/de-interleaver according to claim 1, wherein the free optic configuration includes a lens and a grating arranged such that the lens is placed at a distance "d" from the grating that is shorter than focal length "f" of the lens.

44. An optical add/drop multiplexer according to claim 1, wherein the free optic configuration includes a lens and a grating arranged such that the lens is placed a distance "d" from the grating that is longer than focal length "f" of the lens.

\* \* \* \* \*